(12) United States Patent
Yajima et al.

(10) Patent No.: US 7,990,361 B2
(45) Date of Patent: Aug. 2, 2011

(54) LIQUID CRYSTAL DISPLAY DEVICE HAVING AN IMPROVED BACKLIGHT

(75) Inventors: Toshihiro Yajima, Mobara (JP); Seiichi Nishiyama, Mobara (JP); Shigetake Takaku, Mobara (JP); Yoshiharu Takeda, Mobara (JP); Shigeo Mikoshiba, Tokyo (JP); Tomokazu Shiga, Kawasaki (JP); Koji Hashimoto, Kawasaki (JP); Yusuke Baba, Fuchu (JP)

(73) Assignees: Hitachi, Ltd., Tokyo (JP); Hitachi Electronic Devices Co., Ltd., Chiba-ken (JP)

( * ) Notice: Subject to any disclaimer, the term of this patent is extended or adjusted under 35 U.S.C. 154(b) by 391 days.

(21) Appl. No.: 12/382,029

(22) Filed: Mar. 6, 2009

(65) Prior Publication Data

US 2009/0174644 A1 Jul. 9, 2009

Related U.S. Application Data

(63) Continuation of application No. 11/730,866, filed on Apr. 4, 2007, now Pat. No. 7,518,594, which is a continuation of application No. 11/211,582, filed on Aug. 26, 2005, now Pat. No. 7,218,308, which is a continuation of application No. 09/858,553, filed on May 17, 2001, now Pat. No. 6,956,556.

(30) Foreign Application Priority Data

May 18, 2000 (JP) .................................. 2000-146500

(51) Int. Cl.
*G09G 3/36* (2006.01)

(52) U.S. Cl. ............. 345/102; 345/87; 345/94; 345/103

(58) Field of Classification Search ............ 345/87–104, 345/204–215
See application file for complete search history.

(56) References Cited

U.S. PATENT DOCUMENTS

| | | | |
|---|---|---|---|
| 5,325,024 A | 6/1994 | Piejak et al. | |
| 6,010,258 A | 1/2000 | Tomita et al. | |
| 6,094,015 A | 7/2000 | Wessels et al. | |
| 6,331,064 B1 | 12/2001 | Nishiyama et al. | |
| 6,583,550 B2 | 6/2003 | Iwasa et al. | |
| 6,956,556 B2 | 10/2005 | Yajima et al. | |
| 7,218,308 B2 | 5/2007 | Yajima et al. | |
| 7,518,594 B2 * | 4/2009 | Yajima et al. | 345/102 |

FOREIGN PATENT DOCUMENTS

| | | |
|---|---|---|
| JP | 63-51095 | 8/1986 |
| JP | 5-190151 | 1/1992 |

(Continued)

*Primary Examiner* — Vijay Shankar
(74) *Attorney, Agent, or Firm* — Stites & Harbison PLLC; Juan Carlos A. Marquez, Esq.

(57) ABSTRACT

A liquid crystal display device includes a liquid crystal display panel having a liquid crystal layer sandwiched between a pair of transparent substrates, at least one of which has patterned electrodes on an inner surface thereof, and a backlight disposed behind the liquid crystal display panel. The backlight has at least one discharge tube including a sealed-off transparent tube, a phosphor film formed on an inner surface of the sealed-off transparent tube, and a discharge gas within the sealed-off transparent tube and plural electrodes spaced in a direction of an axis of the sealed-off transparent tube and positioned at least partially around a circumference of the sealed-off transparent tube. At least two adjacent ones of the plural electrodes is supplied with alternating voltages different in frequency from each other, respectively.

7 Claims, 49 Drawing Sheets

FOREIGN PATENT DOCUMENTS

| | | |
|---|---|---|
| JP | 6-34971 | 7/1992 |
| JP | 05-114387 | 5/1993 |
| JP | 8-273863 | 3/1995 |
| JP | 9-17585 | 6/1995 |
| JP | 10-255994 | 3/1997 |
| JP | 10-289791 | 4/1997 |
| JP | 11-31591 | 7/1997 |
| JP | 1-189641 | 1/1998 |
| JP | 2000-162593 | 11/1998 |
| KR | 2001-0028394 | 9/1999 |

* cited by examiner

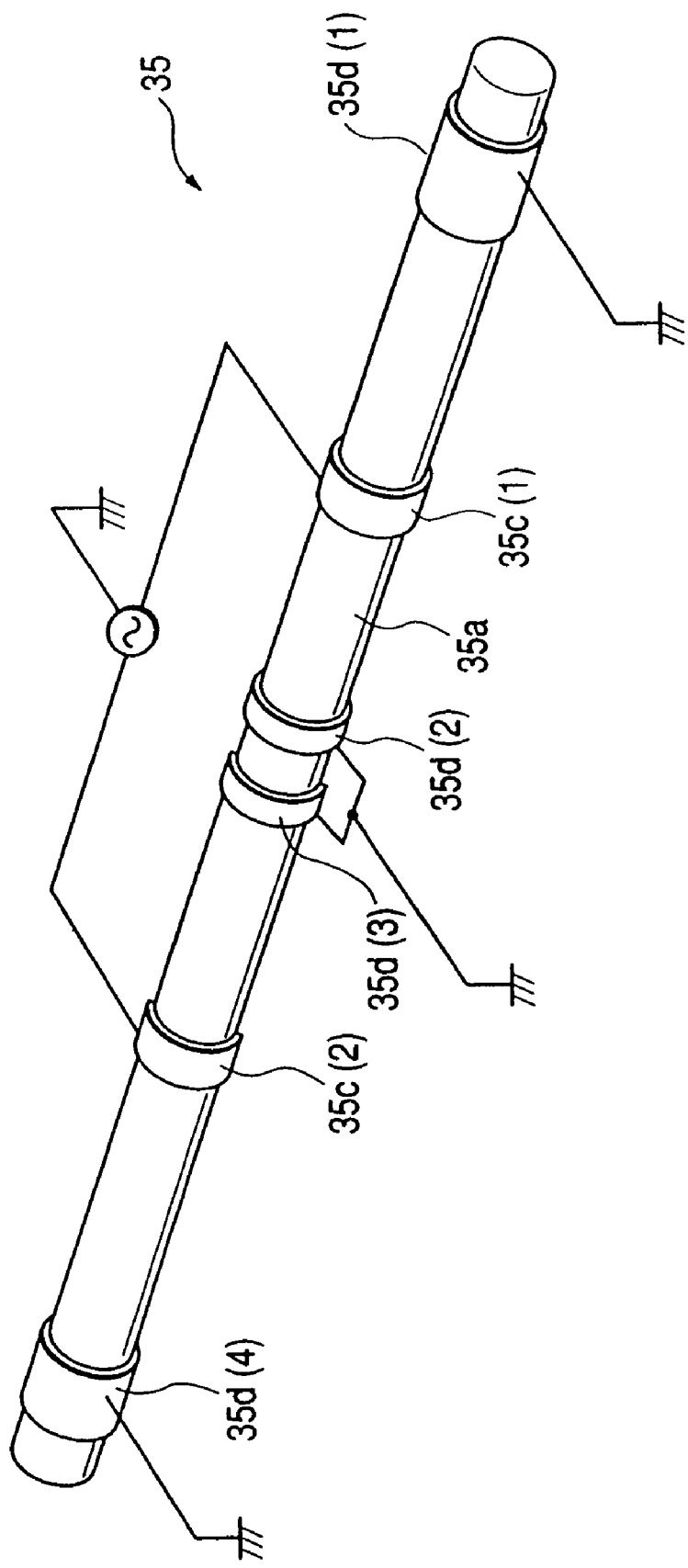

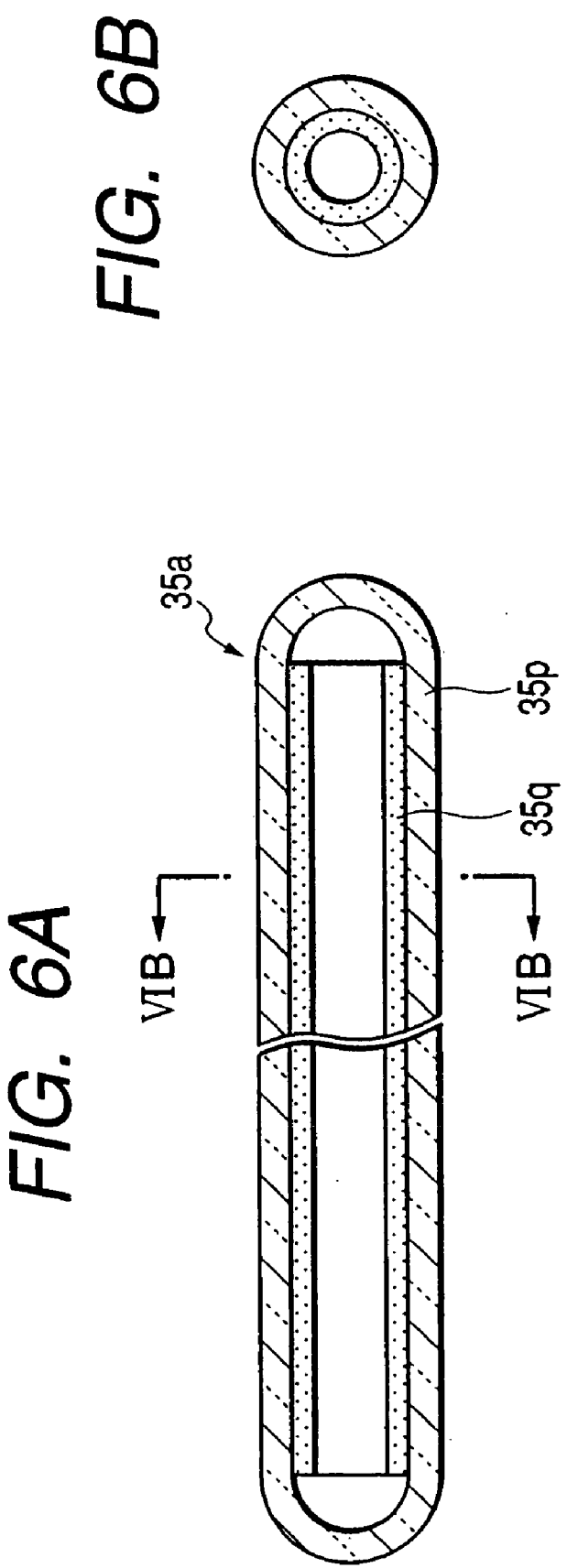

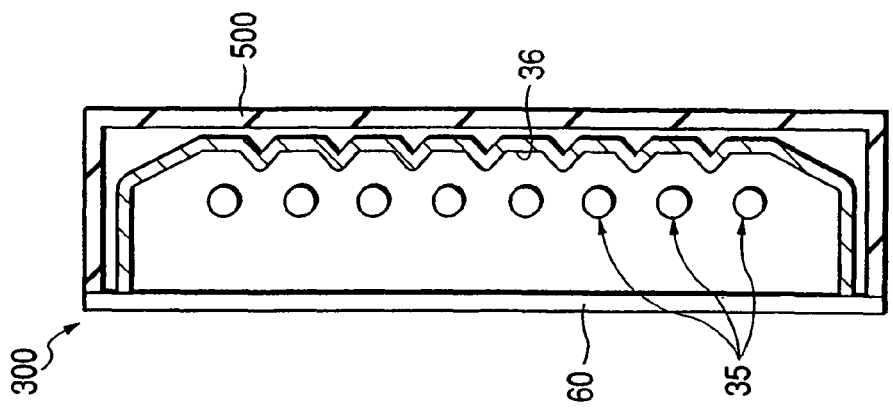
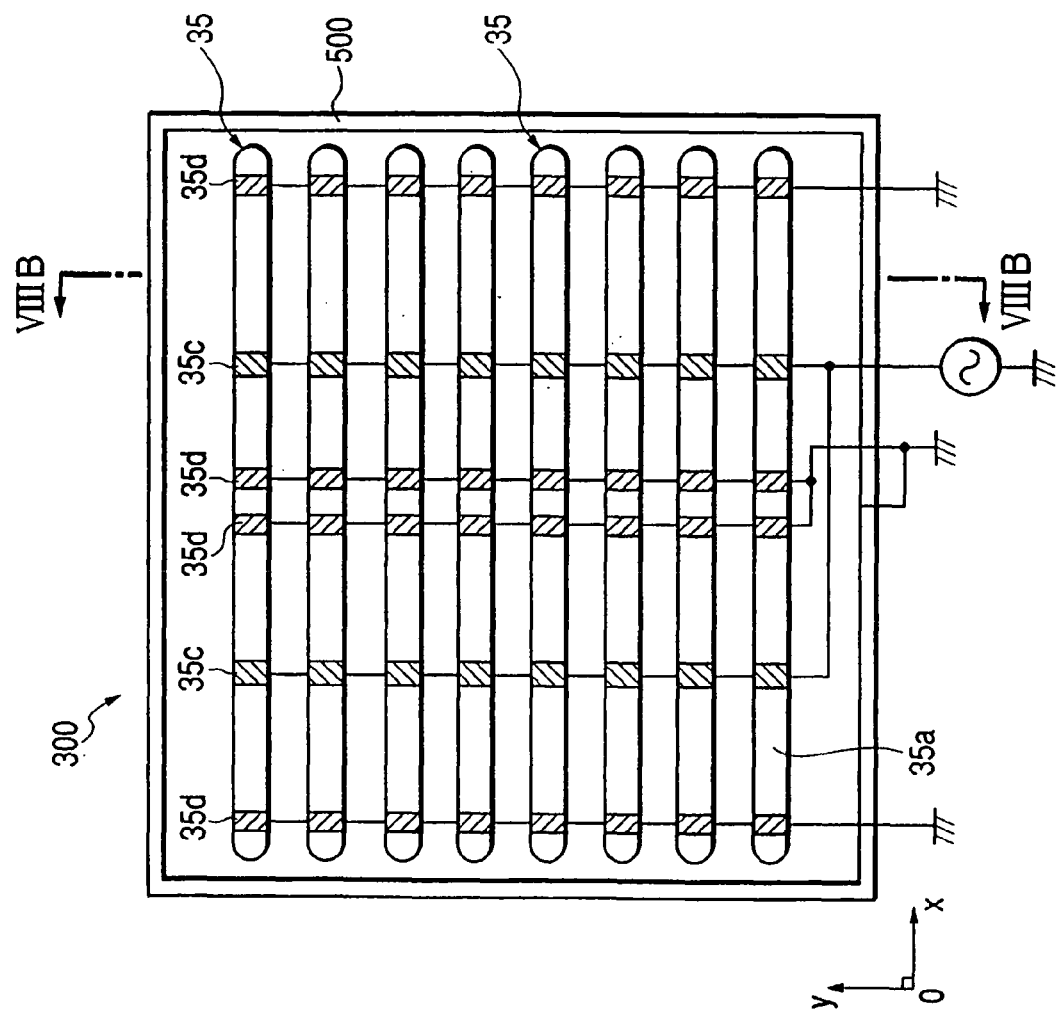

FIG. 14A
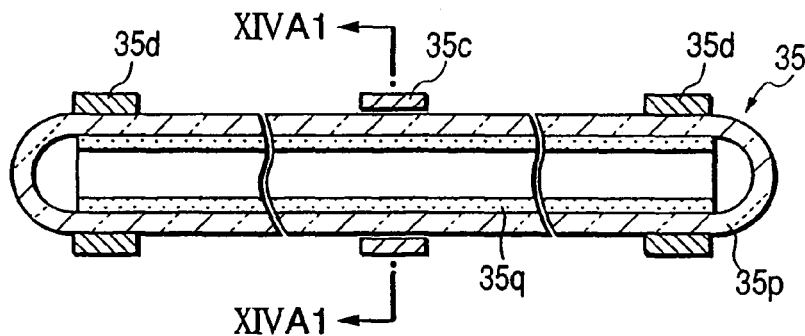
FIG. 14A1
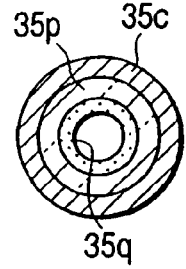
FIG. 14B
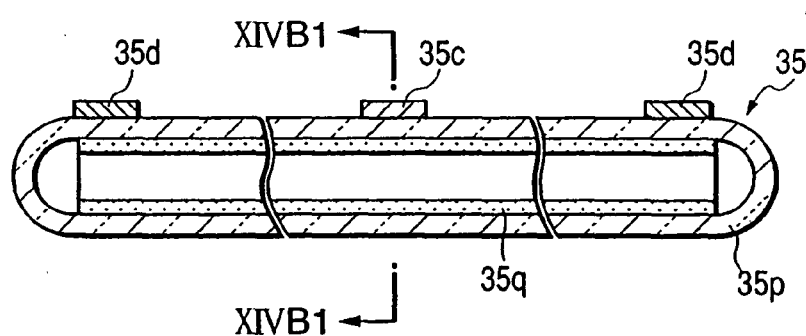
FIG. 14B1
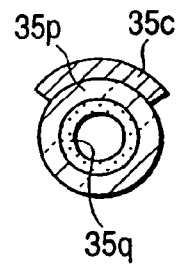
FIG. 14C
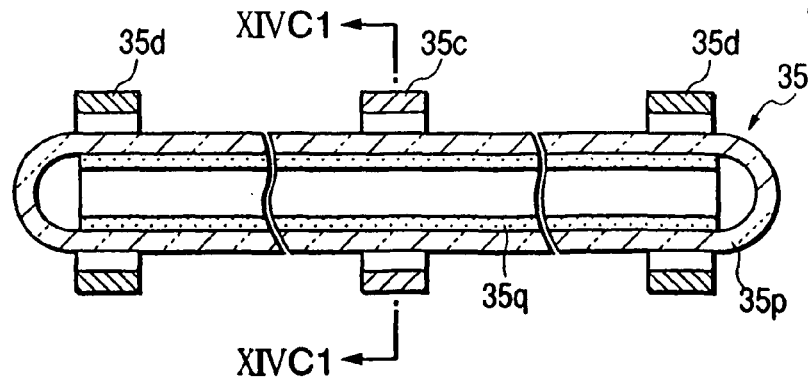
FIG. 14C1
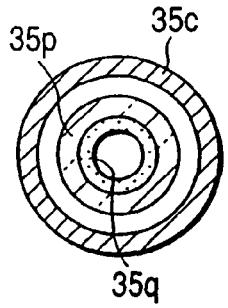

VOLTAGES FROM POWER SOURCES PS1 AND PS2 ARE OPPOSITE IN PHASE

SMALL PHASE DIFFERENCE

SMALL VOLTAGE DEFFERENCE BETWEEN HIGH-VOLTAGE ELECTRODES

MEDIUM PHASE DIFFERENCE

MEDIUM VOLTAGE DEFFERENCE BETWEEN HIGH-VOLTAGE ELECTRODES

LARGE PHASE DIFFERENCE

LARGE VOLTAGE DEFFERENCE BETWEEN HIGH-VOLTAGE ELECTRODES

RL: RESISTANCE OF LIGHT PRODUCING PORTION
Cd: CAPACITANCE FORMED BY EXTERNAL ELECTRODES 35c(1), 35c(2)
Cs: STRAY CAPACITANCE

LIQUID CRYSTAL DISPLAY DEVICE HAVING AN IMPROVED BACKLIGHT

CROSS-REFERENCE TO RELATED APPLICATION

This application is a Continuation of U.S. patent application Ser. No. 11/730,866 filed Apr. 4, 2007 now U.S. Pat. No. 7,518,594, which is a Continuation of U.S. patent application Ser. No. 11/211,582 filed Aug. 26, 2005 now U.S. Pat. No. 7,218,308, which is a Continuation of U.S. patent application Ser. No. 09/858,553, filed May 17, 2001 now U.S. Pat. No. 6,956,556. Priority is claimed based on U.S. patent application Ser. No. 11/730,866 filed Apr. 4, 2007, which claims priority from U.S. application Ser. No. 11/211,582 filed on Aug. 26, 2005, which claims priority from U.S. application Ser. No. 09/858,553 filed on May 17, 2001, which claims priority from Japanese Patent Application No. 2000-146500 filed on May 18, 2000, the content of which is hereby incorporated by reference into this application.

BACKGROUND OF THE INVENTION

The present invention relates to a liquid crystal display device, and in particular to a liquid crystal display device comprising a liquid crystal display panel and a backlight disposed behind the liquid crystal display panel.

The liquid crystal display panel comprises an envelope formed by two opposing transparent substrates, a liquid crystal layer sandwiched between the transparent substrates and a large number of pixels arranged over the area of the liquid crystal layer.

Each pixel is only capable of controlling the amount of light passing through the liquid crystal material associated with it, and does not generate no light of its own, and therefore, usually a backlight is disposed behind the liquid crystal display panel.

The backlight is provided with a light diffusing plate and a light reflecting plate or the like in addition to a light source so as to project a uniform light over the liquid crystal display panel.

Used as the light source is a cold cathode discharge tube (CFL) of a length approximately equal to that of a side of the liquid crystal display panel. The cold-cathode discharge tube serves as a light-generating element with two electrodes brought through its two ends being supplied with a voltage thereacross.

SUMMARY OF THE INVENTION

The lifetime of the light source was not sufficient, and consequently, it was no exaggeration to say that the lifetime of the liquid crystal display device of the above configuration is determined by that of its light source.

During operation of the cold-cathode discharge tube, a material of electrodes within the discharge tube is sputtered and is deposited on the inner wall of the discharge tube. This deposit can be perceived as black matters from the outside also.

The electrode material deposited on the tube wall mixes with mercury within the discharge tube to form an alloy (an amalgam), and then consumption of the mercury ends the life of the cold-cathode discharge tube.

The present invention was made based upon this fact, and it is an object of the present invention to provide a liquid crystal display device capable of improving its lifetime, and it is another object of the present invention to provide a liquid crystal display device capable of providing a uniform luminance over the display area.

The following explains briefly the summary of representative ones of the inventions disclosed in this specification.

In accordance with an embodiment of the present invention, there is provided a liquid crystal display device including a liquid crystal display panel having a liquid crystal layer sandwiched between a pair of transparent substrates, at least one of the pair of transparent substrates having patterned electrodes on an inner surface thereof, and a backlight disposed behind the liquid crystal display panel, the backlight comprising: at least one discharge tube including a sealed-off transparent tube, a phosphor film formed on an inner surface of the sealed-off transparent tube, and a discharge gas within the sealed-off transparent tube; and a plurality of electrodes spaced in a direction of an axis of the sealed-off transparent tube and positioned at least partially around a circumference of the sealed-off transparent tube, at least two adjacent ones of the plurality of electrodes being supplied with alternating voltages different in frequency from each other, respectively.

In accordance with another embodiment of the present invention, there is a liquid crystal display device including a liquid crystal display panel having a liquid crystal layer sandwiched between a pair of transparent substrates, at least one of the pair of transparent substrates having patterned electrodes on an inner surface thereof, and a backlight disposed behind the liquid crystal display panel, the backlight comprising: at least one discharge tube including a sealed-off transparent tube, a phosphor film formed on an inner surface of the sealed-off transparent tube, and a discharge gas within the sealed-off transparent tube; and a plurality of electrodes spaced in a direction of an axis of the sealed-off transparent tube and positioned at least partially around a circumference of the sealed-off transparent tube, at least two adjacent ones of the plurality of electrodes being supplied with voltages of a frequency not lower than 1 MHz and opposite in phase from each other, respectively.

In accordance with another embodiment of the present invention, there is provided a liquid crystal display device including a liquid crystal display panel having a liquid crystal layer sandwiched between a pair of transparent substrates, at least one of the pair of transparent substrates having patterned electrodes on an inner surface thereof, and a backlight disposed behind the liquid crystal display panel, the backlight comprising: at least one discharge tube including a sealed-off transparent tube, a phosphor film formed on an inner surface of the sealed-off transparent tube, and a discharge gas within the sealed-off transparent tube; and a plurality of electrodes spaced in a direction of an axis of the sealed-off transparent tube and positioned at least partially around a circumference of the sealed-off transparent tube, at least two adjacent ones of the plurality of electrodes being supplied with alternating voltages having different phases from each other, respectively, a phase difference therebetween being greater than 0 degrees, but less than 180 degrees, or being greater than 180 degrees, but less than 360 degrees.

The liquid crystal display devices of the above configurations are capable of improving their lifetime by preventing sputtering of the electrode material, and also are capable of generating light having an approximately uniform luminance distribution between the electrodes of the discharge tube supplied with high-frequency voltages.

BRIEF DESCRIPTION OF THE DRAWINGS

In the accompanying drawings, in which like reference numerals designate similar components throughout the figures, and in which:

FIG. 5 is a perspective view of an embodiment of a light source incorporated in a backlight in the liquid crystal display device in accordance with the present invention;

FIG. 6A is a longitudinal cross-sectional view of a discharge tube constituting a light source in the liquid crystal display device in accordance with the present invention, and FIG. 6B is a transverse cross-sectional view taken along line VIB-VIB of FIG. 6A;

FIG. 8A is a plan view of an embodiment of a backlight in the liquid crystal display device in accordance with the present invention, and FIG. 8B is a cross-sectional view taken along line VIIIB-VIIIB of FIG. 8A;

FIG. 14A is a longitudinal cross-sectional view of another embodiment of a light source in the liquid crystal display device in accordance with the present invention, FIG. 14A1 is a cross-sectional view taken along line XIVA1-XIVA1 of FIG. 14A;

FIG. 14B is a longitudinal cross-sectional view of still another embodiment of a light source in the liquid crystal display device in accordance with the present invention, FIG. 14B1 is a cross-sectional view taken along line XIVB1-XIVB1 of FIG. 14B;

FIG. 14C is a longitudinal cross-sectional view of still another embodiment of a light source in the liquid crystal display device in accordance with the present invention, FIG. 14C1 is a cross-sectional view taken along line XIVC1-XIVC1 of FIG. 14C;

DETAILED DESCRIPTION OF THE PREFERRED EMBODIMENTS

Now, embodiments of the liquid crystal display device in accordance with the present invention will be explained by reference to the drawings.

Embodiment 1

Equivalent Circuit of the Liquid Crystal Display Device

Figure 1:
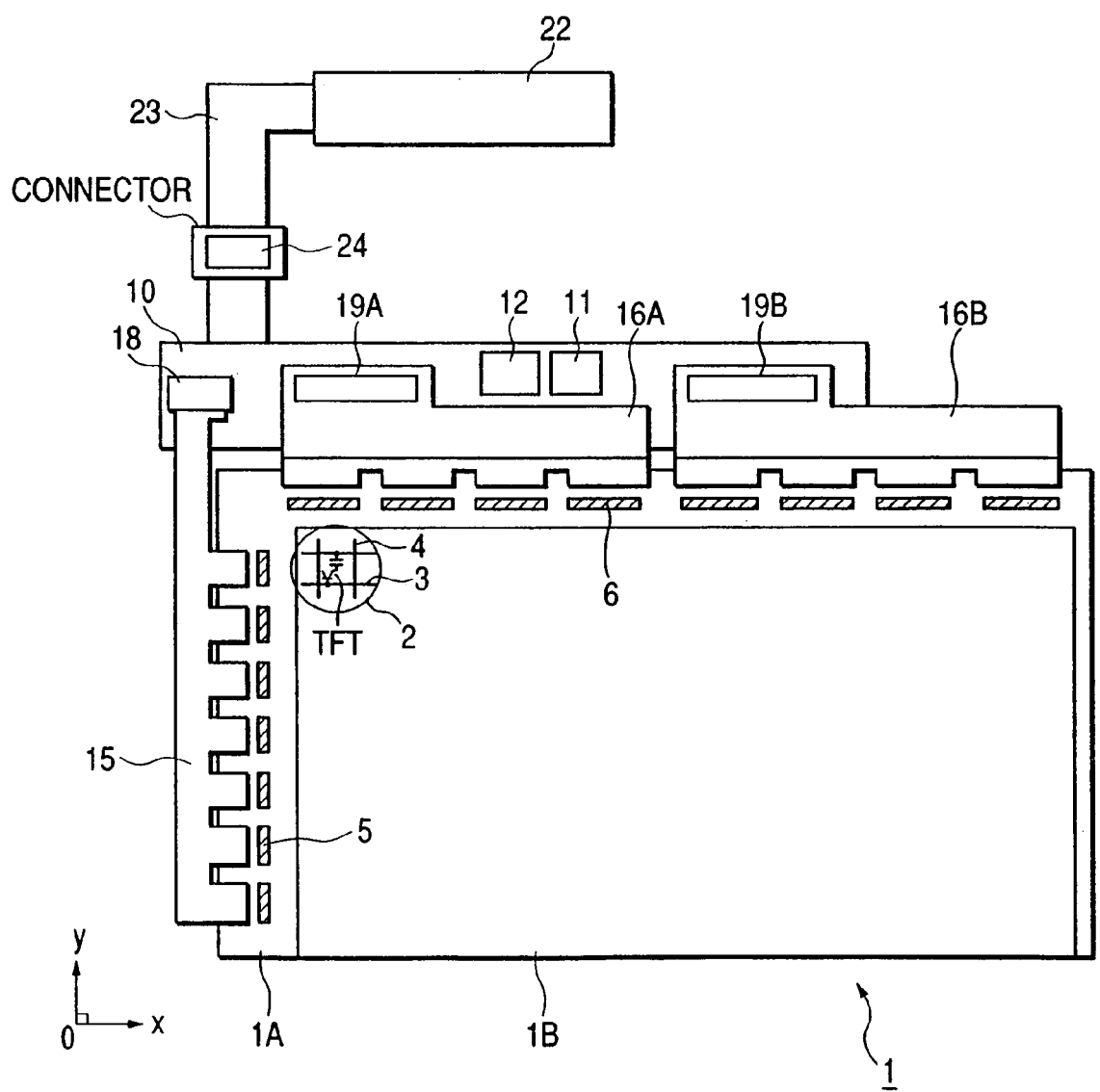
FIG. 1 is an equivalent circuit for illustrating an embodiment of the liquid crystal display device in accordance with the present invention.

FIG. 1 shows an equivalent circuit of an embodiment of the liquid crystal display device in accordance with the present invention. FIG. 1 also indicates an actual geometrical arrangement of components of the liquid crystal display device. In this embodiment, the present invention is applied to a liquid crystal display device of the so-called horizontal electric field type (the in-plane switching type) known for its wide viewing angles.

A liquid crystal display panel 1 comprises an envelope formed by two opposing transparent substrates 1A, 1B, and a liquid crystal layer sandwiched between the transparent substrates 1A, 1B. One transparent substrate shown as a lower substrate in FIG. 1, a matrix substrate 1A, is made slightly larger than the other transparent substrate shown as an upper substrate in FIG. 1, a color filter substrate 1B, and the bottom and right sides of the matrix substrate 1A are approximately with those of the color filter substrate 1B, respectively, as shown in FIG. 1. As a result, as shown in FIG. 1, the left and top peripheral portions of the transparent substrate 1A extend beyond the corresponding edges of the other transparent substrate 1B. As described subsequently, gate driving circuits 5 and drain driving circuits 6 are mounted on the left and top peripheral portions of the transparent substrate 1A.

Pixels 2 (one of which is shown) are disposed in a matrix fashion in the overlapping region of the transparent substrates 1A and 1B. Each of the pixels 2 is formed in a region surrounded by two adjacent ones of scanning signal lines 3 extending in an x direction and arranged in a y direction in FIG. 1 and two adjacent ones of video signal lines 4 extending in the y direction and arranged in the x direction, and is provided with at least a switching element TFT driven by a scanning signal supplied by a corresponding one of the scanning signal lines 3 and a pixel electrode supplied with a video signal from a corresponding one of the video signal lines 4 via the switching element TFT.

As described above, the liquid crystal display device of this embodiment is of the so-called horizontal electric field type, and therefore each of the pixels 2 is provided with a counter electrode and an additional capacitance element in addition to the switching element TFT and the pixel electrode as explained in detail subsequently.

One end (a left end in FIG. 1) of each of the scanning signal lines 3 extends beyond the edge of the transparent substrate 1B, and is connected to a corresponding one of the output terminals of the gate driving circuits (IC) 5 mounted on the transparent substrate 1A.

The plural gate driving circuits 5 are provided, the scanning signal lines 3 are divided into groups each comprising adjacent ones of the scanning signal lines 3, and scanning lines 3 of each of the groups are connected to one of the plural gate driving circuits 5 adjacent to it.

One end (a top end in FIG. 1) of each of the video signal lines 4 extends beyond the edge of the transparent substrate 1B, and is connected to a corresponding one of the output terminals of the drain driving circuits (IC) 6 mounted on the transparent substrate 1A.

The plural drain driving circuits 6 are provided, the video signal lines 4 are divided into groups each comprising adjacent ones of the video signal lines 4, and video signal lines 4 of each of the groups are connected to one of the plural drain driving circuits 6 adjacent to it.

A printed circuit board 10 (a control board 10) is disposed adjacently to the liquid crystal display panel 1 having the gate driving circuit 5 and the drain driving circuit 6 mounted thereon, and mounts thereon a control circuit 12 for supplying input signals to the gate driving circuits 5 and the drain driving circuits 6 in addition to a power supply circuit 11 and the like.

The signals from the control circuit 12 are supplied to the gate driving circuits 5 and the drain driving circuits 6 via flexible wiring boards (a gate circuit board 15 and drain circuit boards 16A and 16B).

Disposed on the gate driving circuit 5 side of the matrix substrate 1A is the gate circuit board 15, which is a flexible wiring board, having terminals facing and connected to corresponding ones of input terminals of the gate driving circuits 5.

The gate circuit board 15 has a portion extending to the control board 10 where the gate circuit board 15 is electrically connected to the control board 10 via a connecting part 18.

Output signals from the control circuit 12 mounted on the control board 10 are supplied to the respective gate driving circuits 5 via wiring on the control substrate 10, the connecting part 18 and wiring on the gate circuit board 15.

Disposed on the drain driving circuit 6 side of the matrix substrate 1A is the drain circuit boards 16A, 16B having terminals facing and connected to corresponding ones of input terminals of the drain driving circuits 6.

The drain circuit boards 16A, 16B have portions extending to the control board 10 where the drain circuit boards 16A, 16B are electrically connected to the control board 10 via connecting parts 19A, 19B, respectively.

Output signals from the control circuit 12 mounted on the control board 10 are supplied to the respective drain driving circuits 6 via wiring on the control substrate 10, the connecting parts 19A, 19B and wiring on the drain circuit boards 16A, 16B.

The two drain circuit boards 16A and 16B are separated from each other as shown in FIG. 1. This is intended to prevent harmful influences caused by thermal expansion which are increased with an increasing length in the x direction of the drain circuit boards 16A, 16B, for example, in FIG. 1 as the size of the liquid crystal display panel 1 is made larger. The output signals from the control circuit 12 on the control board 10 are supplied to corresponding ones of the drain driving circuits 6 via the connecting part 19A of the drain circuit board 16A and the connecting part 19B of the drain circuit board 16B.

Video signals are supplied to the control board 10 from a video signal source 22 by a cable 23 via an interface board 24, and are input to the control circuit 12 mounted on the control board 10.

Incidentally, all of the liquid crystal display panel 1, the gate circuit board 15, the drain circuit boards 16A, 16B, and the control board 10 are depicted as positioned in approximately one plane in FIG. 1, but in actual practice the control board 10 is made approximately perpendicular to the major surface of the liquid crystal display panel 1 by bending the gate circuit board 15 and the drain circuit boards 16A, 16B.

This is intended to reduce border areas of the liquid crystal display device. In this specification, the border areas mean area between the contour of an outer frame of the liquid crystal display device and that of its display area. The reduction of the border areas provides an advantage of increasing the display area for a fixed size of the outer frame of the liquid crystal display device.

Liquid Crystal Display Device Module

Figure 2:
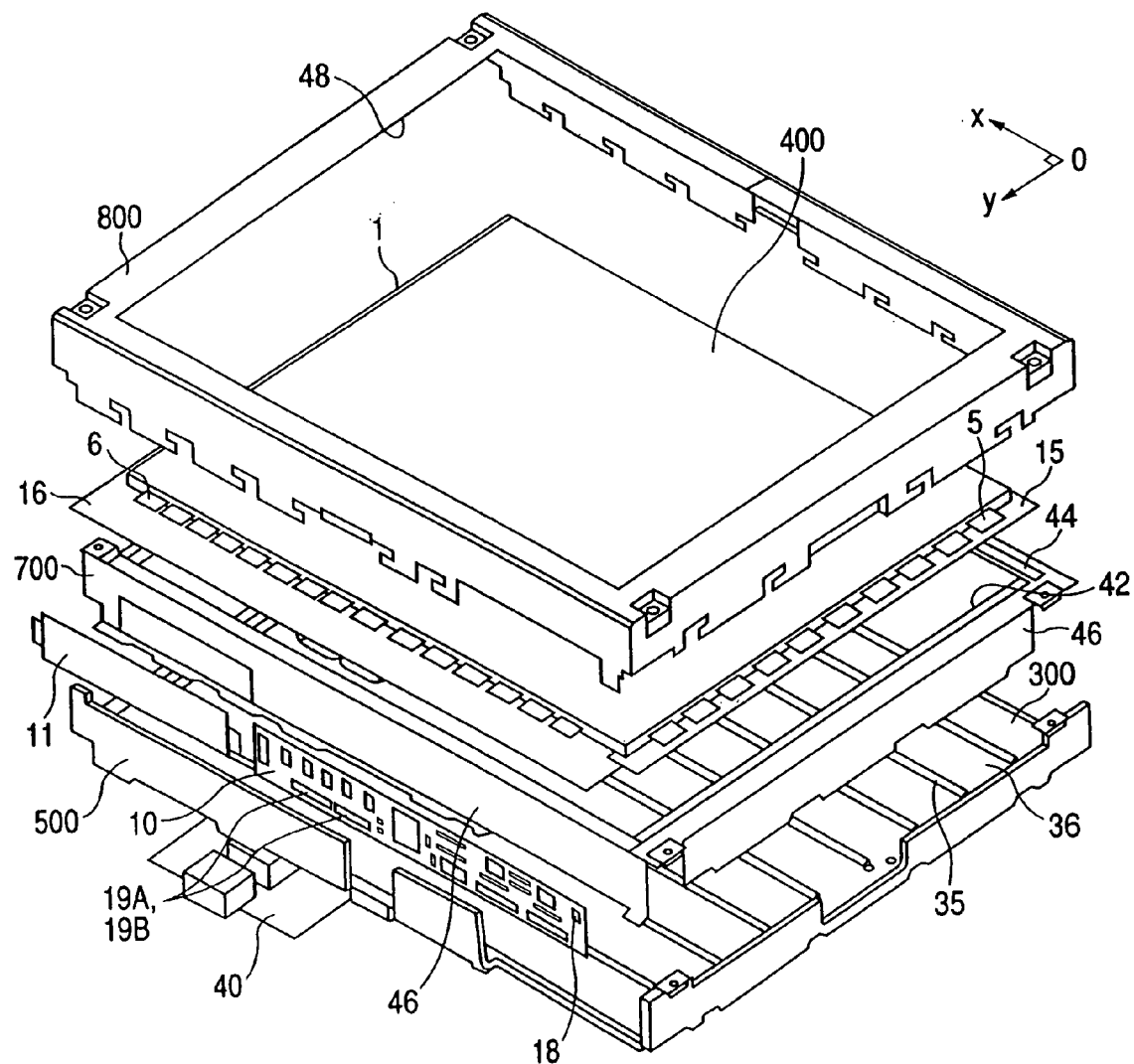
FIG. 2 is an exploded perspective view of an embodiment of the liquid crystal display device in accordance with the present invention.

FIG. 2 is an exploded perspective view of an embodiment of a module of the liquid crystal display device in accordance with the present invention.

The liquid crystal display device of FIG. 2 is roughly divided into a liquid crystal display panel module 400, a backlight unit 300, a resin frame 500, an inner frame 700, an upper frame 800 and others which are assembled as a module.

In this embodiment, a bottom of the resin frame forms a reflective plate which constitutes the backlight unit 300, and therefore it is difficult to distinguish between the backlight unit 300 and the resin frame 500 physically, but it is possible to distinguish between them functionally as explained above.

Next each of the components will be explained.

Liquid Crystal Display Panel Module

The liquid crystal display panel module 400 comprises the liquid crystal display panel 1, the gate driving circuits 5 and the drain driving circuits 6 formed by plural semiconductor ICs and mounted on the periphery of the liquid crystal display panel 1, and the flexible gate circuit board 15 and the flexible drain circuit boards 16A, 16B connected to input terminals of the gate driving circuit 5 and the drain driving circuits 6, respectively.

The output signals from the control board 10 explained in detail subsequently are supplied to the gate driving circuits 5 and the drain driving circuit 6 on the liquid crystal display panel 1 via the gate circuit board 15 and the drain circuit boards 16A, 16B, and then the outputs from the gate and drain driving circuits 5, 6 are supplied to the scanning signal lines 3 and the video signal lines 2 of the liquid crystal display panel 1, respectively.

Figure 3:
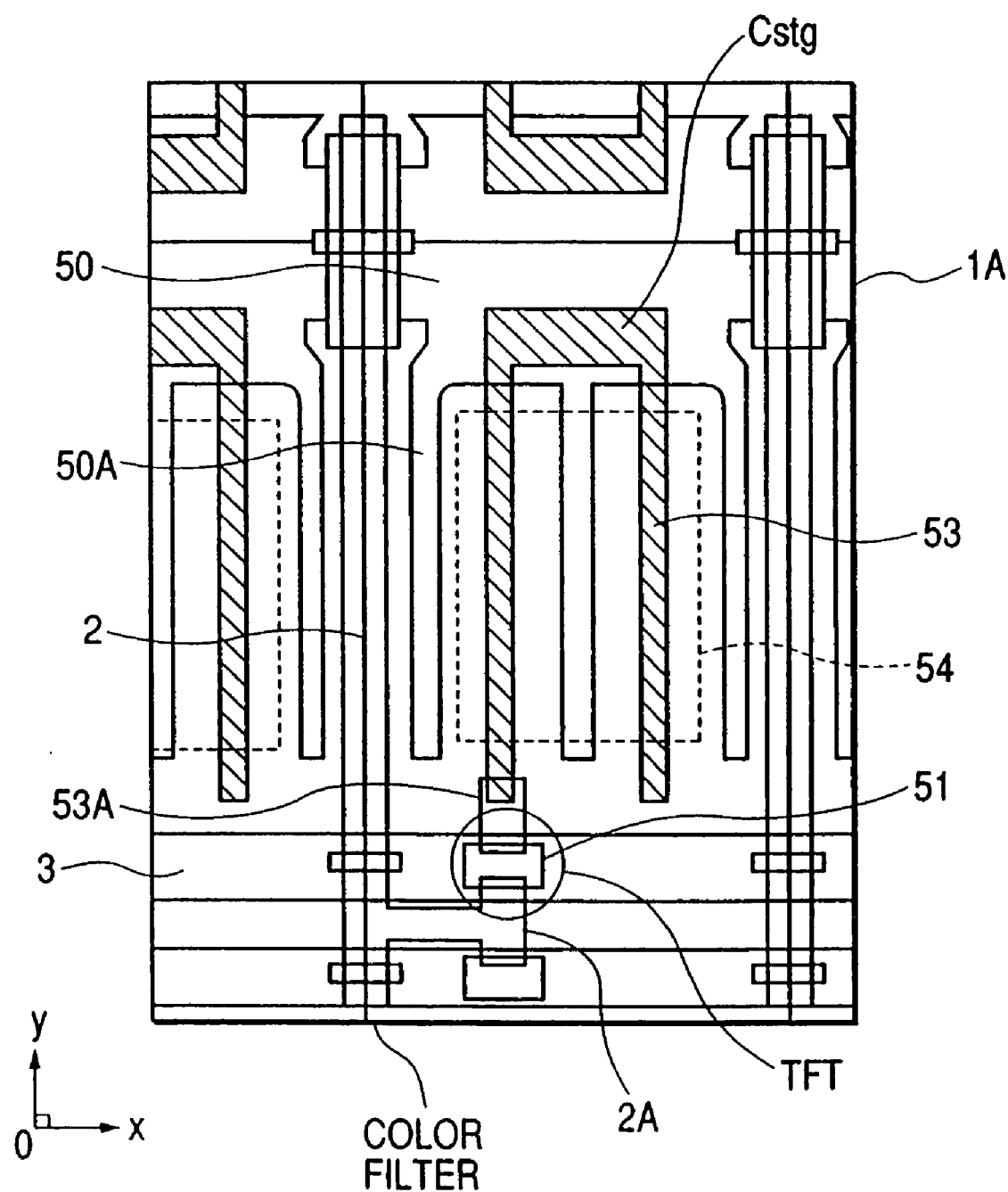
FIG. 3 is a plan view of an embodiment of a pixel in the liquid crystal display device in accordance with the present invention.

The display area of the liquid crystal display panel 1 is formed by a large number of pixels arranged in a matrix fashion, a configuration of one pixel is illustrated in FIG. 3.

In FIG. 3, formed on the major surface of the matrix substrate 1A are the scanning signal line 3 and a counter-voltage signal line 50 extending in the x direction. A region surrounded by the scanning signal line 3, the counter-voltage signal line 50 and the video signal line 2 extending in the y direction which is explained later forms a pixel area.

In this embodiment, the counter-voltage signal line 50 is formed to run between the adjacent scanning signal lines 3, and pixel areas are formed on the positive and negative sides of the counter-voltage signal line 50 along the y direction.

With this arrangement, the number of the counter-voltage signal lines 50 arranged in the y direction was reduced to nearly half of that of the conventional liquid crystal display panel, and therefore the areas having been occupied by the counter-voltage signal lines 50 can be used as the pixel areas and the area of each pixel can be increased.

In each pixel area, equally spaced are, for example, three counter electrodes 50A integrally formed with the counter-voltage signal line 50 and extending in the y direction. The counter electrodes 50A extend to the vicinities of the scanning signal line 3, but are not connected to the scanning signal line 3. The outer two ones of the counter electrodes 50A are disposed adjacently to the video signal lines 2, respectively, and the other one of the counter electrodes 50A is disposed in the center of the pixel area.

The major surface of the transparent substrate 1A having thereon the scanning signal lines 3, the counter-voltage signal lines 50 and the counter electrodes 50A is covered with an insulating film made of silicon nitride, for example, also covering the scanning signal lines 3, the counter-voltage signal lines 50 and the counter electrodes 50A. The insulating film serves as an interlayer insulating film to insulate the video signal lines 2 explained later from the scanning signal lines 3 and the counter-voltage signal lines 50 and also serves as a gate insulating film for a thin film transistor TFT and as a dielectric film for a storage capacity cstg.

First, a semiconductor layer 51 is formed in an area of the surface of the insulating film intended for the thin film transistor TFT. The semiconductor layer 51 is made of amorphous Si, for example, and is overlaid on a portion of the scanning signal line 3 close to the video signal line 2 described later such that a portion of the scanning signal line 3 serves as a gate electrode of the thin film transistor TFT also.

Formed on the surface of the insulating film are the plural video signal lines 2 extending in the y direction and arranged in the x direction. The video signal lines 2 are provided with drain electrodes 2A formed integrally with the video signal lines 2 and extending to a portion of the surface of the semiconductor layer 51 of the thin film transistor TFT.

Further, formed on a surface of the insulating film in the pixel area is a pixel electrode 53 connected to a source electrode 53A of the thin film transistor TFT. The pixel electrode 53 is formed to extend in the middle of the spacing between the adjacent counter-electrodes 50A in the y direction. One end of the pixel electrode 53A serves as a source electrode 53A of the thin film transistor TFT, the pixel electrode 53A extends in the y direction from its one end, then extends in the x direction on the counter-voltage signal line 50, and next extends in the y direction such that the pixel electrodes is generally U-shaped.

A portion of the pixel electrode 53 overlapping the counter-voltage signal line 50 forms a storage capacitance Cstg between the pixel electrode 53 and the counter-voltage signal line 50 using the insulating film as a dielectric film. The storage capacitance provides an effect of storing video information in the pixel electrode 53 for a longer period of time after the thin film transistor TFT is turned off, for example.

The surfaces of the semiconductor film 51 corresponding to interfaces between the film 51 and the drain electrode 2A and between the film 51 and the source electrode 53A of the thin film transistor TFT are doped with phosphorus (P) to form heavily doped layers and thereby to provide ohmic contacts at the drain and source electrodes 2A, 53A. In this case, first the heavily doped layer is formed over the entire area of the surface of the semiconductor layer 51, then the drain and source electrodes 2A, 53A are formed, and then the heavily doped layer in the areas other than the areas corresponding to the electrodes 2A, 53A are etched away by using the electrodes 2A, 53A as masks.

The upper surface of the insulating film having thereon the thin film transistors TFT, the video signal lines 2, the pixel electrodes 53 and the storage capacitance Cstg is coated with a protective film made of silicon nitride, for example, and then an orientation film is formed on the protective film to form the so-called lower substrate of the liquid crystal display panel 1.

Although not shown in FIG. 3, formed on the surface on the liquid crystal layer side of a transparent substrate (a color filter substrate) 1B intended for the upper substrate is a black matrix 54 (an opening of which is indicated by broken lines in FIG. 3) having openings each corresponding to a pixel area.

Color filters are formed to cover the openings in the black matrix 54 made to correspond to the pixel areas. Color filters are arranged such that colors of filters associated with pixels adjacent to each other in the x direction are different from each other and the boundaries between the adjacent filters are positioned on the black matrix 54.

A planarizing film made of resin or the like, for example, is formed on the surface of the substrate 1B having formed thereon the black matrix 54 and the color filters, and then an orientation film is formed on the planarizing film.

Backlight

Returning to FIG. 2, a backlight unit 300 is disposed behind the liquid crystal display panel module 400. This backlight unit 300 is of the so-called downlight type, and as shown in detail in FIG. 4, the backlight unit 300 comprises a plurality (eight in FIG. 4) of line light sources 35 extending in the x direction and arranged at equal intervals in the y direction in FIG. 4 and a reflective plate 36 for reflecting light from the line light sources 35 toward the liquid crystal display panel module 400.

The reflective plate 36 is shaped to be wavy in the direction (the y direction) of the arrangement of the light sources 35. The reflective plate 36 is provided with recesses of the arc-shaped cross-section at positions for disposing the respective light sources 35 and slightly sharp projections disposed between adjacent light sources 35, and this configuration is efficient for directing all the light from the respective light sources 35 toward the liquid crystal display panel module.

The reflective plate 36 is provided with sidepieces 37 at its sides perpendicular to a direction of the length of the light sources 35, and both ends of the respective light sources 35 are fitted in slits 38 formed in the sidepieces 37 for preventing movement of the light sources 35 in the direction of the arrangement of the light sources 35.

Each of the light sources 35 is provided with two electrodes $35c$ and four electrodes $35d$ which are mounted around discharge tubes $35a$, for example. The electrodes $35c$ and $35d$ are disposed at specified intervals in a direction of the axis of the respective discharge tubes $35a$.

Each of the electrodes $35c$ and $35d$ is a ring made of aluminum foil into which the discharge tube $35a$ is inserted.

In this embodiment, means for fixing the electrodes around the discharge tube $35a$ is not employed, therefore positions of the respective electrodes can be adjusted somewhat relative to the discharge tube $35a$ in the direction of the axis of the discharge tube $35a$, and the advantages of this configuration will be explained in detail subsequently.

Electrodes of the light sources 35 corresponding to each other in position in the direction of the axes of the discharge tubes are connected together by conductive wires, and they are grounded or supplied with a voltage. In other words, all the light sources are connected in parallel with each other and are supplied with voltages.

FIG. 5 is a detailed perspective view of one light source 35. In FIG. 5, ground-side electrodes $35d(1)$, $35d(2)$, $35d(3)$ and $35d(4)$ are disposed at approximately the center and both ends of the discharge tube $35a$, and high-voltage side electrodes $35c(1)$ and $35c(2)$ are disposed between the ground-side electrodes.

Figure 4:
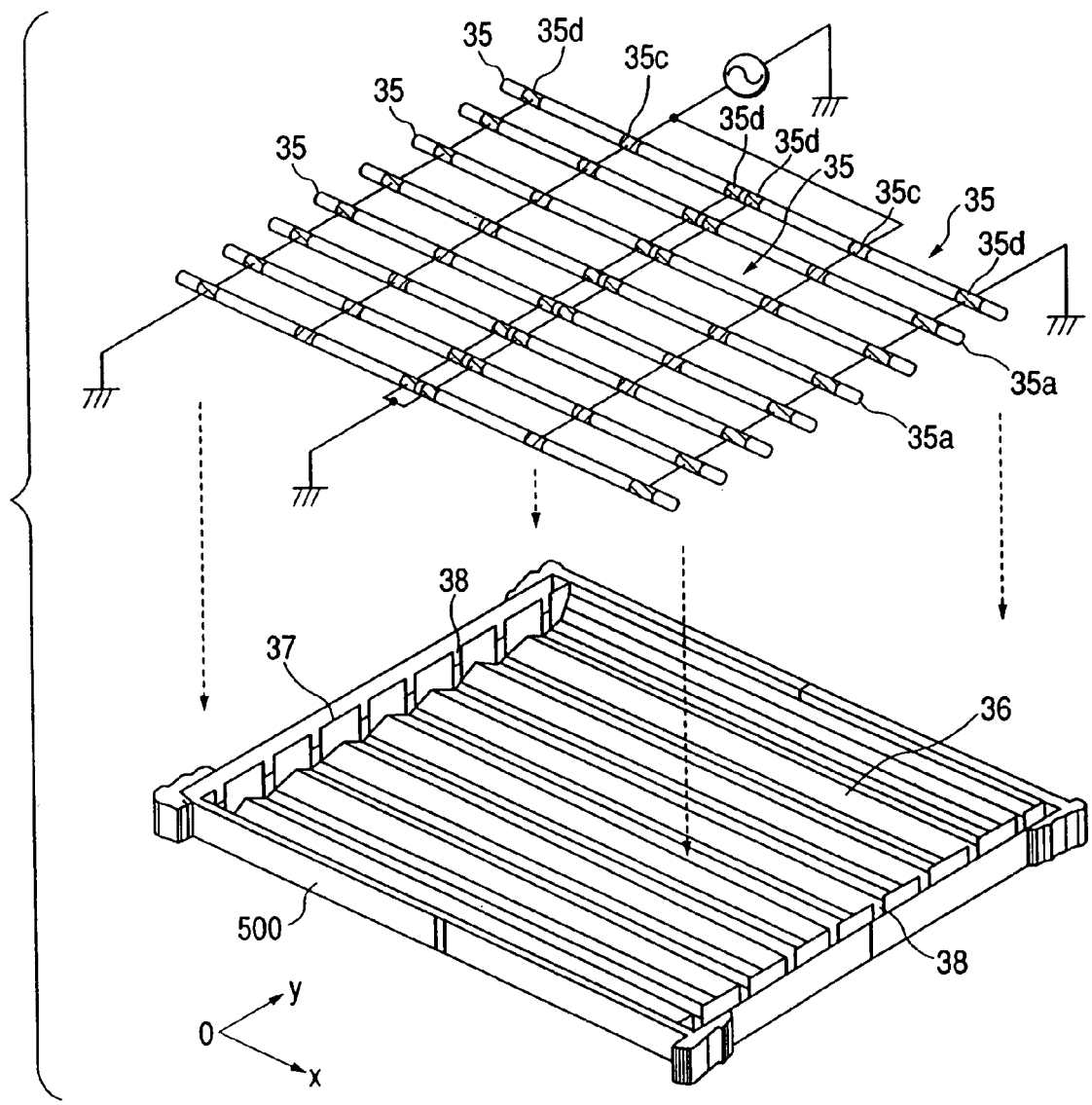
FIG. 4 is an exploded perspective view of an embodiment of a backlight in the liquid crystal display device in accordance with the present invention.

The ground-side electrodes $35d(2)$ and $35d(3)$ disposed at the center of the discharge tube $35a$ are two separate electrodes, they are connected to those corresponding to each other in position via conductive wires, respectively, as shown in FIG. 4, and then the conductive wires connected to the ground-side electrodes $35d(2)$ and $35d(3)$, respectively, are connected together and grounded.

FIG. 6A is a cross-sectional view of the discharge tube $35a$ having no electrodes within the tube, and FIG. 6B is a cross-sectional view of the discharge tube $35a$ taken along line VIB-VIB of FIG. 6A. A phosphor $35q$ is coated on the inner wall of a glass cylinder tube $35p$ (for example, a glass tube of 2.6 mm in outside diameter, 2.0 mm in inside diameter and 390 mm in length) with both ends thereof closed, and a mixture of Ne and 5% of Ar is contained at a pressure of 60 Torr in the glass tube with Hg.

In the light source 35 of this configuration as shown in FIG. 5, application of a high-frequency sinusoidal voltage of several MHz (not lower than 1 MHz) and about 800 Vp-p, for example, to the high-voltage side electrodes $35c(1)$, $35c(2)$ creates discharge within the discharge tube $35a$ which in turn generates ultraviolet rays, and the ultraviolet rays strike the phosphor $35q$ to generate visible light.

Discharge is created between the ground-side electrode $35d(1)$ and the high-voltage side electrode $35c(1)$, between the high-voltage side electrode $35c(1)$ and the ground-side electrode $35d(2)$, between the ground-side electrode $35d(3)$ and the high-voltage side electrode $35c(2)$, and between the high-voltage side electrode $35c(2)$ and the ground-side electrode $35d(4)$, of the discharge tube $35a$.

In this embodiment, disposed at both the ends of the discharge tube $35a$ are the ground-side electrodes $35d(1)$, $35d(4)$, but not the high-voltage side electrodes, and this arrangement improves efficiency of creation of discharge. The reason is that, if the high-voltage side electrodes are disposed at both the ends of the discharge tube $35a$, only high frequency electric fields generated in a space between the high-voltage side electrode and the adjacent ground-side electrode contributes to creation of discharge, but high frequency electric fields generated in a space on the side of the high-voltage side electrode opposite from the adjacent ground-side electrode are not utilized. Arrangement of a pair of the ground-side electrodes $35d(1)$ and $35d(2)$ and a pair of the ground-side electrodes $35d(3)$ and $35d(4)$ on opposite sides of the high-voltage side electrodes $35c(1)$ and $35c(2)$, respectively, can avoid waste of energy, and therefore the ground-side electrodes $35d(1)$ and $35d(2)$ are necessarily arranged at both the ends of the discharge tube $35a$, respectively.

As describe above, the ground-side electrode at disposed at the center of the discharge tube $35a$ comprises the two electrically separated electrodes $35d(2)$ and $35d(3)$. The reason is that, if the ground-side electrode is formed by one electrically unitary electrode, one discharge between the unitary ground-side electrode and one of the two adjacent high-voltage side electrodes $35c$ (1), $35c$ (2) becomes stronger than another discharge between the unitary ground-side and the other of the two adjacent high-voltage side electrodes $35c(1)$, $35c(2)$.

A ground-side electrode to be disposed between two high-voltage side electrode is divided into two ground-side electrodes so as to form two pairs each comprising one of the two ground-side electrodes and one of the high-voltage side electrodes and thereby to produce uniform discharge.

Figure 7A:
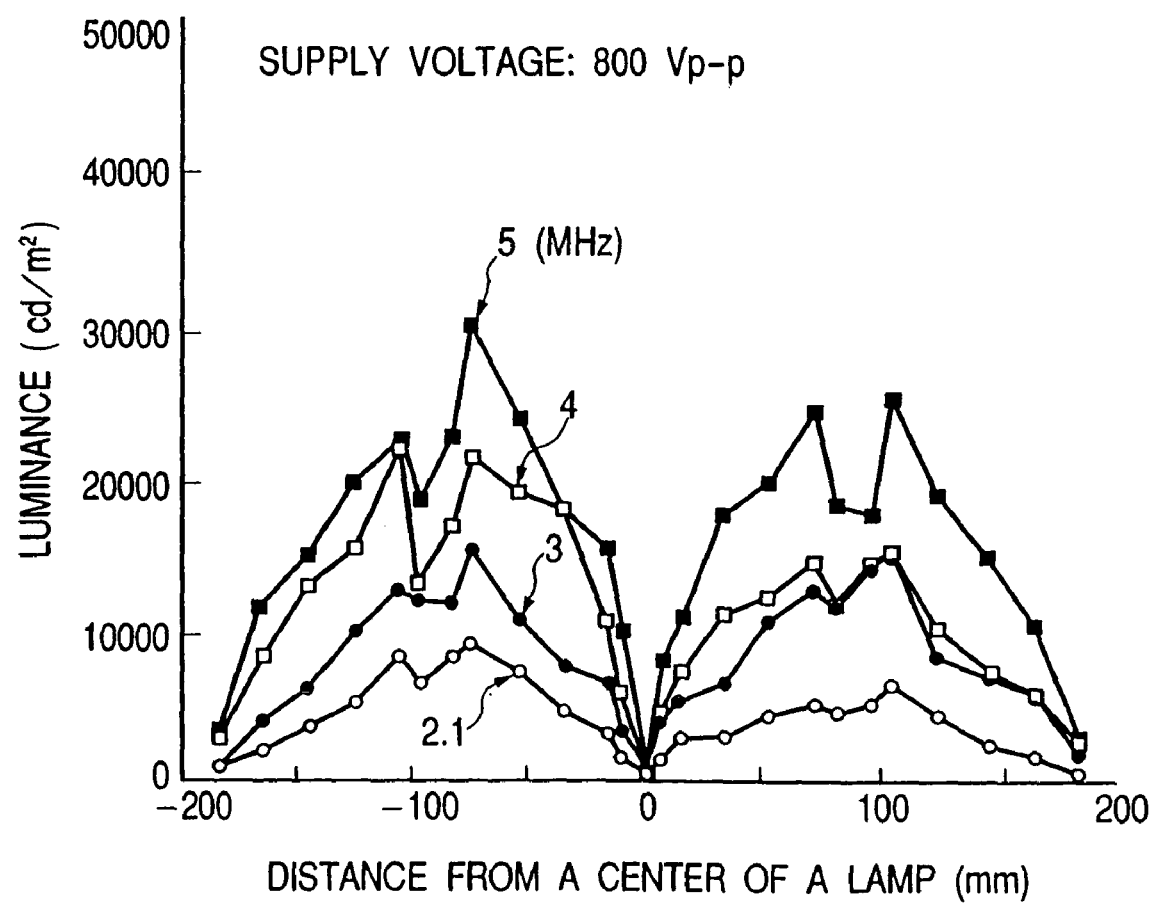
FIGS. 7A, 7B and 7C are luminance distributions of a light source in the liquid crystal display device in accordance with the present invention for supply voltages of 800 Vp-p, 900 Vp-p and 1000 Vp-p, respectively.
Figure 7B:
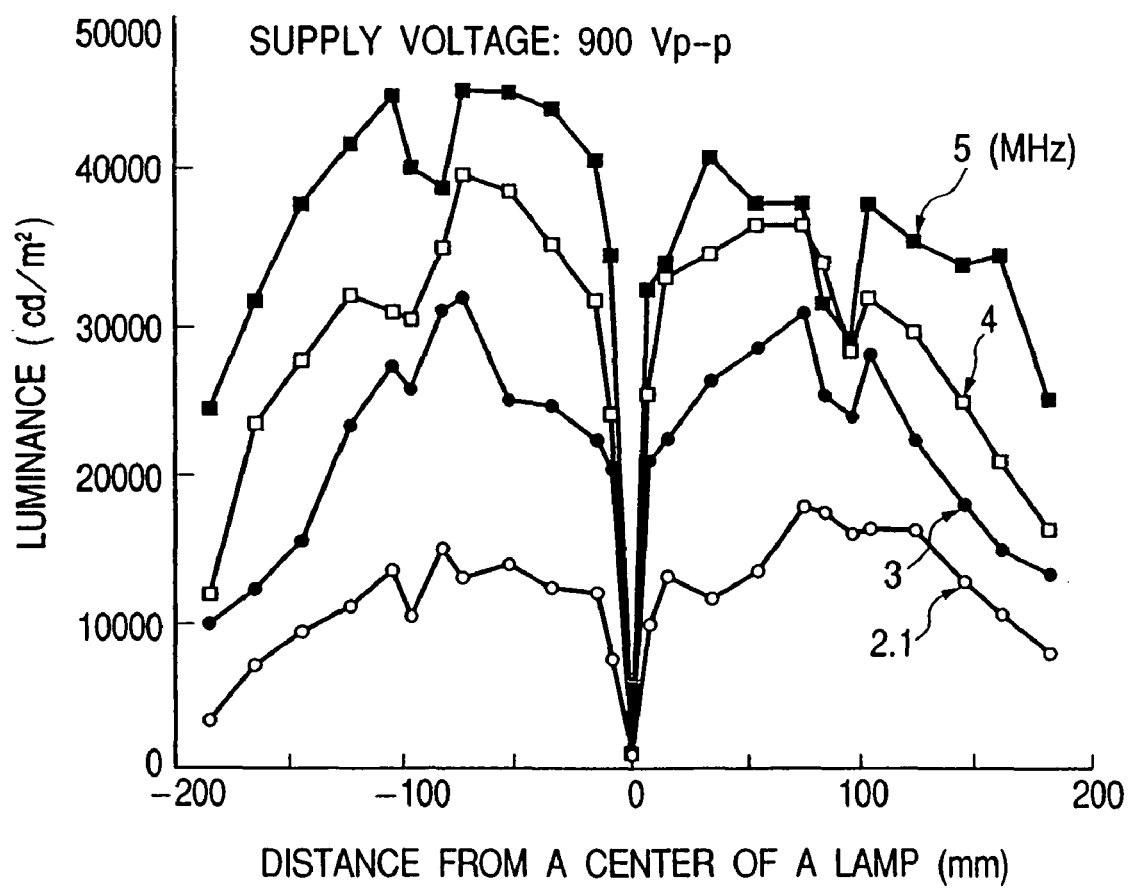
Figure 7C:
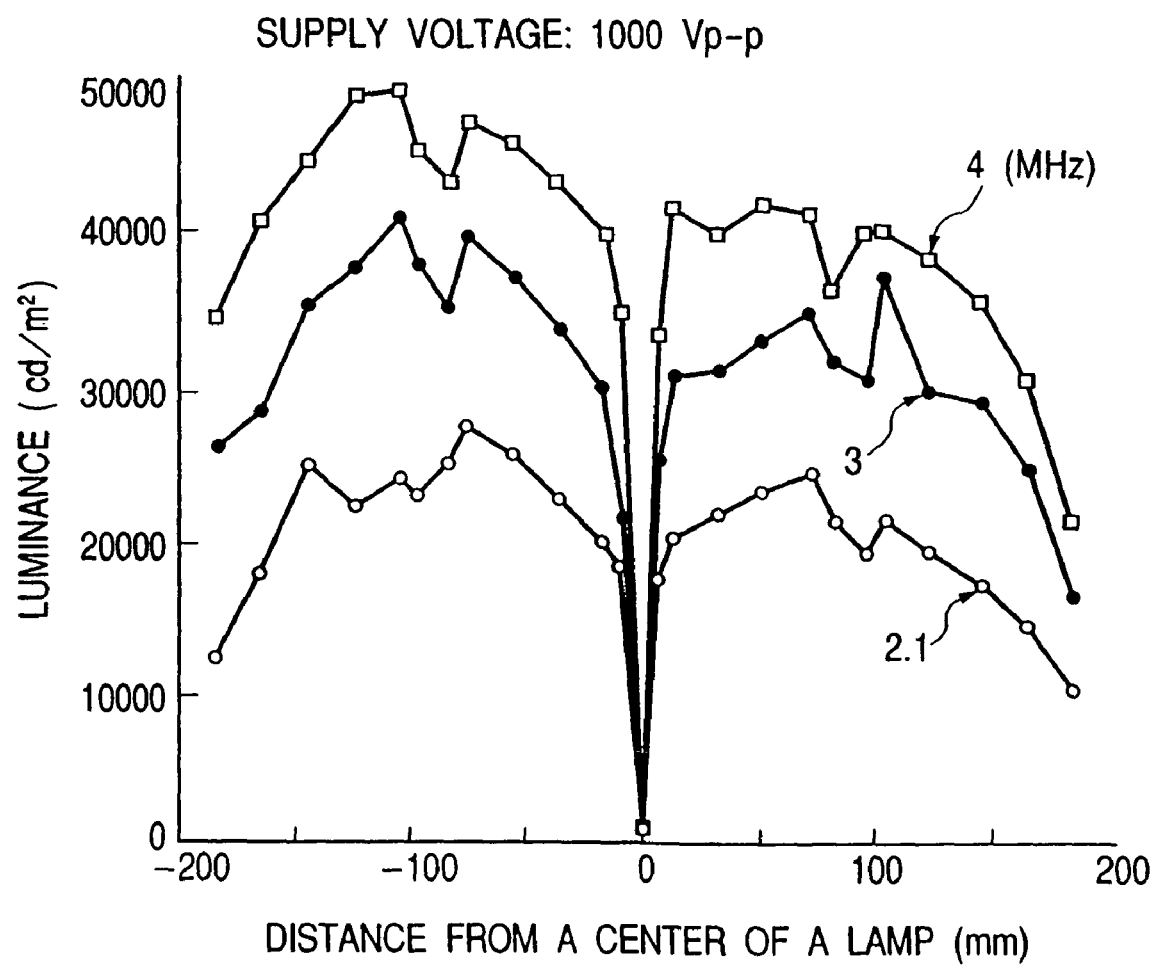

FIGS. 7A-7C are graphs each showing a luminance distribution of the light source 35 of this configuration along its axis. Here the light source 35 is 390 mm long and the electrodes are arranged as shown in FIG. 5. FIGS. 7A, 7B and 7C show luminance distributions of supply voltages of a sinusoidal wave of 800 Vp-p, 900 Vp-p and 1000 Vp-p, respectively. As is apparent from these graphs, the luminance distributions are approximately uniform except in the vicinities of the electrodes.

FIG. 8A is a plan view of the backlight unit 300 of FIG. 2 viewed from its liquid crystal display unit 400 side, and FIG. 8B is a cross-sectional view of the backlight unit 300 taken along line VIIIB-VIIIB of FIG. 8A.

At least in an area of the backlight unit 300 facing the liquid crystal display unit 400, eight light sources 35 extending linearly in the x direction are arranged in the y direction at equal intervals, light from the light sources 35 is directly projected or reflected by the reflective plate 36 toward the liquid crystal display unit 400 such that the backlight unit 300 serves as a planar light source.

Here there is a concern that non-uniformity in luminance may be produced in regions between the adjacent light sources 35 and in regions corresponding to the electrodes mounted around the light sources 35, but this concern is sufficiently eliminated by a diffusing plate 60 interposed between the backlight unit 300 and the liquid crystal display unit 400. Here the diffusing plate 60 can be replaced by any other means for making uniform the illumination on the liquid crystal display panel 1 by the backlight unit 300.

Figure 9:
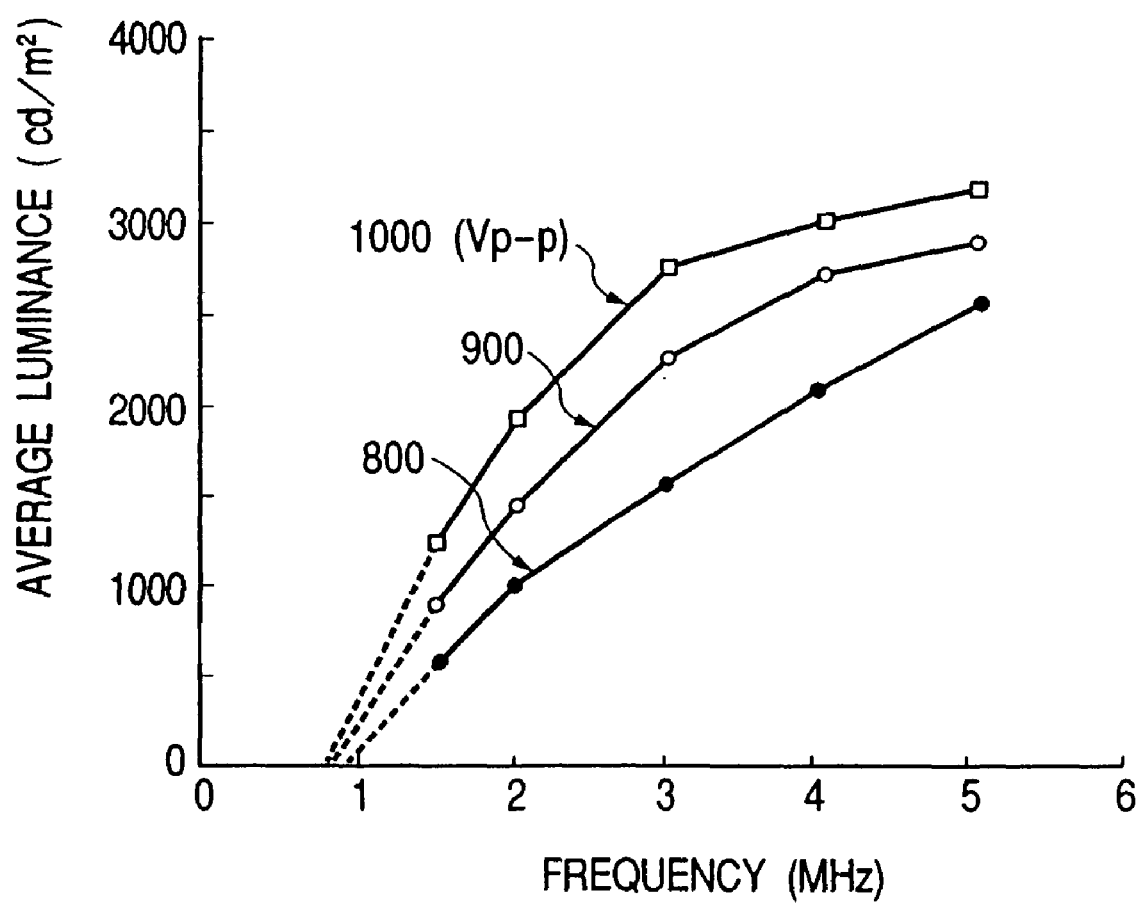
FIG. 9 is a graph showing a relationship between average luminances of a backlight and frequencies of its power source in the liquid crystal display device in accordance with the present invention.

FIG. 9 is a graph showing a relationship between the average luminance and frequencies of the power source when the diffusing plate 60 is employed in the cases shown in FIGS.

7A-7C. As is apparent from this graph, the average luminances increase with increasing frequencies.

In the backlight unit 300 of the above configuration, the electrodes of the light sources 35 are disposed in the vicinities of the outside of the discharge tube, and consequently, no consumption of mercury within the discharge tube due to the electrodes occurs. As a result the lifetime of the light source 35 is lengthened and therefore the lifetime of the liquid crystal display device can be lengthened.

As described above, the ground-side electrodes 35d and the high-voltage side electrodes 35c of the light sources 35 are capable of being moved along the axis of the discharge tube 35a, and consequently, adjustment by moving the electrodes somewhat can be made such that luminances can be made uniform between the high-voltage side electrodes 35c and the ground-side electrodes 35d of the light sources 35, and therefore this provides the backlight unit 300 having a uniformly illuminated area.

Resin Frame

In FIGS. 8A and 8B, the resin frame 500 constitutes a portion of an outer frame of the liquid crystal display device assembled as a module, and houses the backlight unit 300 therein. The resin frame 500 is of the shape of a box having a bottom and four sides, and the top ends of the four sides of the resin frame 500 is configured to mount thereon the diffusing plate 60 which covers the backlight unit 300 (see FIG. 8B).

The diffusing plate 60 has a function of diffusing light from the light sources 35 of the backlight unit 300, and thereby projects light uniform in luminance toward the liquid crystal display panel module 400.

The resin frame 500 is made of relatively thin material, and reduction of its mechanical strength due to its small thickness is reinforced by the inner frame 700 (see FIG. 2) described subsequently. The rear surface of the resin frame 500 is adapted to have attached thereto a high-frequency power source board 40 (an AC/AC inverter board, for example) (see FIG. 2) for supplying a high frequency voltage to the light source 35.

The high-frequency power source board 40 is connected to the high-voltage side electrodes 35c and the ground-side electrodes 35d of the light sources 35.

Figure 10:
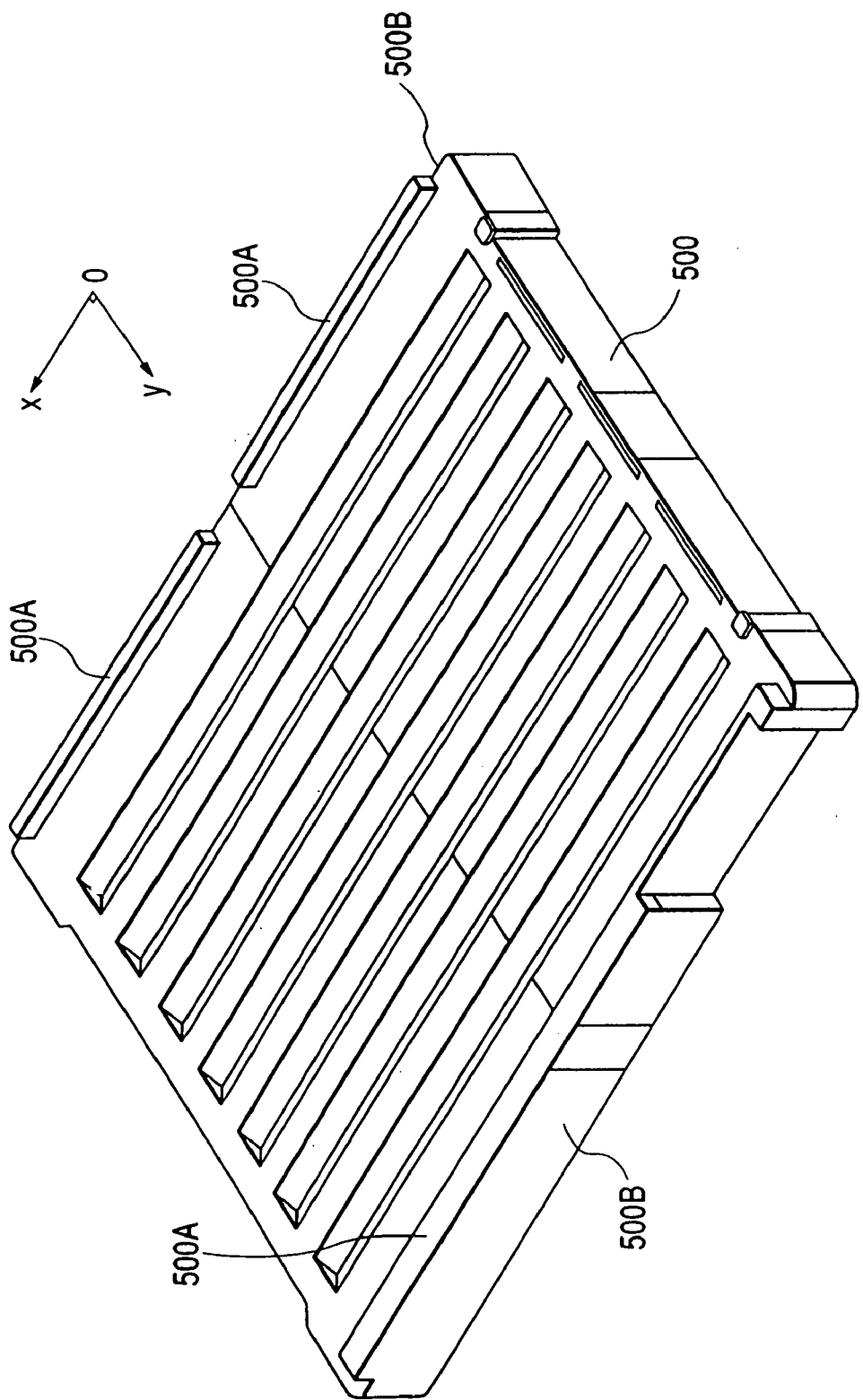
FIG. 10 is a perspective view of an embodiment of a resin frame in the liquid crystal display device in accordance with the present invention.

FIG. 10 is a perspective view of the rear of the resin frame 500, that is, a view of the resin frame 500 as viewed from its side opposite from its side housing the backlight unit 300 therein.

As is apparent from FIG. 10, the resin frame 500 is formed with one or two raised portions 500A extending in the x direction at sides of the resin frame 500 in the x direction in FIG. 10. The resin frame 500 is formed with sidewalls 500B extending toward its rear surface at sides of its outside in the x direction as viewed from its observer's side. The reason is that the sufficient strength of the box-shaped container formed by a combination of the resin frame 500 and the inner frame 700 (described subsequently) is ensured, in addition to the effect of ensuring the strength against twisting of the resin frame 500 about its diagonal.

The height of the raised portions 500A is made greater than that of the high-frequency power source board 40, resulting in a relatively larger size, as is apparent from the subsequent explanation. The control board 10 is disposed closely to the sidewalls 500B to face it with the inner frame 700 interposed therebetween as described above. Consequently, this configuration permits the area of the control board 10 having a complicated circuit configuration to be large enough. The inner frame 700 disposed between the control board 10 and the liquid crystal display panel module 400 provides an advantage of functioning as a shield against electromagnetic waves from the control board 10.

In this embodiment, the raised portions 500A are disposed at the respective sides of the resin frame 500 in the x direction, but it is needless to say that the raised portions 500A can be disposed at the sides of the resin frame 500 in the y direction to obtain the similar advantages.

High-Frequency Power Source Board

Figure 11:
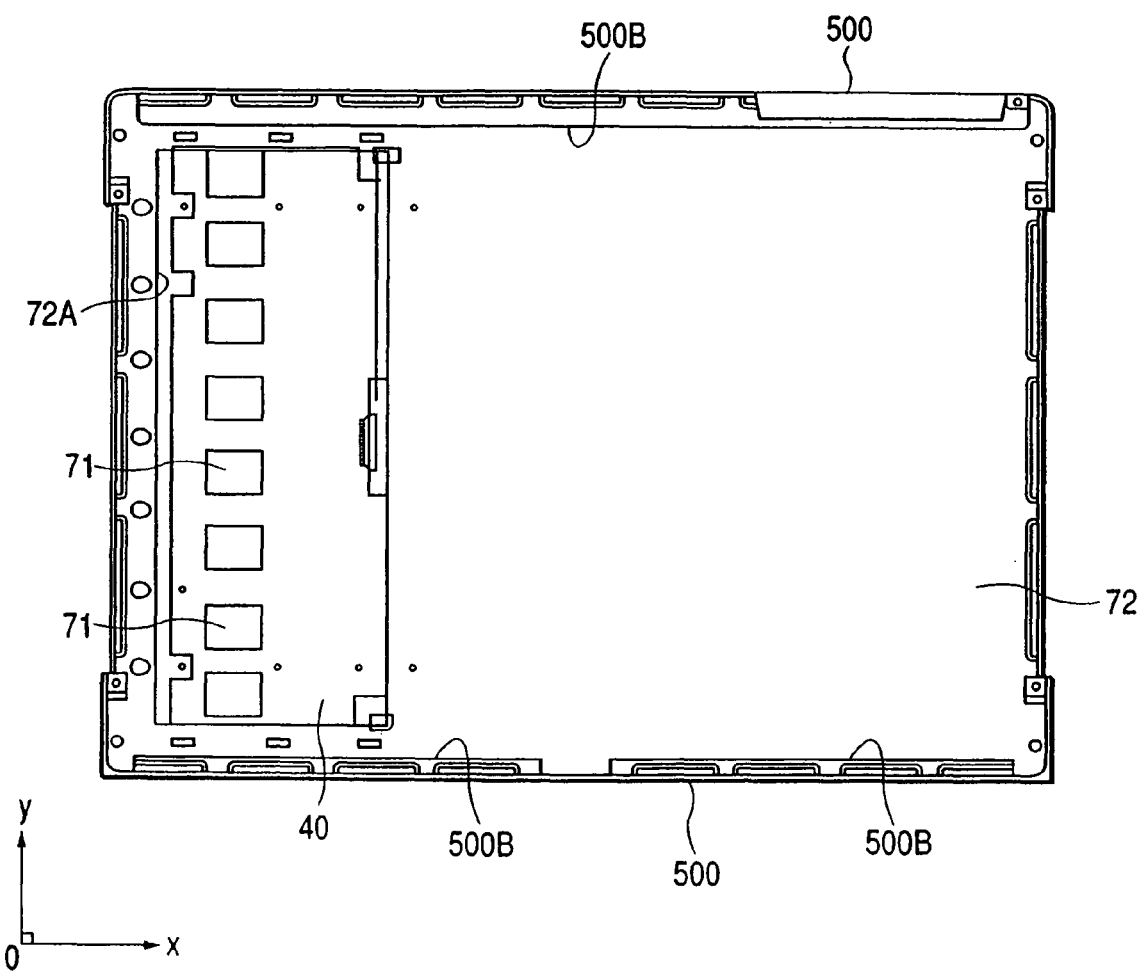
FIG. 11 is an illustration of an embodiment of a high-frequency power source board disposed on the rear surface of the resin frame in the liquid crystal display device in accordance with the present invention.

FIG. 11 is a plan view of the high-frequency power source board 40 disposed on the rear of the resin frame 500.

Mounted on the high-frequency power source board 40 are transformers 71 corresponding to the respective light sources 35 (eight in number in this embodiment) of the backlight unit 300. But the number of the transformers 71 does not always need to correspond to that of the light sources 35. It is needless to say that one transformer can be provided for each of groups each consisting of two, four, or eight of the light sources 35.

The high-frequency power source board 40 is disposed on the resin frame 500 via a shield plate 72 made of metal and attached to the rear of the resin frame 500. The shield plate 72 is formed with an opening 72A in a portion thereof approximately corresponding to a mounting position of the high-frequency power source board 40 so as to prevent eddy currents from being produced in the shield plate 72 by the transformers 71. A wiring layer is formed on the high-frequency power source board 40 and the wiring layer itself has a shielding function.

The height of the thus mounted high-frequency power source board 40 (the DC/AC inverter board) is such that the power source board 40 including parts mounted thereon does not project beyond the raised portions 500A of the resin frame 500 (see FIG. 10). In other words, the height of the raised portions 500A of the resin frame 500 is set to be so sufficient that the power source board 40 including parts mounted thereon does not project beyond the raised portions 500A.

Inner Frame

As shown in FIG. 2, the inner frame 700 is interposed between the liquid crystal display panel module 400 and the diffusing plate (not shown). The inner frame 700 is made of a metal plate of a relatively small thickness and is formed with an opening 42 in area thereof corresponding to the display area of the liquid crystal display panel module 400. The inner frame 700 serves to press the diffusing plate 60 (see FIG. 8B) against the resin frame 500 and to mount thereon the liquid crystal display panel module 400.

The upper surface of the inner frame 700 on which the liquid crystal display panel module 400 is mounted is provided with spacers 44 at portions thereof for positioning the liquid crystal display panel 1, and thereby the liquid crystal display panel 1 is accurately positioned with respect to the inner frame 700.

The inner frame 700 has sidewalls 46 integrally fabricated therewith, that is, is generally box-shaped and is formed with the opening 42 in the bottom of the box-shaped metal.

The inner frame 700 of this shape fits outside the resin frame 500 with the diffusing plate 60 interposed therebetween, that is, the inner surfaces of the sidewalls 46 of the inner frame 700 face the outer surfaces of the sidewalls 500B of the resin frame 500.

The inner frame 700 made of a metal plate forms one frame (one box-shaped frame) in cooperation with the resin frame 500, and consequently, it is capable of improving the mechanical strength of the resin frame 500 without increasing its thickness. Even if the mechanical strength of each of the inner frame 700 and the resin frame 500 is not sufficient, the mechanical strength of a combination of the two is improved by fitting one of the two into the other is improved, especially the strength against the twisting about the diagonal of the box shape is increased. The raised portions 500A in the resin frame 500 increase the strength against the twisting about the diagonal of the box shape. Consequently, the sufficient mechanical strength of the liquid crystal display panel module is ensured without increasing the border areas around its display area. The inner frame 700 of the above configuration itself is made stronger in mechanical strength than an approximately planar inner frame having no sidewalls, and therefore it facilitates handling of the inner frame 700 in earlier stages of assembling the liquid crystal display panel module.

In this embodiment, the control board 10 and a DC/DC inverter board 11 are arranged side by side on one of the sidewalls 46 of the inner frame 700, that is, they are disposed in a plane perpendicular to the major surface of the liquid crystal display panel module 400, thereby reducing the border areas of the liquid crystal display panel module 400.

As shown in FIG. 1, the control board 10 is connected to the flexible gate circuit board 15 and the drain circuit boards 16A, 16B attached to the liquid crystal display panel module 400 via the connecting parts 18, 19A and 19B, respectively, and the above arrangement is obtained by bending the gate circuit board 15 and the drain circuit boards 16A, 16B.

As described, this arrangement prevents electromagnetic waves generated by the control board 10 from influencing the other components by means of the sidewalls 46 of the inner frame 700.

In the above embodiment, the inner frame 700 is explained as box-shaped, but it does not need to be of the shape of the complete box, and it is also sufficient that the inner frame 700 is provided with a sidewall at least one of its four sides. The inner frame of this structure is not planar, but is provided with a bent portion, which improves its mechanical strength.

Upper Frame

In FIG. 2, the upper frame 800 serves to press the liquid crystal display panel module 400, the inner frame 700 and the diffusing plate 60 (see FIG. 8B) against the resin frame 500, and also to form an outer frame of the liquid crystal display panel module 400 in cooperation with the resin frame 500.

The upper frame 800 is made of a metal plate, is generally box-shaped and formed with an opening (a display window) 48 corresponding to the display area of the liquid crystal display panel module 400. The upper frame 800 is fixed to the resin frame 500 by clamping the upper frame 800 to the resin frame 500, for example. The upper frame 800 also serves as a shielding member.

Assembly

Figure 12E:
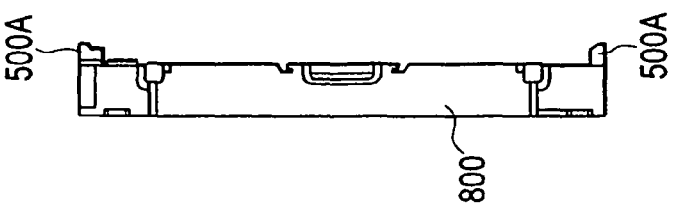
FIG. 12E is a right-side view of the assembly of FIG. 12A.
Figure 12B:
FIG. 12B is a top-side view of the assembly of FIG. 12A.
Figure 12A:
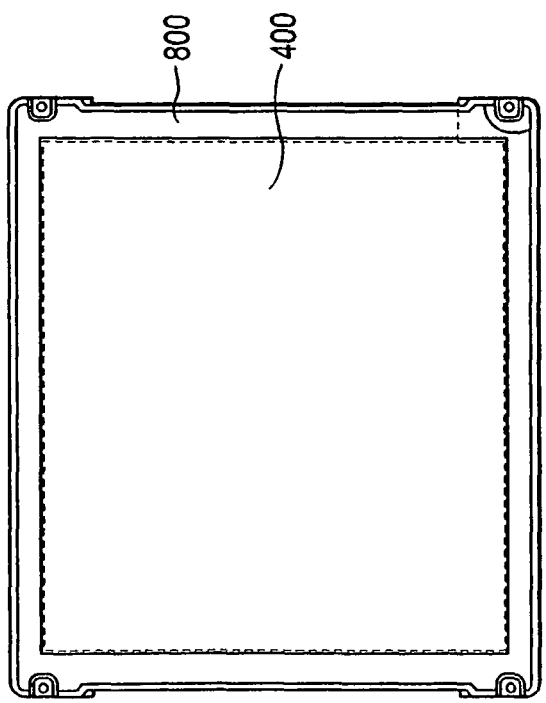
FIG. 12A is a plan view of an assembly of a liquid crystal display device in accordance with the present invention.
Figure 12C:
FIG. 12C is a bottom-side view of the assembly of FIG. 12A.
Figure 12D:
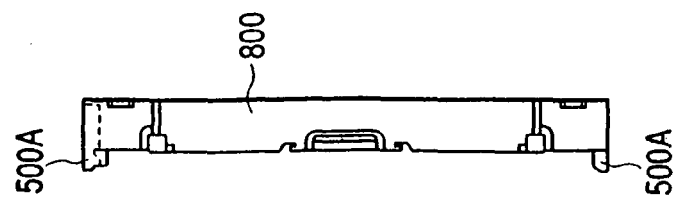
FIG. 12D is a left-side view of the assembly of FIG. 12A.

FIGS. 12A-12E illustrates an assembly comprised of the components shown in FIG. 2, FIG. 12A is a plan view of the assembly as viewed from the upper frame 800 side, FIGS. 12B and 12C are side views of the assembly as viewed from the top and bottom sides of FIG. 12A, respectively, and FIGS. 12D and 12E are side views of the assembly as viewed from the left and right sides of FIG. 12A.

As is apparent from FIGS. 12D and 12E, the high-frequency power source board 40 is disposed on the rear of the resin frame 500 not to project beyond the sides of the upper frame 800, that is, the high-frequency power source board 40 is not observable from the upper frame 800 side.

As is apparent from FIGS. 12D and 12E, the resin frame 500 is generally C-shaped in cross-section due to the presence of its raised portions 500A. The resin frame 500 of this configuration has great strength against twisting of the resin frame 500 about its diagonal as described above.

Embodiment 2

Figure 13:
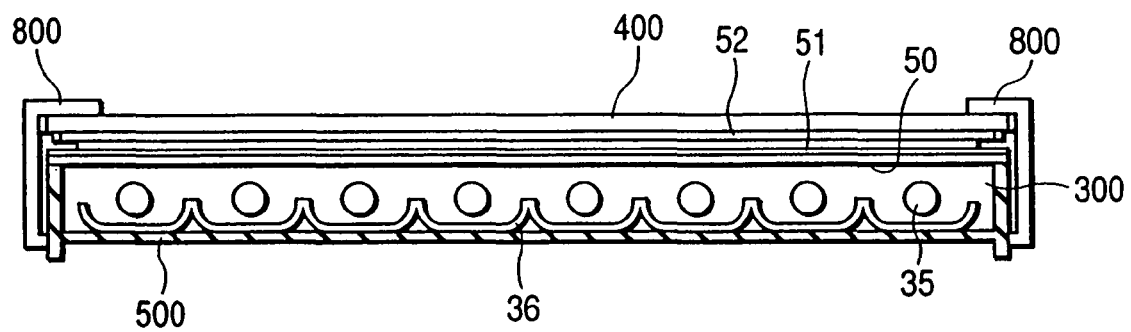
FIG. 13 is a cross-sectional view of another embodiment of the liquid crystal display device in accordance with the present invention.

FIG. 13 is a cross-sectional view of another embodiment of the liquid crystal display device in accordance with the present invention obtained by improving the configuration of Embodiment 1, for example.

FIG. 13 is a cross-sectional view of the liquid crystal display device taken along a line in the y direction (a direction perpendicular to a direction of the length of the light sources 35), and this embodiment is similar to that shown in FIG. 8B.

This embodiment differs from Embodiment 1 in that a diffusing plate 50 is disposed to cover the backlight unit 300 on the liquid crystal display panel unit 400 side of the backlight unit 300, and an electromagnetic shield plate 51 is disposed on the liquid crystal display panel unit 400 side of the diffusing plate 50.

The electromagnetic shield plate 51 serves to shield electromagnetic waves from the light sources 35 of the backlight unit 300, and is made of a transparent conductive sheet or a metal mesh, for example. This configuration prevents disturbances caused by the light sources 35 driven by a high-frequency voltage.

Of course the same advantages can be obtained by forming the reflective plate 36 of the backlight unit 300 with metal and thereby imparting the function of the electromagnetic shield 51 against the light source 35 to the reflective plate 36.

In this embodiment, another diffusing plate 52 is disposed on the liquid crystal display panel unit 400 side of the electromagnetic shield 51 to improve uniformity of illumination on the liquid crystal display panel unit 400 by the backlight unit 300 in cooperation with the diffusing plate 50. The reason is that, as described above, the light sources 35 are provided with plural electrodes spaced in a direction of their length, and do not emit light from their portions at the electrodes, and further there are wires for connecting together positionally corresponding ones of the electrodes of the respective light sources 35, thereby somewhat deteriorating uniformity of illumination.

In FIG. 13, the light source 35 is completely shielded by fabricating the frame 500 with metal and disposing the electromagnetic shield 51 to be in direct contact with the frame 500. The same advantages can be obtained by fabricating the reflective sheet 36 with metal and disposing the electromagnetic shield 51 to be in direct contact with the reflective sheet 36.

Embodiment 3

FIGS. 14A-14C1 are illustrations of modifications of the light sources 35 in the above embodiments.

FIG. 14A illustrates the light source 35 similar to the light sources 35 used in the above embodiments. The electrodes 35c and 35d are ring-shaped, and the discharge tube 35 is inserted into the electrodes 35c and 35d. FIG. 14A1 is a cross-sectional view of the light source 35 taken along line XIVA1-XIVA1 of FIG. 14A.

On the other hand, in FIG. 14B, the electrodes 35C, 35d are fabricated to surround partially around the circumference of the discharge tube 35a. This configuration of the electrodes 35c, 35d also makes the light source 35 function properly. FIG. 14B1 is a cross-sectional view of the light source 35 taken along line XIVB1-XIVB1 of FIG. 14B.

In FIG. 14C, the electrodes 35c, 35d are ring-shaped as in the case of FIG. 14A, but a large spacing is provided between the respective electrodes 35c, 35d and the discharge tube 35a. This configuration of the electrodes 35c, 35d also makes the light source 35 function properly. FIG. 14C1 is a cross-sectional view of the light source 35 taken along line XIVC1-XIVC1 of FIG. 14C.

Embodiment 4

FIGS. 15A-15D and FIGS. 16A-16D are illustrations of modifications of the arrangement of the electrodes 35c, 35d of the light sources 35 in the above embodiments.

Figure 15A:
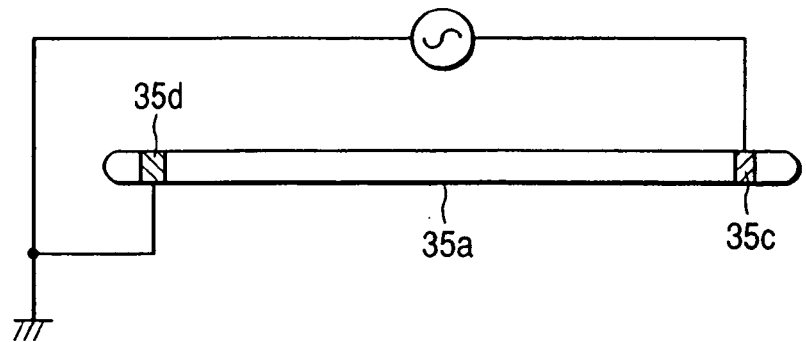
FIG. 15A is an illustration for explaining another embodiment of a light source in the liquid crystal display device in accordance with the present invention.

In FIG. 15A, the ground-side electrode 35d and the high-voltage side electrode 35c are at one end and at the other end of the discharge tube 35a, respectively. Although the discharge tube 35a is limited somewhat in length, an increase in a supply voltage can make the light source 35 function sufficiently.

Figure 15B:
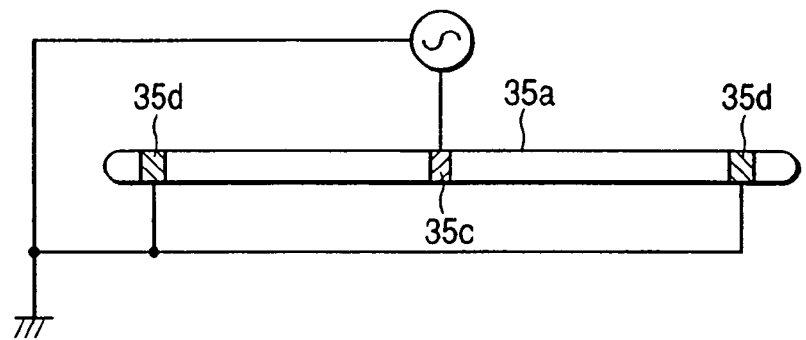
FIG. 15B is an illustration for explaining still another embodiment of a light source in the liquid crystal display device in accordance with the present invention.

In FIG. 15B, the high-voltage side electrode 35c is disposed at the center of the discharge tube 35a, and the ground-side electrodes 35d are disposed at both ends of the discharge tube 35a.

Figure 15C:
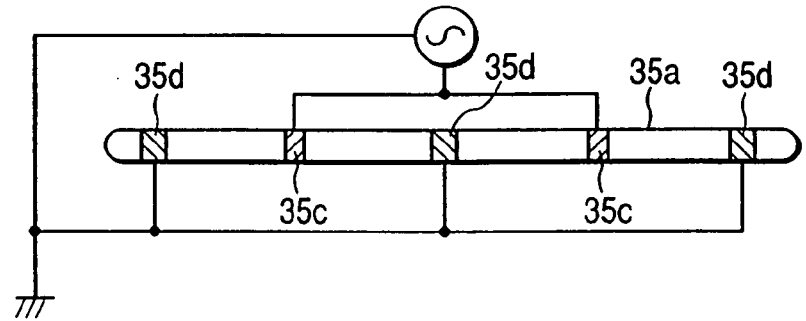
FIG. 15C is an illustration for explaining still another embodiment of a light source in the liquid crystal display device in accordance with the present invention.

In FIG. 15C, the ground-side electrodes 35d are disposed at the center and both ends of the discharge tube 35a, and the two high-voltage side electrodes 35c are disposed between the ground-side electrodes 35d, respectively.

Figure 15D:
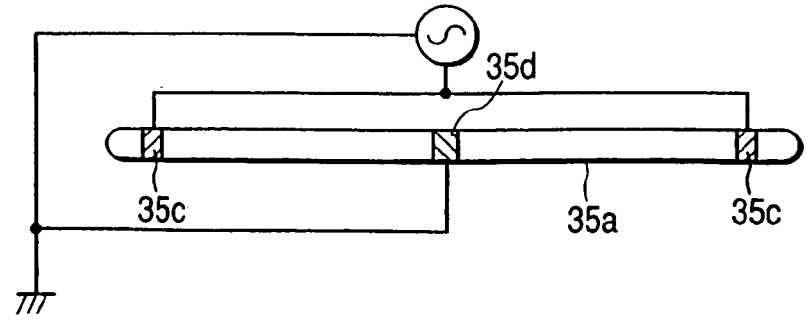
FIG. 15D is an illustration for explaining still another embodiment of a light source in the liquid crystal display device in accordance with the present invention.

In FIG. 15D, the ground-side electrode 35d is disposed at the center of the discharge tube 35a, and the high-voltage side electrodes 35c are disposed at both ends of the discharge tube 35c.

Figure 16A:
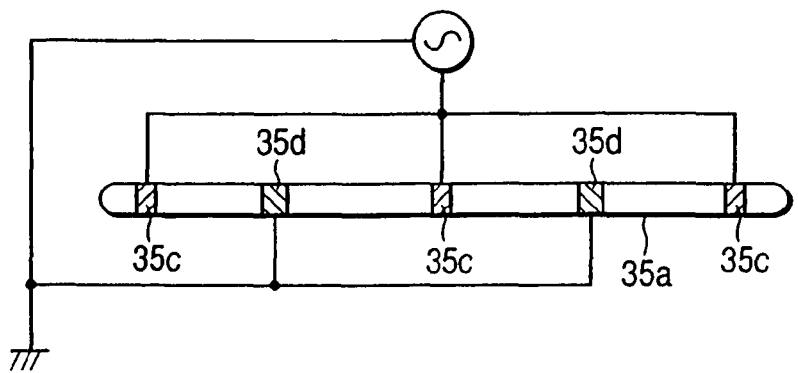
FIG. 16A is an illustration for explaining another embodiment of a light source in the liquid crystal display device in accordance with the present invention.

In FIG. 16A, the high-voltage side electrodes 35c are disposed at the center and both ends of the discharge tube 35a, and the ground-side electrodes 35d are disposed between the high-voltage side electrodes 35c.

Figure 16B:
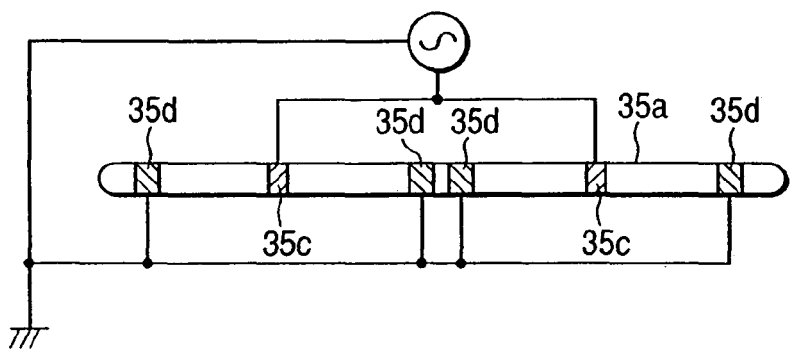
FIG. 16B is an illustration for explaining still another embodiment of a light source in the liquid crystal display device in accordance with the present invention.

In FIG. 16B, the ground-side electrodes 35d are disposed at the center and both ends of the discharge tube 35a, and the high-voltage side electrodes 35c are disposed between the ground-side electrodes 35d. The ground-side electrode at the center of the discharge tube 35a is divided into two ground-side electrodes 35d, and this arrangement is the same as that shown in FIG. 5.

Figure 16C:
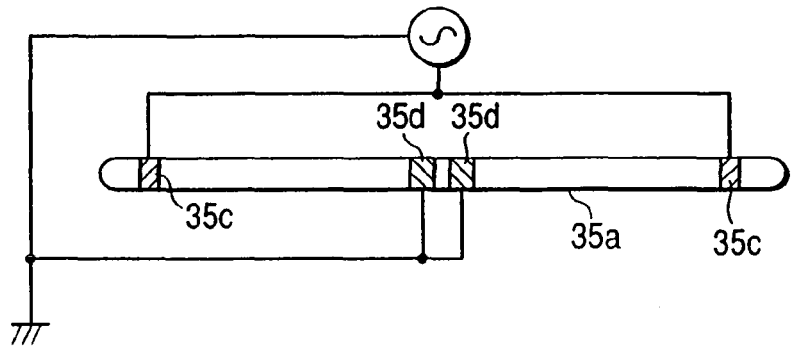
FIG. 16C is an illustration for explaining still another embodiment of a light source in the liquid crystal display device in accordance with the present invention.

In FIG. 16C, the ground-side electrode is disposed at the center of the discharge tube 35a, and the high-voltage side electrodes 35c are disposed at both ends of the discharge tube 35a. The ground-side electrode at the center of the discharge tube 35a is divided into two ground-side electrodes 35d.

Figure 16D:
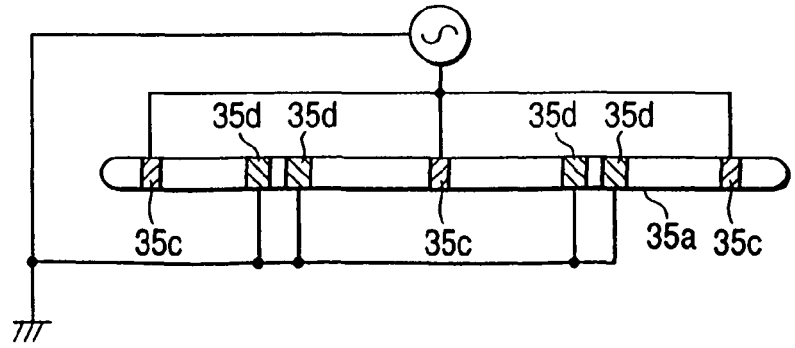
FIG. 16D is an illustration for explaining still another embodiment of a light source in the liquid crystal display device in accordance with the present invention.

In FIG. 16D, the high-voltage side electrodes 35c are disposed at the center and both ends of the discharge tube 35a, and the ground-side electrodes are disposed between the high-voltage side electrodes 35c. The ground-side electrodes are divided into two ground-side electrodes 35d.

As is apparent from the above modifications, at least one pair of a ground-side electrode 35d and a high-voltage side electrode 35c is provided, the discharge tube 35a between these electrodes creates a sufficient discharge and thereby functions as the light source 35.

The optimum number of the electrodes to be arranged can be selected depending upon the length of the discharge tube or the supply voltage from the power source.

Embodiment 5

Figure 17A:
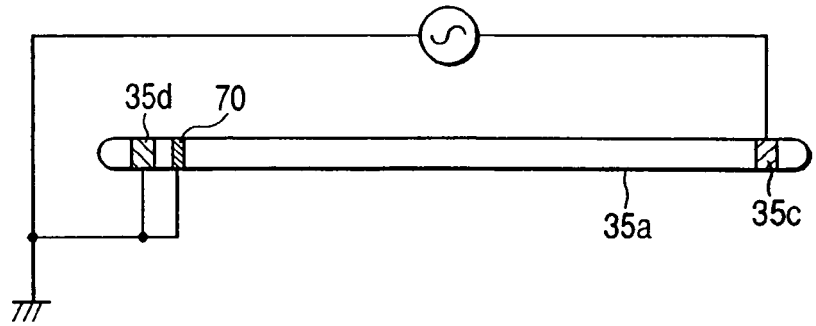
FIG. 17A is an illustration for explaining another embodiment of a light source in the liquid crystal display device in accordance with the present invention.
Figure 17B:
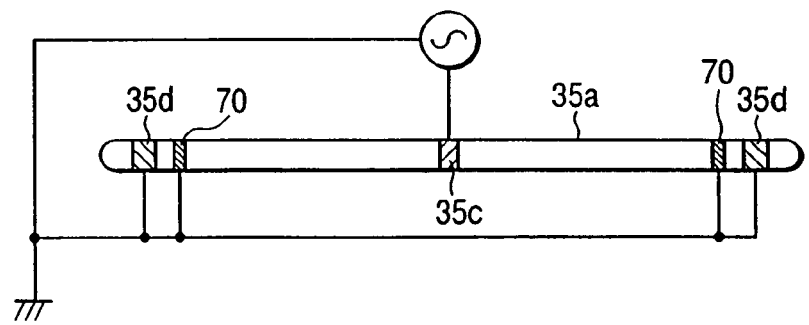
FIG. 17B is an illustration for explaining still another embodiment of a light source in the liquid crystal display device in accordance with the present invention.
Figure 17C:
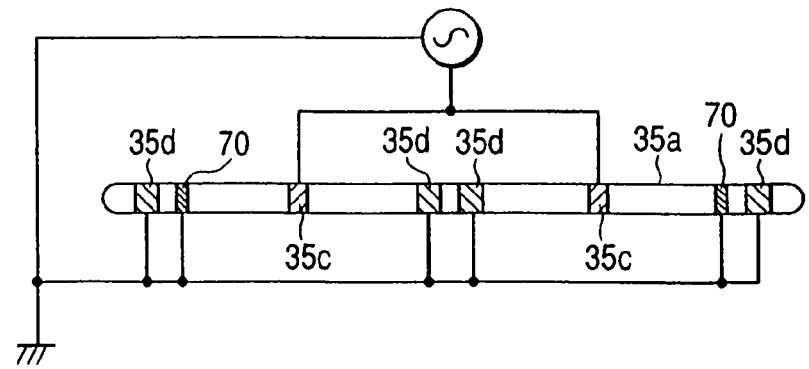
FIG. 17C is an illustration for explaining still another embodiment of a light source in the liquid crystal display device in accordance with the present invention.

FIGS. 17A-17C are illustrations of other embodiments of the ground-side electrodes of the light source 35 in the above embodiments. For example, the embodiments of FIGS. 17A, 17B and 17C are similar to those shown in FIGS. 15A, 15B and 16B, respectively.

Each of the ground-side electrodes 35d disposed at ends of the discharge tube 35a in FIGS. 17A-17C is provided with an auxiliary electrode 70 disposed on its side facing the high-voltage side electrode 35c. The width of the auxiliary electrodes 70 is smaller than that of the ground-side electrode 35d.

Consider a case in which the auxiliary electrode 70 is not present. Then luminance generated by a discharge between the ground-side electrode 35d and the high-voltage side electrode 35c is sometimes graded along the axis of the discharge tube 35a. It was confirmed that provision of the auxiliary electrode 70 made uniform the luminance between the ground-side electrode 35d and the high-voltage side electrode 35c.

In FIGS. 17A-17C, one auxiliary electrode 70 is provided to one ground-side electrodes 35d, but it is needless to say that two or more auxiliary electrodes can be provided to one ground-side electrode 35d. The auxiliary electrodes 70 can be configured such that their positions can be finely adjusted with respect to their adjacent ground-side electrodes 35d along the axis of the discharge tube 35a so as to improve uniformity of discharge.

Embodiment 6

Figure 18:
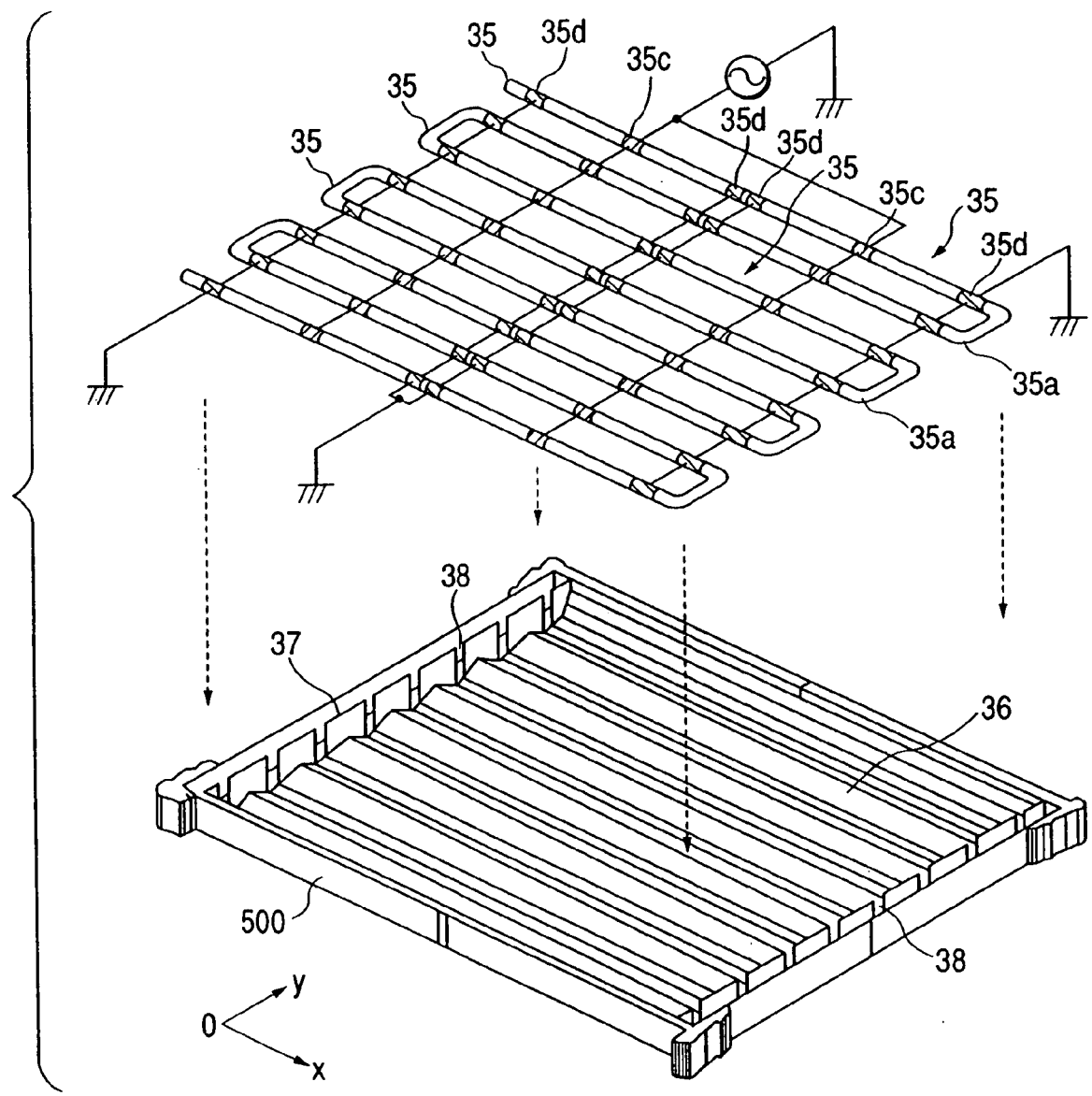
FIG. 18 is an illustration for explaining another embodiment of a light source in the liquid crystal display device in accordance with the present invention.

FIG. 18 illustrates another embodiment of the liquid crystal display device in accordance with the present invention, and this embodiment is similar to that shown in FIG. 4.

A difference in configuration between FIG. 18 and FIG. 4 is in the discharge tube 35a. The discharge tube 35a is of the shape of a single continuous folded line which comprises plural linear tubular portions and plural bend portions for connecting ends of adjacent ones of the plural linear tubular portions, and forms a planar area light source facing the display area of the liquid crystal display panel.

Although the bend portions are present in the discharge tube 35a, the folded-line discharge tube 35a provides an advantage of facilitating its fabrication and assembling if the number of the bend portions is small.

Figure 19:
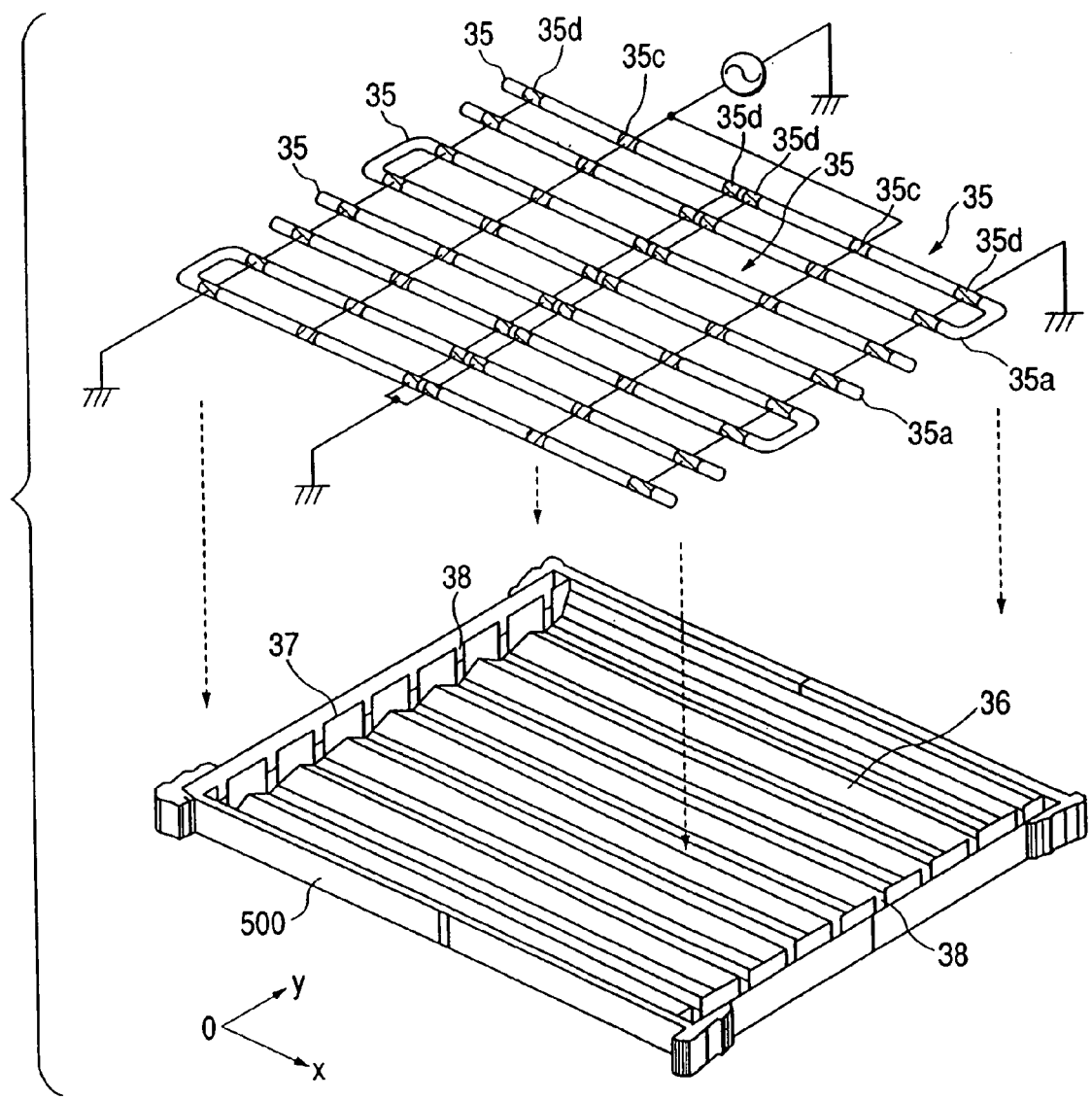
FIG. 19 is an illustration for explaining another embodiment of a light source in the liquid crystal display device in accordance with the present invention.

For the same purpose, for example, as shown in FIG. 19, the light source 35 can be made up of plural (four in FIG. 9) folded-line discharge tubes 35a arranged side by side to form a planar area light source. In this example also, the above-described structure and arrangement of the electrodes 35c, 35d are equally applicable.

In the above embodiments, no special restrictions are imposed on the frequency of the high-frequency voltage supplied to the high-voltage side electrodes 35c. The following embodiments are configurations advantageous in cases where the frequency of the high-frequency voltage is equal to or higher than 1 MHz. But in the following embodiments, the frequency of the high-frequency voltage supplied to the high-voltage side electrodes 35c does not need to be equal to or higher than 1 MHz.

Figure 20A:
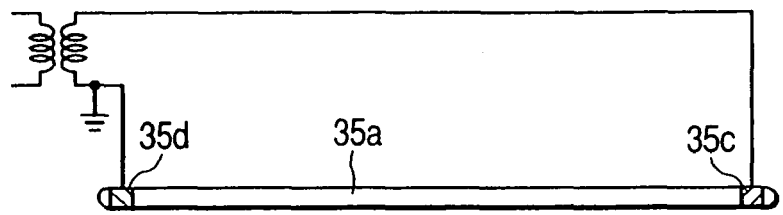
FIG. 20A is an illustration for explaining driving of a light source in the liquid crystal display device in accordance with the present invention.
Figure 20B:
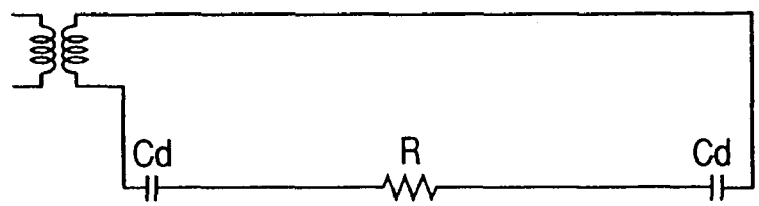
FIG. 20B is an equivalent circuit of the driving.

When the frequency of the high-frequency voltage supplied to the high-voltage side electrode 35c is equal to or higher than 1 MHz, as shown in an equivalent circuit of FIG. 20B for a configuration of FIG. 20A, for example, voltage drops due to capacitances Cd formed by the glass and the phosphor of the discharge tube 35a are reduced, and consequently, the supply voltage can be effectively applied across the light-generating portion of the discharge tube 35a.

Figure 21:
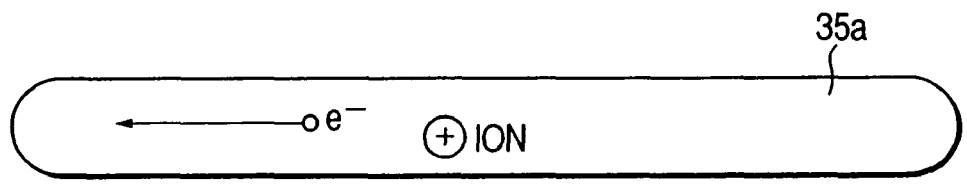
FIG. 21 is an illustration for explaining behaviors of positive ions and electrons within a light source in the liquid crystal display device in accordance with the present invention.

The high-frequency voltage of a frequency equal to or higher than 1 MHz can raise the electron temperature of the light-generating portion. As shown in FIG. 21, within the discharge tube 35a, positive ions can hardly follow the high-frequency electric fields because of their greater mass, and therefore the energy of the electric fields can be efficiently converted into the kinetic energy of electrons e. Consequently, the average kinetic energy of the electrons e increases, the probability of exciting mercury within the discharge tube 35a, and thereby the luminance of the discharge tube 35a is improved.

It is known that it is necessary to ensure a specified density of charged particles in the discharge space so as to maintain the discharge within the discharge tube 35a. If the discharge tube 35a is driven at a lower frequency, charged particles within the discharge tube 35a are easily consumed by the electrodes, and therefore it is necessary that a portion serving as a cathode emits a large number of secondary electrons. This emission of the secondary electrons requires a large amount of energy, and causes a cathode voltage drop, resulting in deterioration of luminous efficacy.

In the case of the driving at a frequency equal to or higher than 1 MHz, the charged particles are captured within the discharge tube 35a, and this makes it difficult for the charged particles to reach the portions serving as a cathode and an anode, and reduces the required amount of secondary electrons, thereby reducing the cathode voltage drop, and consequently, low-voltage driving of the discharge tube 35a is realized and the luminous efficacy of the discharge tube 35a is improved.

Figure 22:
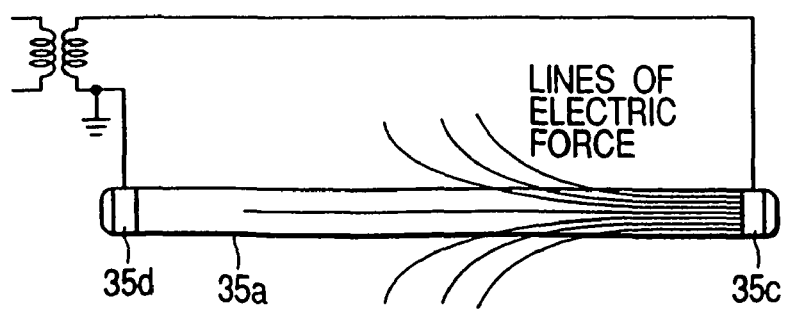
FIG. 22 is an illustration for explaining occurrence of leakage of lines of electric force in a light source in the liquid crystal display device in accordance with the present invention.

In view of the above, it is preferable for the backlight of the liquid crystal display device to select the frequency of the high-frequency voltage for the discharge tube 35a to be at least 1 MHz, because the liquid crystal display devices are required to reduce its power consumption and to improve uniformity of the luminance. However, it was confirmed that, as shown in FIG. 22, lines of electric force from the electrode 35c at one end of the discharge tube 35a do not terminate on the other electrode 35d at the other end of the discharge tube 35a, but leak out at the center of the discharge tube 35a, and consequently, a problem arises in that uniformity in luminance is not ensured.

The following embodiments are capable of reducing at least the leakage of the lines of electric force and provide an advantage of improving uniformity in luminance.

Embodiment 7

Figure 23A:
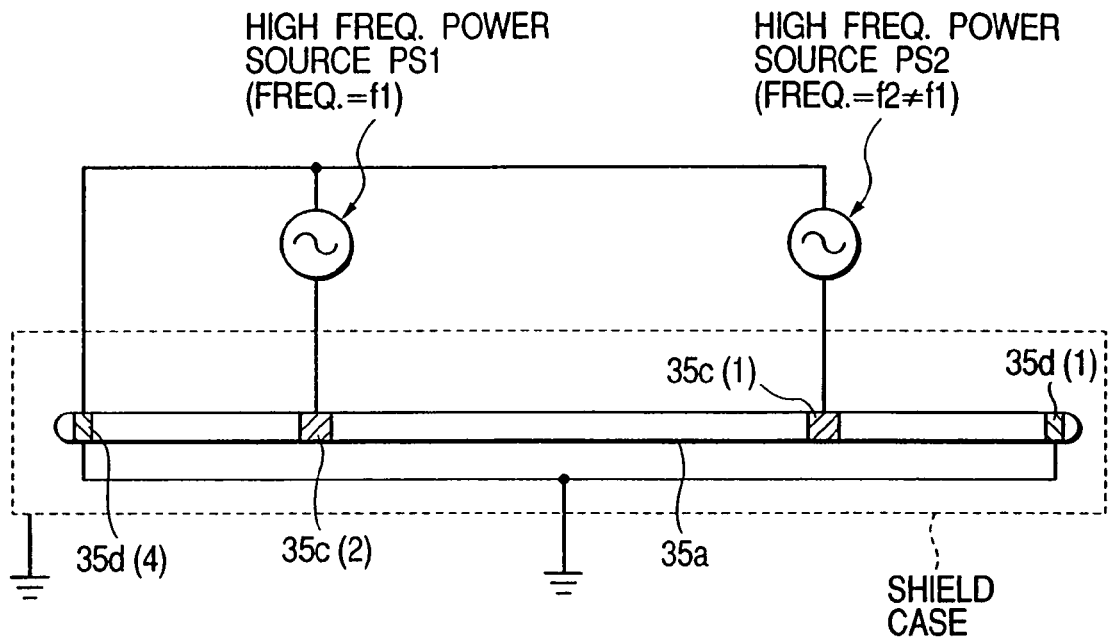
FIG. 23A is an illustration for explaining another embodiment of a light source, treated as one discharge tube, in the liquid crystal display device in accordance with the present invention.

FIG. 23A is an illustration of another embodiment of the liquid crystal display device in accordance with the present invention, and this embodiment is similar to that shown in FIG. 5. This embodiment differs from that shown in FIG. 5, in that the ground-side electrodes 35d(2) and 35d(3) at the center of the discharge tube 35a are eliminated, the high-voltage side electrode 35c(1) is supplied with a high-frequency voltage of a frequency f1 from the high-frequency power source PS1, and the other high-voltage side electrode 35c(2) is supplied with a high-frequency voltage of a frequency f2 (.noteq.f1) from the high-frequency power source PS2.

In this embodiment, for example, the high-frequency voltage from the high-frequency power source PS1 is 860 Vp-p and 5.1 MHz, and the high-frequency voltage from the high-frequency power source PS2 is 700 Vp-p and 5.25 MHz.

Figure 23B:
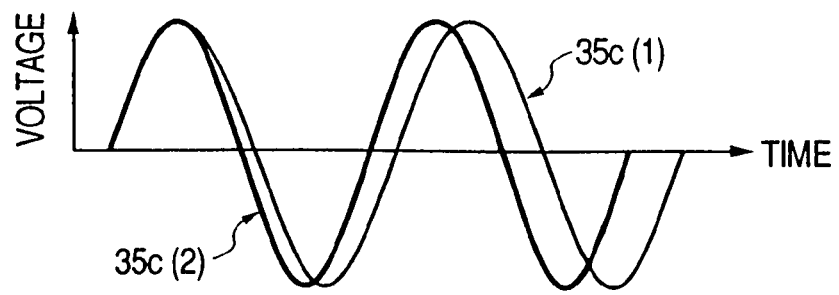
FIG. 23B shows waveforms of associated driving voltages.

FIG. 23B shows a relationship in waveform between the high-frequency voltages supplied to the high-voltage side electrodes 35c(1) and 35c(2).

By supplying the two high-frequency voltages having the above waveform relationship to the respective high-voltage side electrodes 35c, a voltage difference between the electrodes is made approximately uniform with passage of time, and the amount of leakage of lines of electric force is reduced. If the two voltages in phase with each other are applied to the respective electrodes, the electric field at the centers of the respective electrodes is reduced, and thereby reduction of luminance at the centers is prevented.

It was confirmed that the above phenomenon is also applicable in the following embodiments.

Figure 24A:
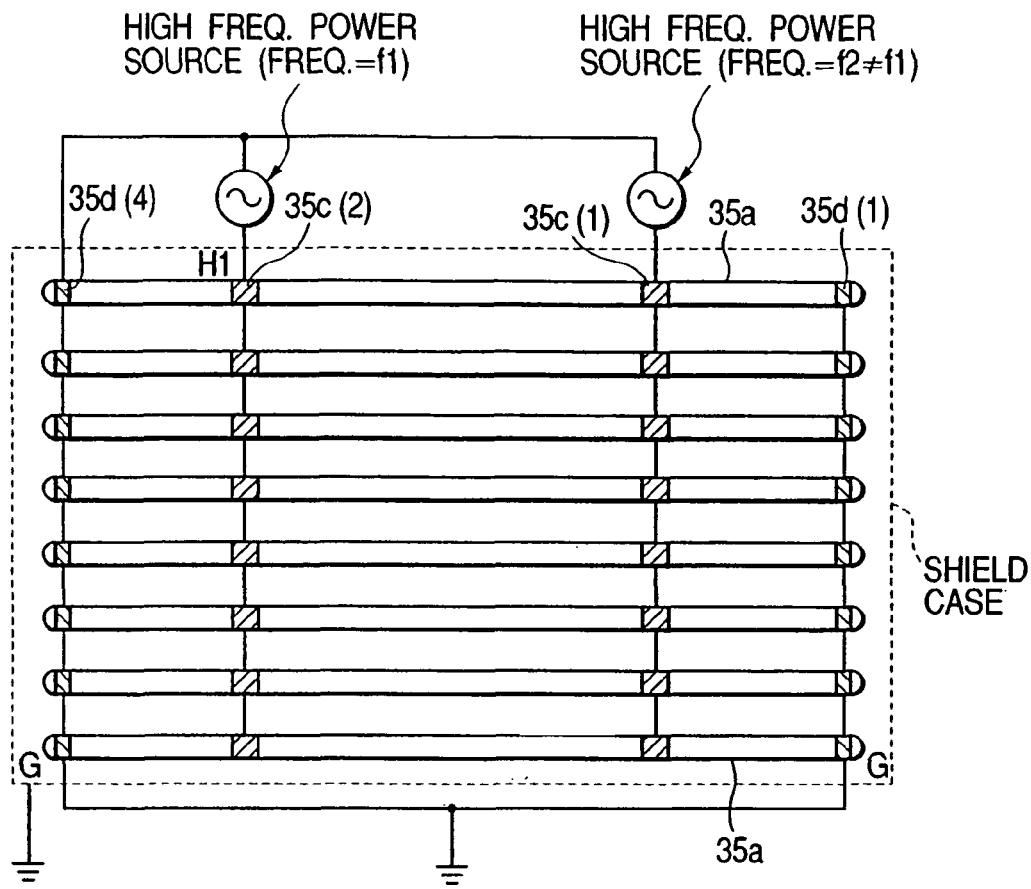
FIG. 24A is an illustration for explaining another embodiment of a light source, assembled as a backlight, in the liquid crystal display device in accordance with the present invention.

As shown in FIG. 24A, eight discharge tubes 35a, for example, are arranged within the backlight of the liquid crystal display device. Corresponding ones of the electrodes of the discharge tube 35a are connected together to form a parallel combination.

By considering the following, the discharge tubes 35a can be arranged in the container of the backlight so as to provide luminance uniform along the axis of the discharge tubes 35a.

Stray capacitances present between the discharge tubes 35a and their neighboring conductors are determined by distance therebetween and the areas of the neighboring conductors, and therefore the discharge tubes 35a need to be arranged symmetrically with respect to the container.

The discharge tubes 35a need to be arranged so as not to form an extremely large stray capacitance locally in a direction of the axis of the discharge tubes 35a. For example, the discharge tubes 35a need to be arranged such that a neighboring conductor does not approach the discharge tubes 35a extremely closely and locally in the direction of the axis of the discharge tubes 35a.

As for the arrangement of the discharge tubes 35a in the container of the backlight, the above considerations are also applicable in the following embodiments.

Figure 24B:
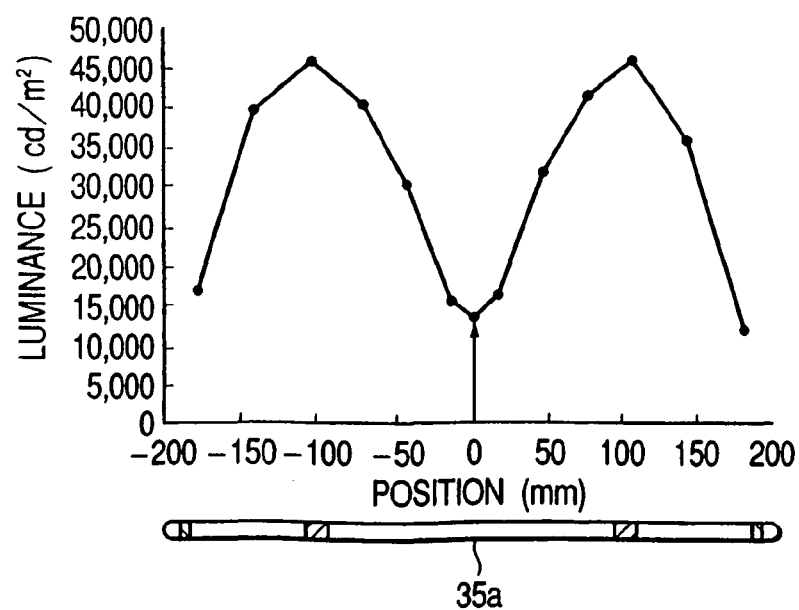
FIG. 24B shows a distribution of its luminance.

FIG. 24B is a graph showing a luminance distribution in a direction of the axis of the discharge tube 35a on the surface of the above-explained backlight facing the liquid crystal display panel 1. As is apparent from this graph, the luminance as a whole along the axis of the discharge tube 35a is improved, and in particular, the reduction of luminance at the center of the light source can be decreased as indicated by an arrow in FIG. 24B.

Embodiment 8

Figure 25A:
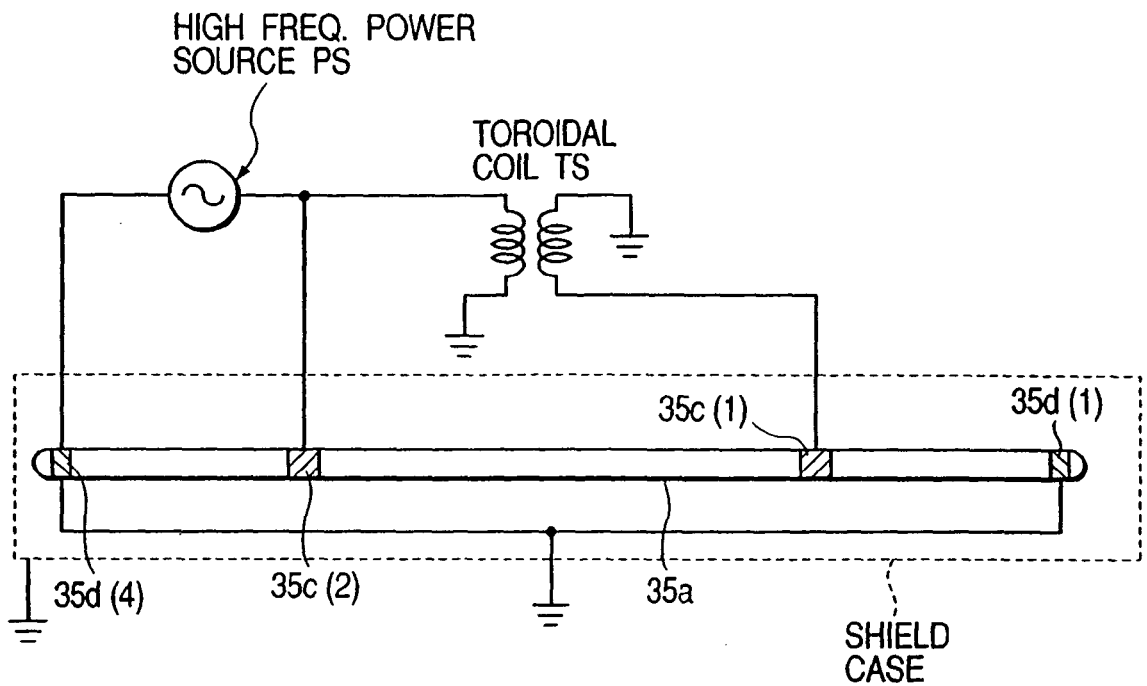
FIG. 25A is an illustration for explaining another embodiment of a light source, treated as one discharge tube, in the liquid crystal display device in accordance with the present invention.

FIG. 25A is an illustration of another embodiment of the liquid crystal display device in accordance with the present invention, and this embodiment is similar to that shown in FIG. 23A.

Like the embodiment shown in FIG. 23A, the ground-side electrodes 35d(2), 35d(3) are absent at the center of the discharge tube 35a in this embodiment.

This embodiment differs from that shown in FIG. 23A, in that the high-voltage side electrode 35c(1) is supplied with a first high-frequency voltage from the high-frequency power source PS, and the other high-voltage side electrode 35c (2) is supplied with a second high-frequency voltage reversed in phase from the first high-frequency voltage via a toroidal coil TC, for example, from the high-frequency power source PS.

Here a voltage of 700 Vp-p and 5 MHz, for example, can be used as the first and second high-frequency voltages from the high-frequency power source PS.

Figure 25B:
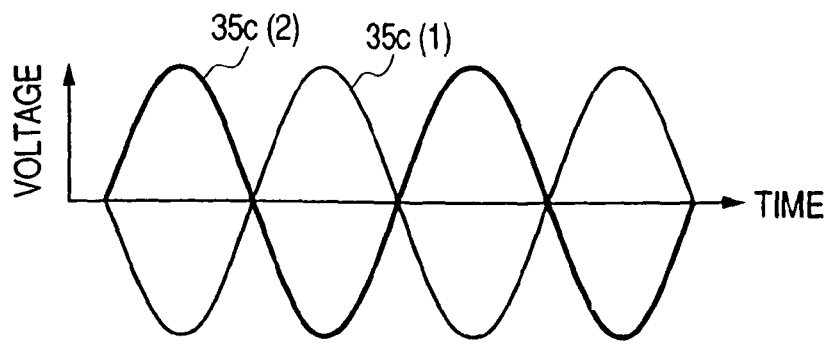
FIG. 25B shows waveforms of associated driving voltages.

FIG. 25B shows a relationship in waveform between the high-frequency voltages supplied to the high-voltage side electrodes 35c(1) and 35c(2).

Figure 26A:
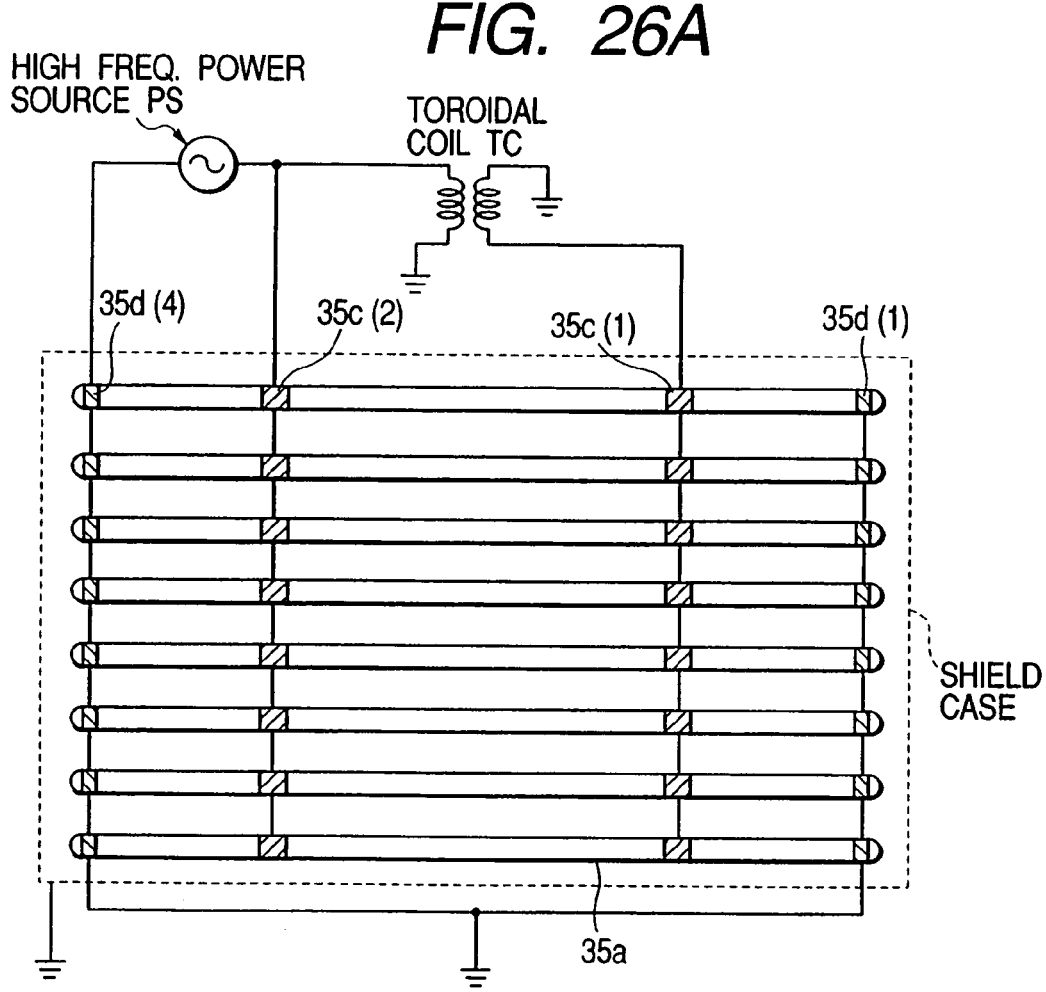
FIG. 26A is an illustration for explaining another embodiment of a light source, assembled as a backlight, in the liquid crystal display device in accordance with the present invention.

As shown in FIG. 26A, eight discharge tubes 35a, for example, are arranged within the backlight of the liquid crystal display device, and they are connected in parallel with each other.

Figure 26B:
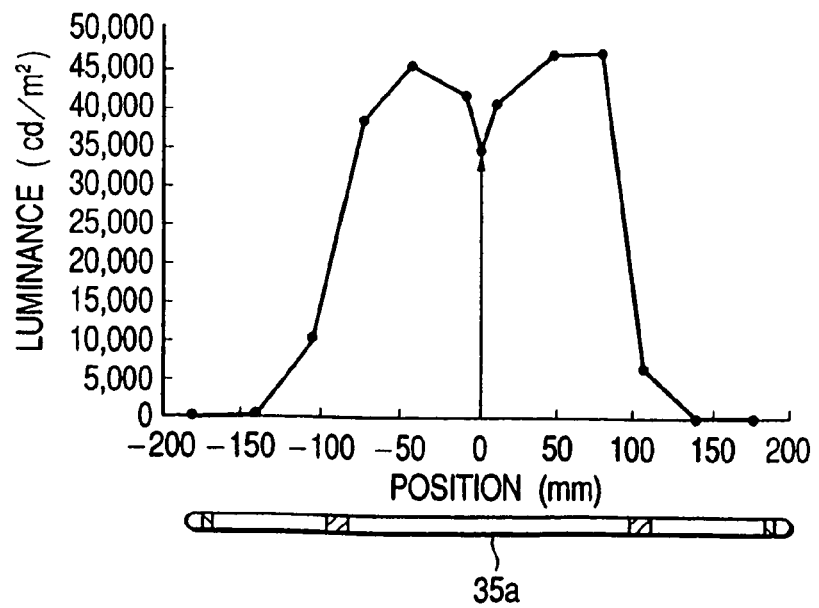
FIG. 26B shows a distribution of its luminance.

FIG. 26B is a graph showing a luminance distribution in a direction of the axis of the discharge tube 35a on the surface of the above-explained backlight facing the liquid crystal display panel 1. The luminance at the center of the light source can be greatly improved as indicated by an arrow in FIG. 26B.

Embodiment 9

Figure 27A:
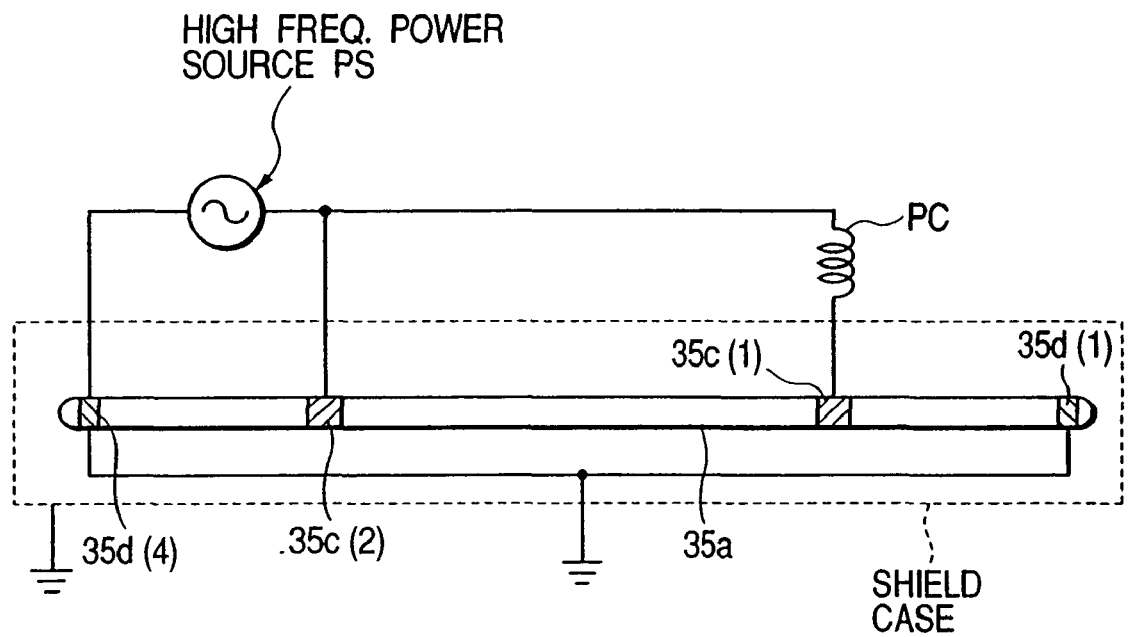
FIG. 27A is an illustration for explaining another embodiment of a light source, treated as one discharge tube, in the liquid crystal display device in accordance with the present invention.

FIG. 27A is an illustration of another embodiment of the liquid crystal display device in accordance with the present invention, and this embodiment is similar to that shown in FIG. 23A.

Like the embodiment shown in FIG. 23A, the ground-side electrodes 35d(2), 35d(3) are absent at the center of the discharge tube 35a in this embodiment.

This embodiment differs from that shown in FIG. 23A, in that the high-voltage side electrode 35c(1) is supplied with a first high-frequency voltage from the high-frequency power source PS, and the other high-voltage side electrode 35c (2) is supplied with a second high-frequency voltage out of phase with the first high-frequency voltage via a phase-adjusting coil PC, for example, from the high-frequency power source PS.

Figure 27B:
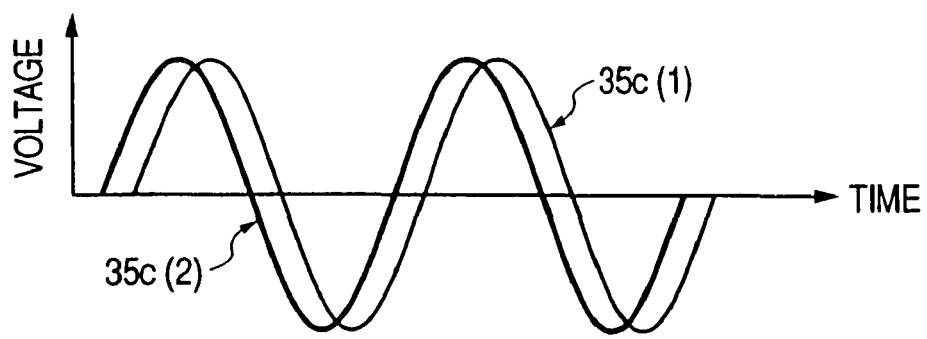
FIG. 27B shows waveforms of associated driving voltages.

FIG. 27B shows a relationship in waveform between the high-frequency voltages supplied to the high-voltage side electrodes 35c(1) and 35c(2).

Figure 28:
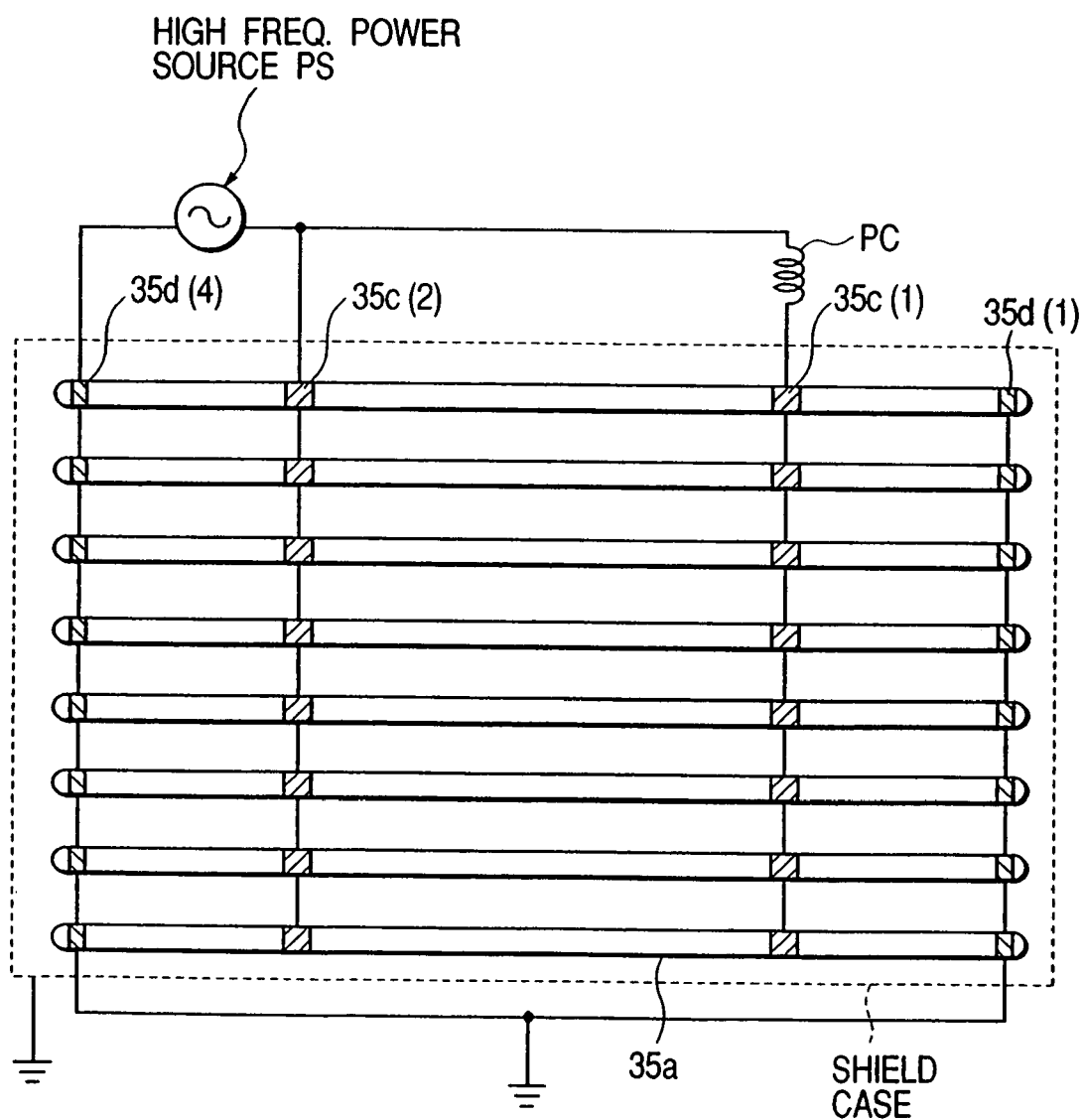
FIG. 28 is an illustration for explaining another embodiment of a light source, assembled as a backlight, in the liquid crystal display device in accordance with the present invention.

As shown in FIG. 28, eight discharge tubes 35a, for example, are arranged within the backlight of the liquid crystal display device, and they are connected in parallel with each other.

In a luminance distribution in a direction of the axis of the discharge tube 35a on the surface of the above-explained backlight facing the liquid crystal display panel 1, the luminance at the center of the discharge tubes 35a can be greatly improved as in the above embodiments.

Embodiment 10

Figure 29A:
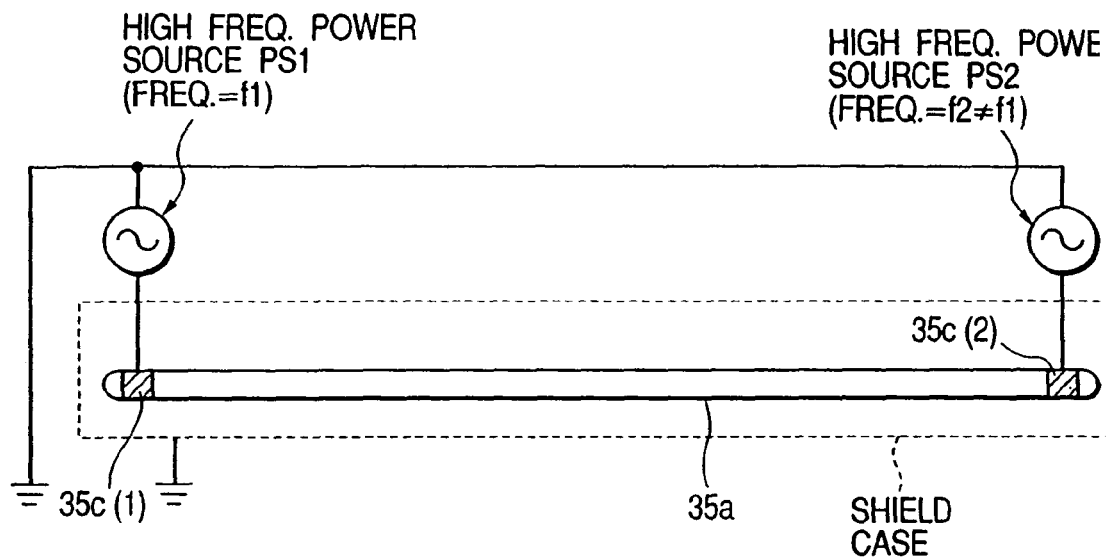
FIG. 29A is an illustration for explaining another embodiment of a light source, treated as one discharge tube, in the liquid crystal display device in accordance with the present invention.

FIG. 29A is an illustration of another embodiment of the liquid crystal display device in accordance with the present invention.

In FIG. 29A, the discharge tube 35a is housed within a shield case, and is provided with the high-voltage side electrodes 35c(1), 35c(2) at both ends of the discharge tube 35a, respectively. The high-voltage side electrode 35c(1) is supplied with a high-frequency voltage of a frequency f1 from the high-frequency power source PS1, the other high-voltage side electrode 35c(2) is supplied with a high-frequency voltage of a frequency f2 from the high-frequency power source PS2, and the shield case is grounded. Housing of the discharge tube 35a within the grounded shield case makes the driving circuit a closed circuit using stray capacitances between the shield case and the discharge tube 35a, and therefore this eliminates the need for providing the discharge tube 35a itself with the ground-side electrode 35d.

This configuration eliminates reduction in luminance which would otherwise be caused in the vicinities of the ground-side electrode 35d, and consequently, it flattens a luminance distribution in a direction of the axis of the discharge tube 35a.

It is ideal that the shield case is formed so as to surround the discharge tube 35a completely, but no problems arise if the shield case is formed with an opening at a portion corresponding to the display area of the liquid crystal display panel. For example, the same advantages are obtained by fabricating the reflective plate 36 shown in FIG. 13 using a conductive plate, forming a shield case by electrically connecting the reflective plate 36 to the inner frame 800 made of conductive material, and then grounding the shield case.

The above configurations of the shield case are also applicable for grounding in the following embodiments.

Figure 29B:
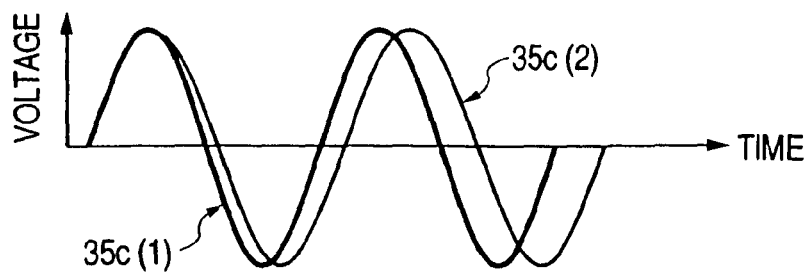
FIG. 29B shows waveforms of associated driving voltages.

FIG. 29B shows a relationship in waveform between the high-frequency voltages supplied to the high-voltage side electrodes 35c(1) and 35c(2).

Figure 30:
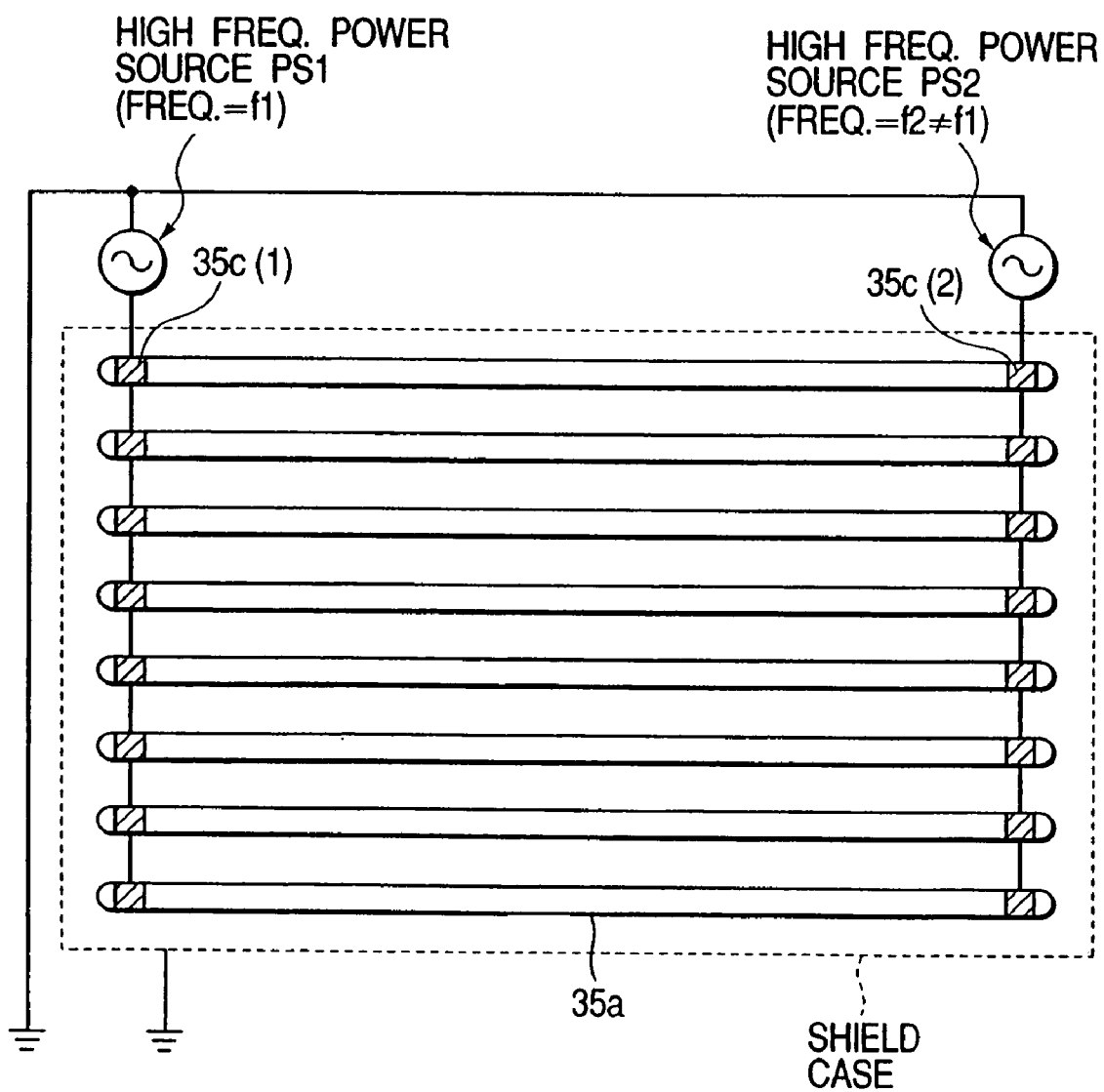
FIG. 30 is an illustration for explaining another embodiment of a light source, assembled as a backlight, in the liquid crystal display device in accordance with the present invention.

As shown in FIG. 30, eight discharge tubes 35a, for example, are arranged within the backlight of the liquid crystal display device, and they are connected in parallel with each other.

Embodiment 11

Figure 31A:
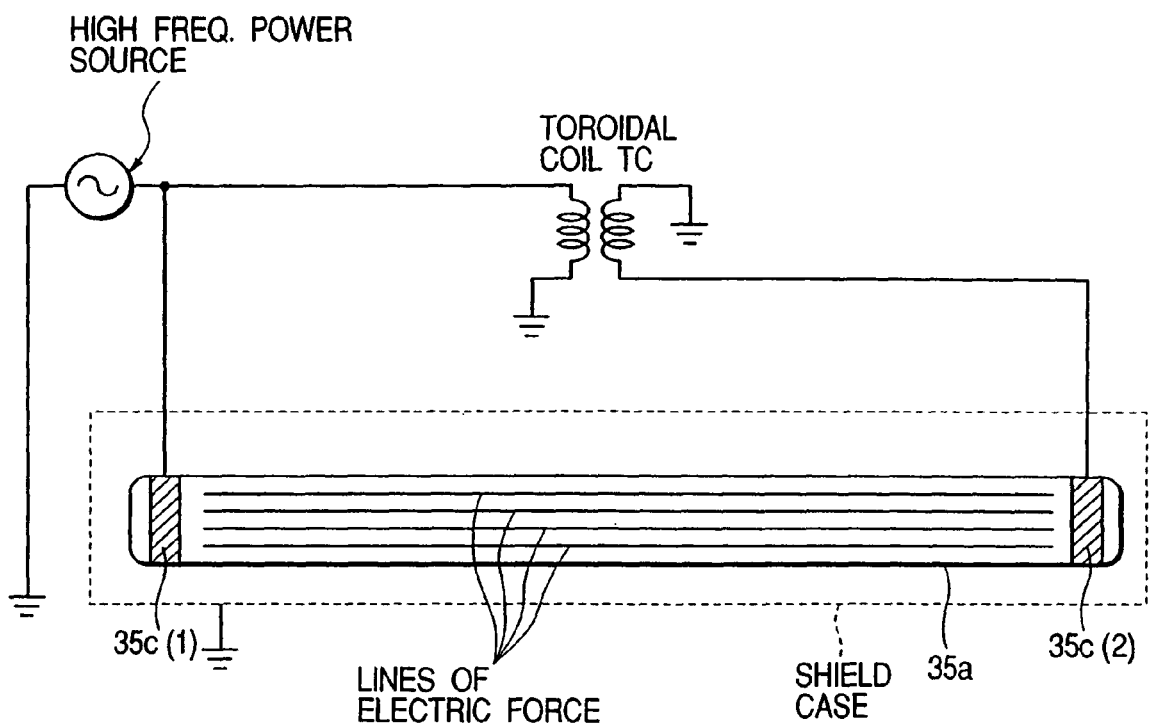
FIG. 31A is an illustration for explaining another embodiment of a light source, treated as one discharge tube, in the liquid crystal display device in accordance with the present invention.

FIG. 31A is an illustration of another embodiment of the liquid crystal display device in accordance with the present invention, and this embodiment is similar to that shown in FIG. 29A.

In FIG. 31A, the discharge tube 35a is housed within a shield case, and is provided with the high-voltage side electrodes 35c (1), 35c(2) at both ends of the discharge tube 35a, respectively. The high-voltage side electrode 35c(1) is supplied with a first high-frequency voltage from the high-frequency power source PS, the other high-voltage side electrode 35c(2) is supplied with a second high-frequency voltage reversed in phase from the first high-frequency voltage via a toroidal coil TC from the high-frequency power source PS, and the shield case is grounded. As in the embodiment shown in FIG. 29A, housing of the discharge tube 35a within the grounded shield case makes the driving circuit a closed circuit using stray capacitances between the shield case and the discharge tube 35a, and therefore this eliminates the need for providing the discharge tube 35a itself with the ground-side electrode 35d.

Figure 31B:
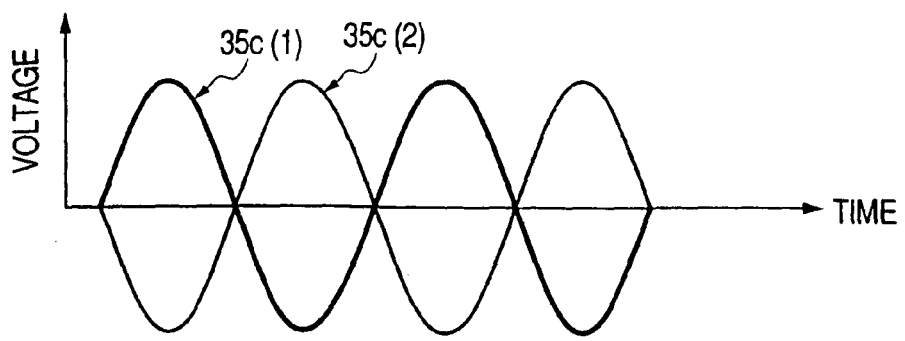
FIG. 31B shows waveforms of associated driving voltages.
Figure 31C:
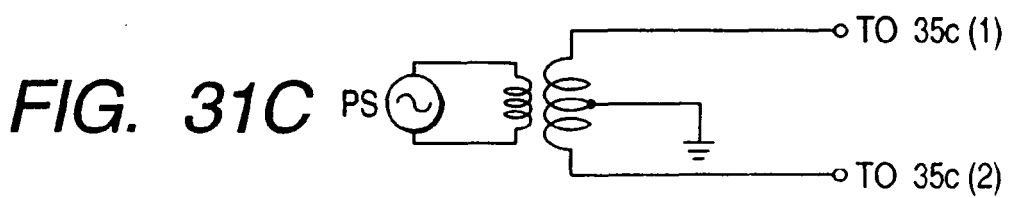
FIGS. 31C-31F show circuit configurations usable instead of the circuit configuration of FIG. 31A.

FIG. 31B shows a relationship in waveform between the high-frequency voltages supplied to the high-voltage side electrodes 35c(1) and 35c(2).

Figure 32A:
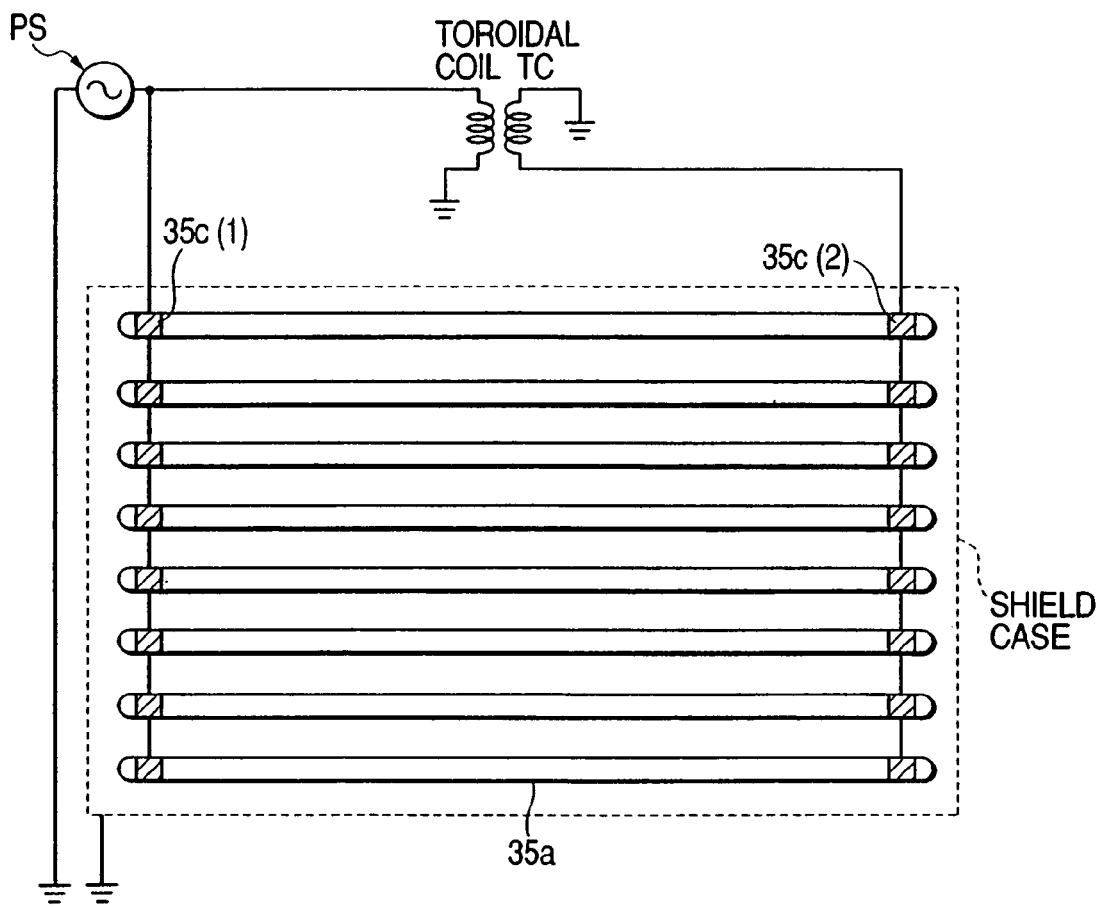
FIG. 32A is an illustration for explaining another embodiment of a light source, assembled as a backlight, in the liquid crystal display device in accordance with the present invention.

As shown in FIG. 32A, eight discharge tubes 35a, for example, are arranged within the backlight of the liquid crystal display device, and they are connected in parallel with each other.

Figure 32B:
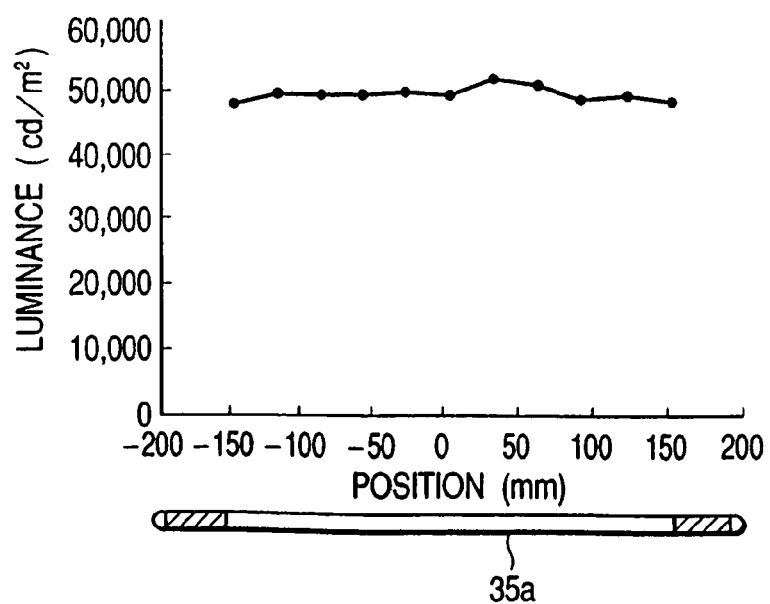
FIG. 32B shows a distribution of its luminance.

FIG. 32B is a graph showing a luminance distribution in a direction of the axis of the discharge tube 35a on the surface of the above-explained backlight facing the liquid crystal display panel. As is apparent from this graph, a luminance distribution along the axis of the discharge tube 35a is made uniform, and the luminance at the center of the discharge tube 35a can be greatly improved.

Figure 31D:
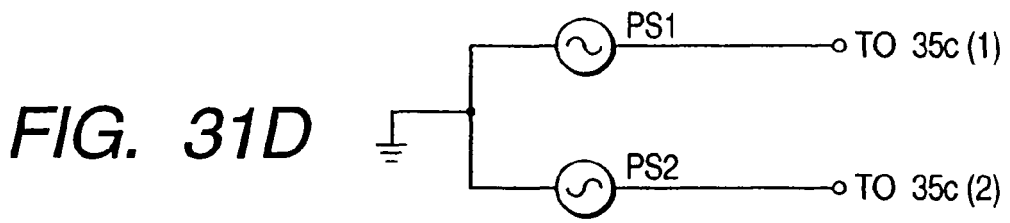
Figure 31E:
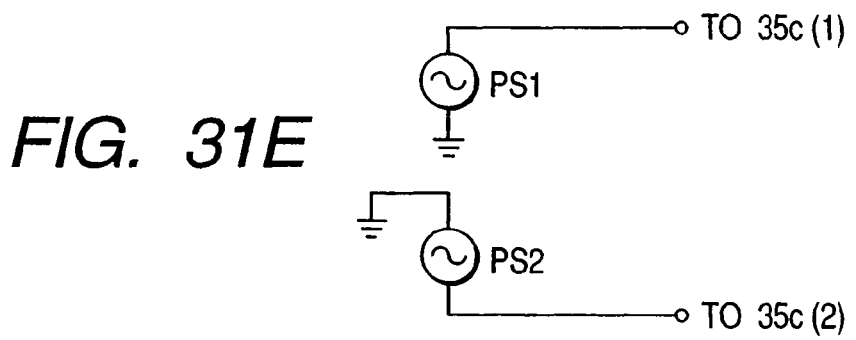
Figure 31F:
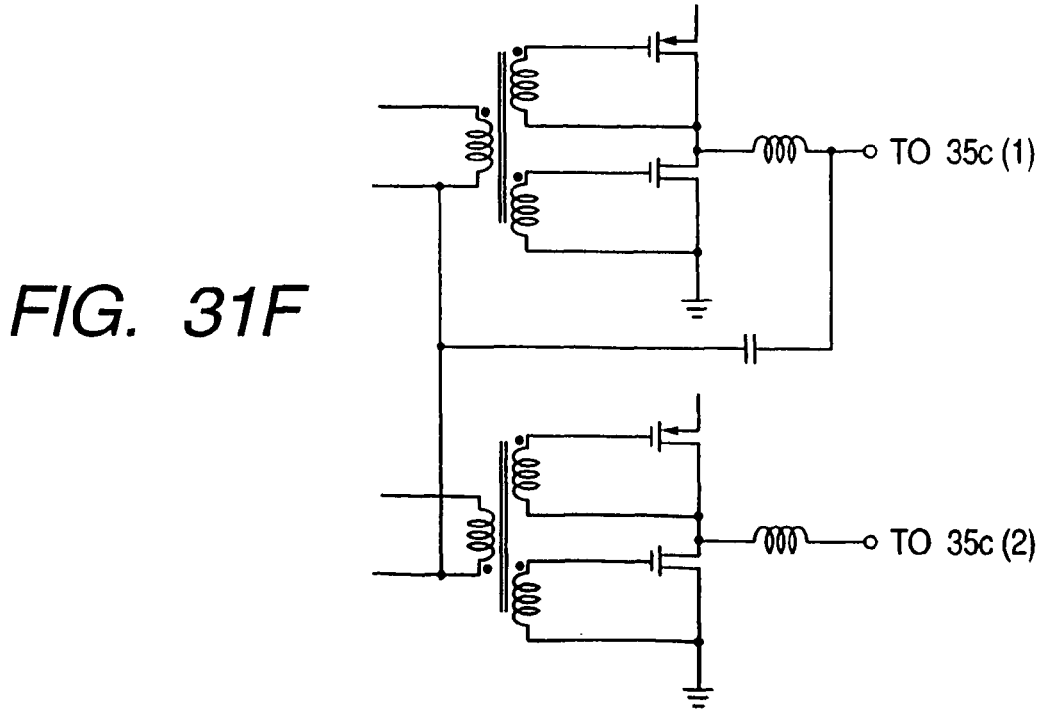

In this embodiment, the circuit configuration shown in FIG. 31A is utilized for supplying the two voltages opposite in phase from each other to the two high-voltage side electrodes 35c(1), 35c(2), respectively, but the present invention is not limited to this circuit configuration. The circuit configurations shown in FIGS. 31C-31F, for example, can be utilized instead of the circuit configuration shown in FIG. 31A. Especially, the circuit configurations shown in FIGS. 31D-31F use two high-frequency power sources, and thereby they can apply higher voltages between the high-voltage side electrodes 35c(1), 35(2). Utilization of the two high-frequency power sources is not limited to the phase-reversal driving, but is also applicable to the driving by using two-frequency voltages or two-different-phase voltages.

Embodiment 12

Figure 45A:
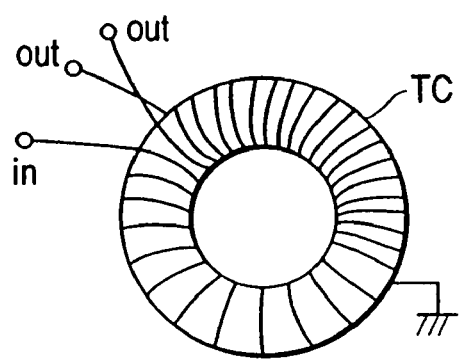
FIG. 45A is an illustration for explaining a toroidal coil used for phase reversal of a driving voltage.
Figure 45B:
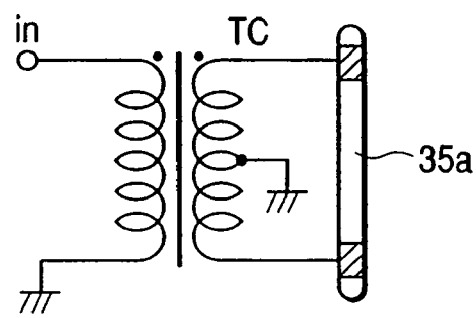
FIG. 45B is an illustration for explaining an embodiment of a light source in the liquid crystal display device in accordance with the present invention employing the toroidal coil.

This embodiment is directed to improvement of a toroidal coil TC for phase reversal used in Embodiment 12, for example. Usually a toroidal coil TC as shown in FIG. 45A can be used as shown in FIG. 45B, but when the toroidal coil is used at a frequency above 5 MHz, the phase-reversal driving sometimes failed to operate perfectly or the surface temperature of the toroidal coil sometimes rose to 60.degree. C., resulting in excessive power loss.

Figure 46A:
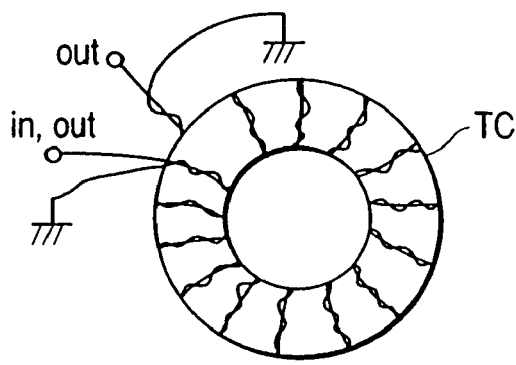
FIG. 46A is an illustration for explaining an improved toroidal coil used for phase reversal of a driving voltage.
Figure 46B:
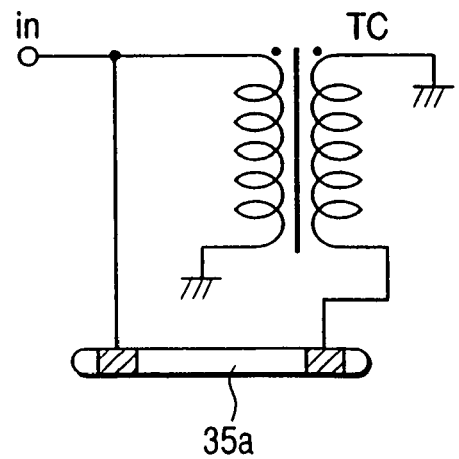
FIG. 46B is an illustration for explaining an embodiment of a light source in the liquid crystal display device in accordance with the present invention employing the improved toroidal coil.

These problems were solved by a toroidal coil shown in FIG. 46A which is fabricated by winding two wires twisted together around a toroidal core, and this toroidal coil is used as shown in FIG. 6B. As an example, when a toroidal coil was fabricated by winding 27 turns uniformly along the complete circumference of the toroidal core, the surface temperature of the toroidal core during operation was 40.degree. C., which was lower by 20.degree. C. than that of the toroidal coil TC shown in FIG. 45A. The possible frequency of the phase-reversal driving was increased to 17 MHz.

Embodiment 13

Figure 33A:
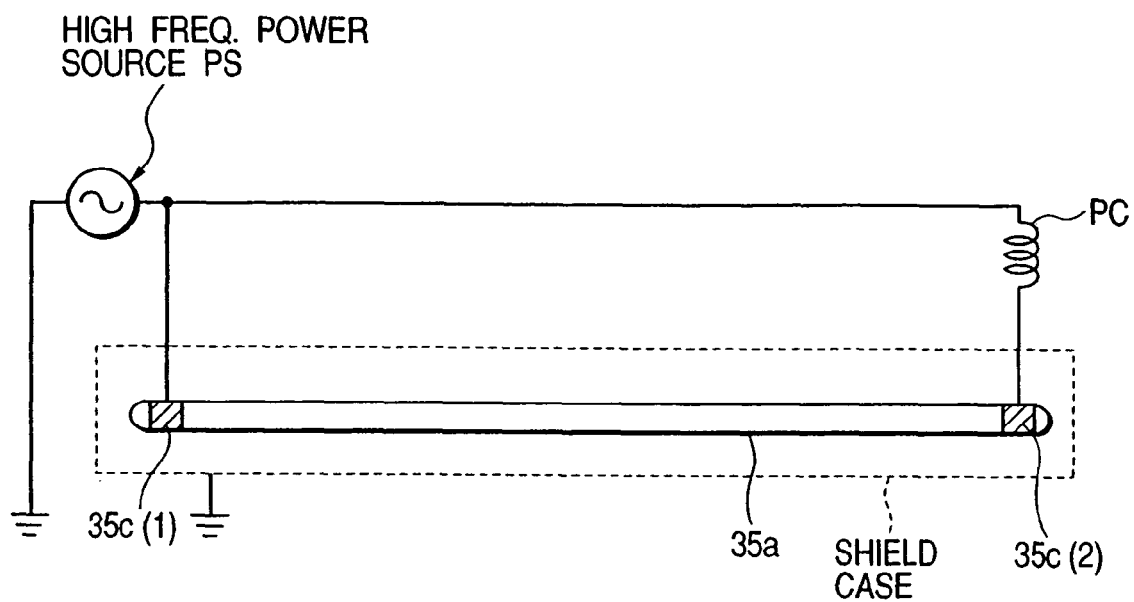
FIG. 33A is an illustration for explaining another embodiment of a light source, treated as one discharge tube, in the liquid crystal display device in accordance with the present invention.

FIG. 33A is an illustration of another embodiment of the liquid crystal display device in accordance with the present invention, and this embodiment is similar to that shown in FIG. 29A.

In FIG. 33A, the discharge tube 35a is housed within a shield case. The high-voltage side electrode 35c(1) disposed at one end of the discharge tube 35a is supplied with a first high-frequency voltage from the high-frequency power source PS, the high-voltage side electrode 35c(2) disposed at the other end of the discharge tube 35a is supplied with a second high-frequency voltage out of phase with the first high-frequency voltage via a phase-adjusting coil PC, for example, from the high-frequency power source PS, and the shield case is grounded. In the embodiment also, housing of the discharge tube 35a within the grounded shield case makes the driving circuit a closed circuit using stray capacitances between the shield case and the discharge tube 35a, and therefore this eliminates the need for providing the discharge tube 35a itself with the ground-side electrode.

Figure 33B:
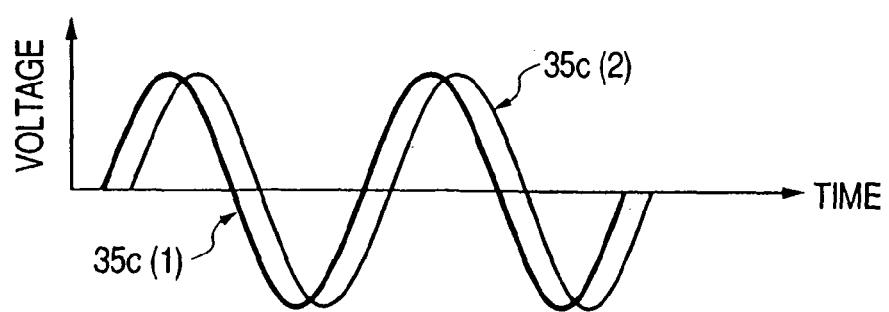
FIG. 33B shows waveforms of associated driving voltages.

FIG. 33B shows a relationship in waveform between the high-frequency voltages supplied to the high-voltage side electrodes 35c(1) and 35c(2).

Figure 34:
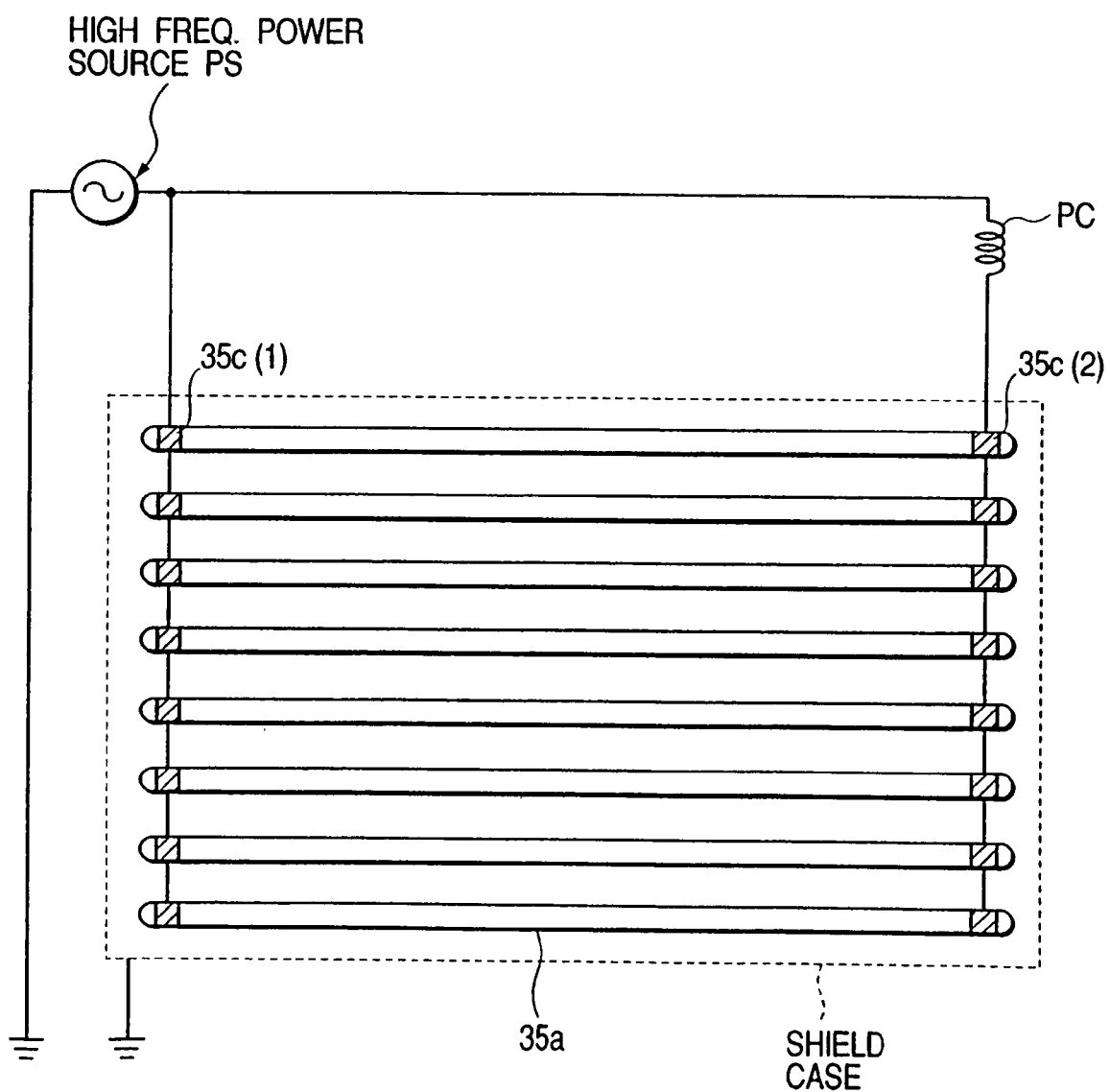
FIG. 34 is an illustration for explaining another embodiment of a light source, assembled as a backlight, in the liquid crystal display device in accordance with the present invention.

As shown in FIG. 34, eight discharge tubes 35a, for example, are arranged within the backlight of the liquid crystal display device, and they are connected in parallel with each other.

Embodiment 14

Figure 35A:
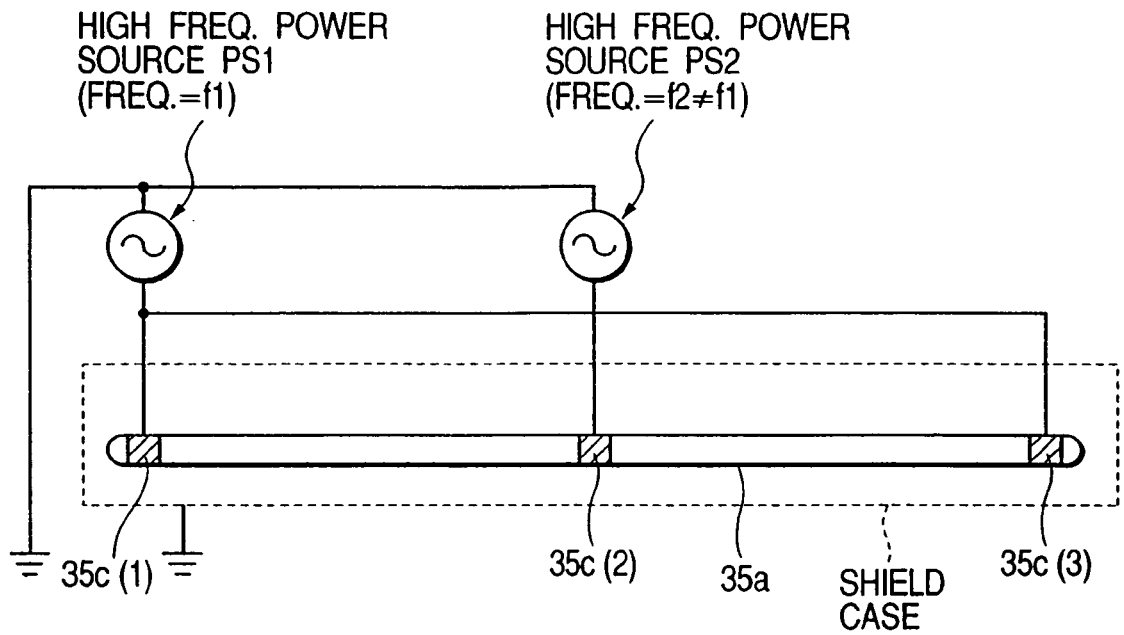
FIG. 35A is an illustration for explaining another embodiment of a light source, treated as one discharge tube, in the liquid crystal display device in accordance with the present invention.

FIG. 35A is an illustration of another embodiment of the liquid crystal display device in accordance with the present invention, and this embodiment is similar to that shown in FIG. 33A.

In FIG. 35A, the discharge tube 35a is housed within a shield case, and is provided with the high-voltage side electrodes 35c(1), 35c(3), 35c(2) at both ends and the center of the discharge tube 35a, respectively. The high-voltage side electrodes 35c(1), 35c(3) at both the ends are supplied with a high-frequency voltage of a frequency f1 from the high-frequency power source PS1, the high-voltage side electrode 35c(2) at the center is supplied with a high-frequency voltage of a frequency f2 (=f1) from the high-frequency power source PS2, and the shield case is grounded. Even when the discharge tube 35a is provided with three or more electrodes, all the electrodes are used as the high-voltage side electrodes, and no ground-side electrodes are provided so as to prevent reduction in luminance which would otherwise be caused in the vicinities of the ground-side electrodes.

Figure 35B:
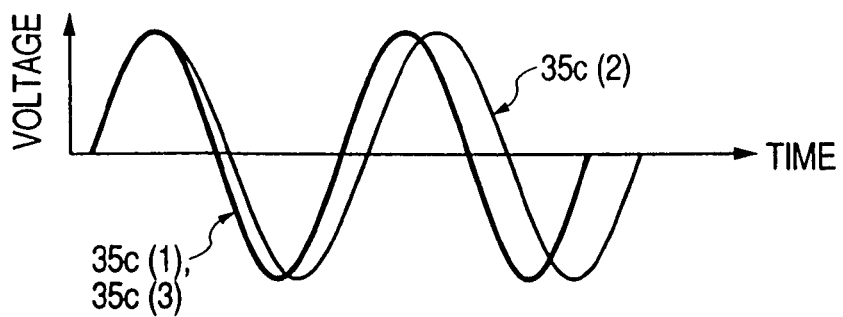
FIG. 35B shows waveforms of associated driving voltages.

FIG. 35B shows a relationship in waveform between the high-frequency voltage supplied to the high-voltage side electrodes 35c (1), 35c (3) and the high-frequency voltage supplied to the high-voltage side electrode 35c(2).

Figure 36:
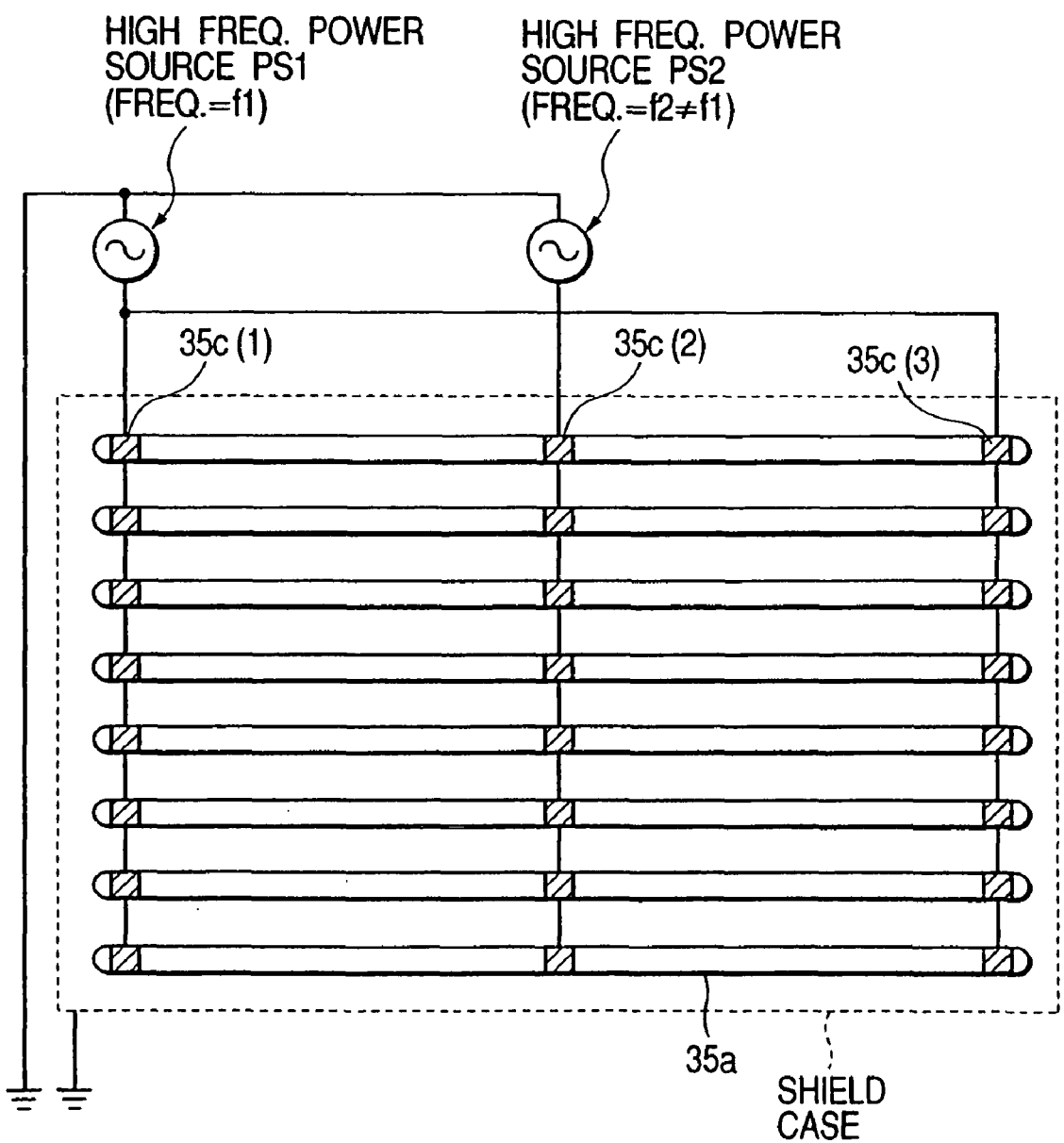
FIG. 36 is an illustration for explaining another embodiment of a light source, assembled as a backlight, in the liquid crystal display device in accordance with the present invention.

As shown in FIG. 36, eight discharge tubes 35a, for example, are arranged within the backlight of the liquid crystal display device, and they are connected in parallel with each other.

Embodiment 15

Figure 37A:
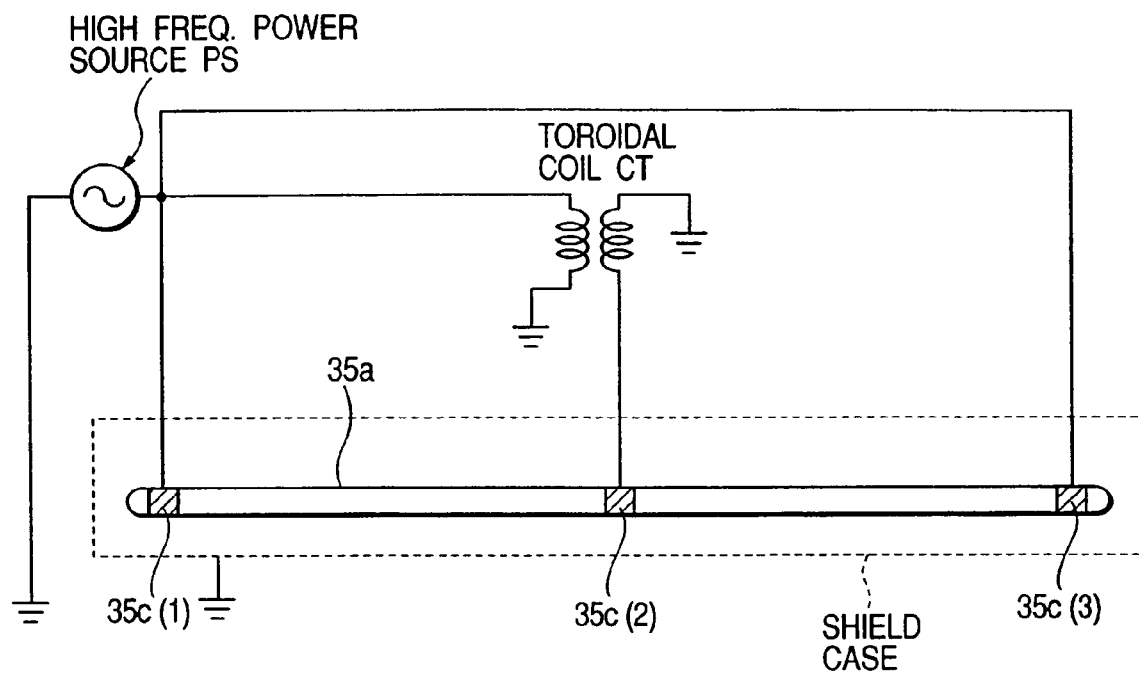
FIG. 37A is an illustration for explaining another embodiment of a light source, treated as one discharge tube, in the liquid crystal display device in accordance with the present invention.

FIG. 37A is an illustration of another embodiment of the liquid crystal display device in accordance with the present invention, and this embodiment is similar to that shown in FIG. 35A.

In FIG. 37A, the discharge tube 35a is housed within a shield case, and is provided with the high-voltage side electrodes 35c(1), 35c(3), 35c(2) at both ends and the center of the discharge tube 35a, respectively. The high-voltage side electrodes 35c(1), 35c(3) at both the ends are supplied with a first high-frequency voltage from the high-frequency power source PS, the high-voltage side electrode 35c(3) at the center is supplied with a second high-frequency voltage reversed in phase from the first high-frequency voltage via a toroidal coil TC, for example, from the high-frequency power source PS, and the shield case is grounded.

Figure 37B:
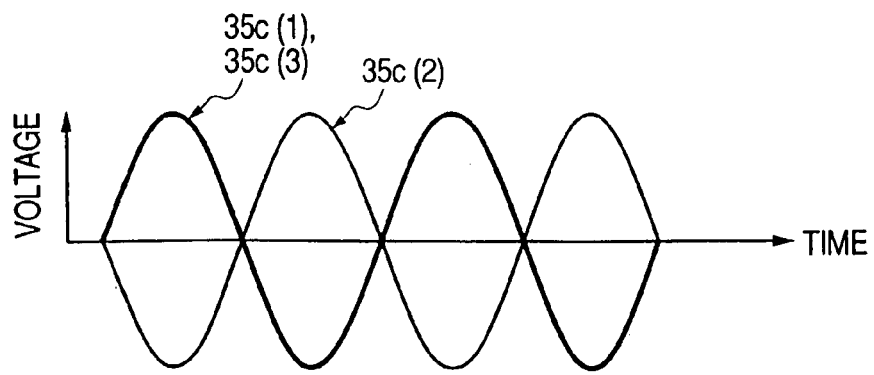
FIG. 37B shows waveforms of associated driving voltages.

FIG. 37B shows a relationship in waveform between the high-frequency voltage supplied to the high-voltage side electrodes 35c(1), 35c(3) and the high-frequency voltage supplied to the high-voltage side electrode 35c(2).

Figure 38:
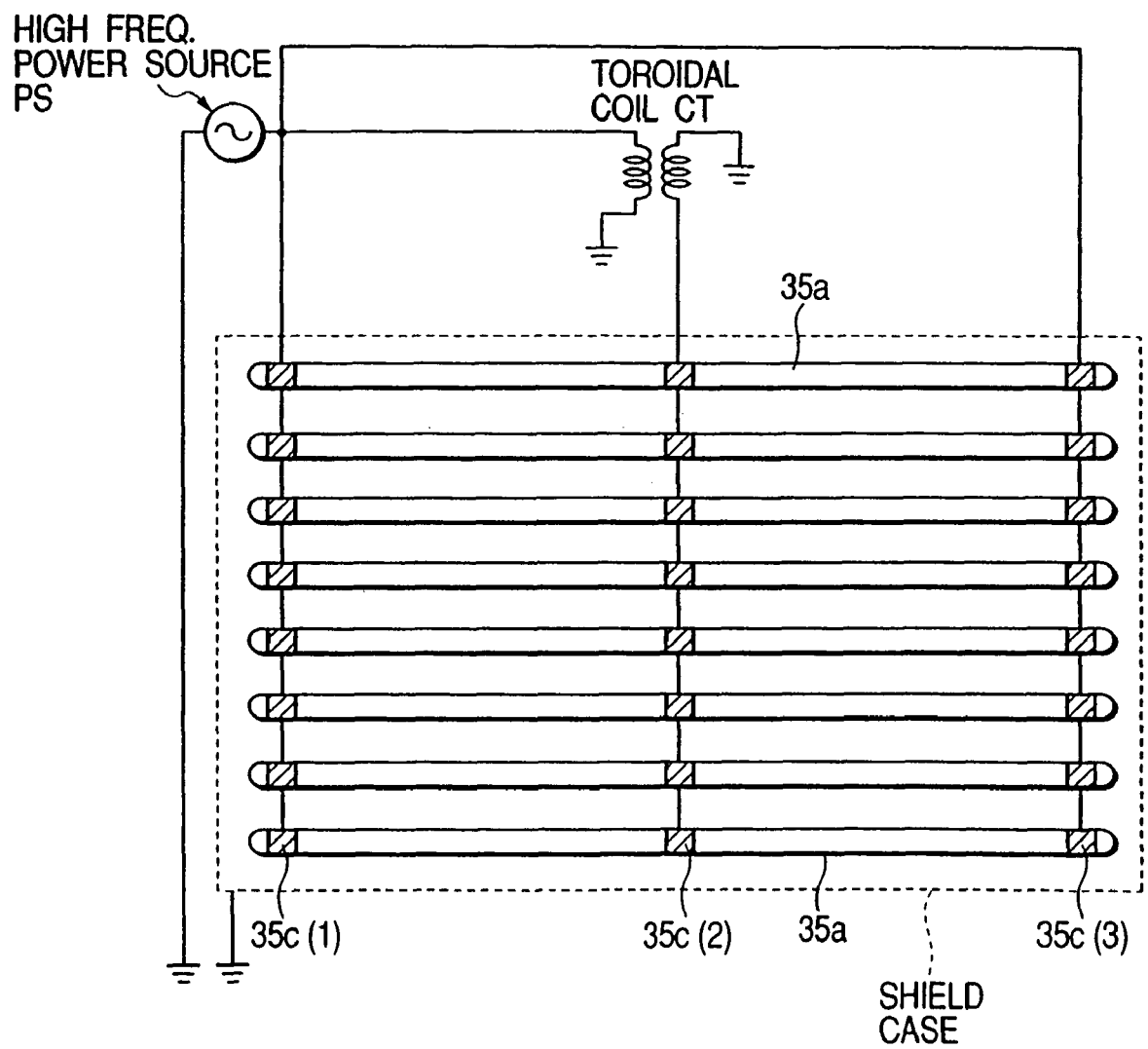
FIG. 38 is an illustration for explaining another embodiment of a light source, assembled as a backlight, in the liquid crystal display device in accordance with the present invention.

As shown in FIG. 38, eight discharge tubes 35a, for example, are arranged within the backlight of the liquid crystal display device, and they are connected in parallel with each other.

This embodiment also provides the same advantages as Embodiment 14.

Embodiment 16

Figure 39A:
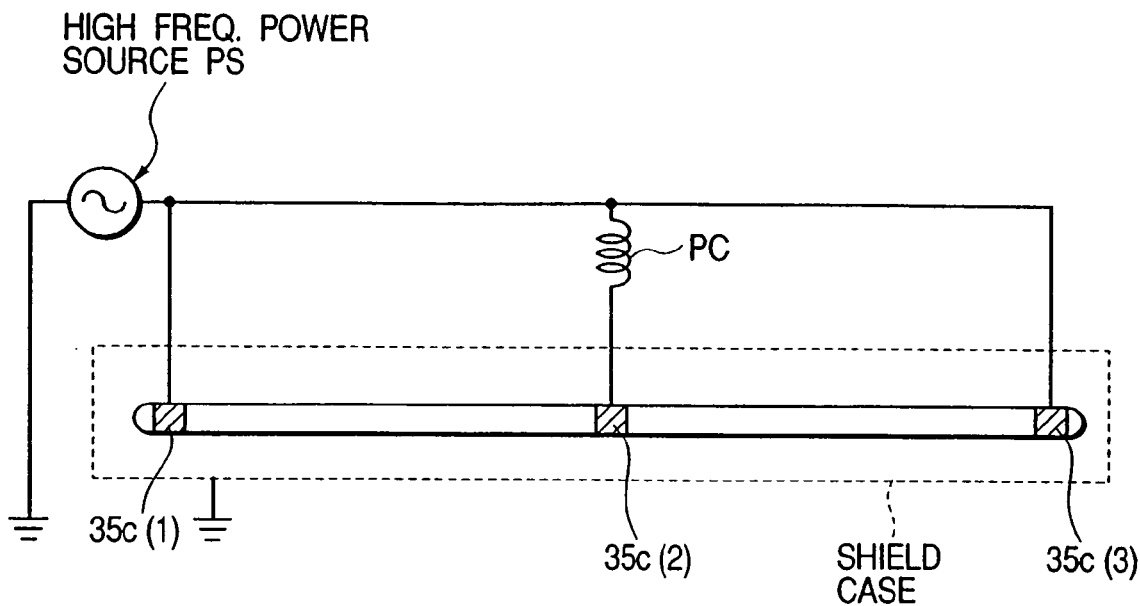
FIG. 39A is an illustration for explaining another embodiment of a light source, treated as one discharge tube, in the liquid crystal display device in accordance with the present invention.

FIG. 39A is an illustration of another embodiment of the liquid crystal display device in accordance with the present invention, and this embodiment is similar to that shown in FIG. 37A.

In FIG. 39A, the discharge tube 35a is housed within a shield case, and is provided with the high-voltage side electrodes 35c(1), 35c(3), 35c(2) at both ends and the center of the discharge tube 35a, respectively. The high-voltage side electrodes 35c(1), 35c(3) at both the ends are supplied with a first high-frequency voltage from the high-frequency power source PS, the high-voltage side electrode 35c(2) at the center is supplied with a second high-frequency voltage out of phase with the first high-frequency voltage via a phase-adjusting coil PC, for example, from the high-frequency power source PS, and the shield case is grounded.

Figure 39B:
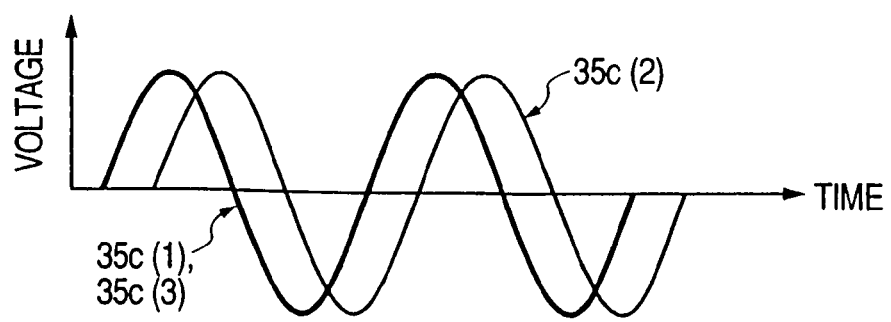
FIG. 39B shows waveforms of associated driving voltages.

FIG. 39B shows a relationship in waveform between the high-frequency voltage supplied to the high-voltage side electrodes 35c (1), 35c (3) and the high-frequency voltage supplied to the high-voltage side electrode 35c(2).

Figure 40:
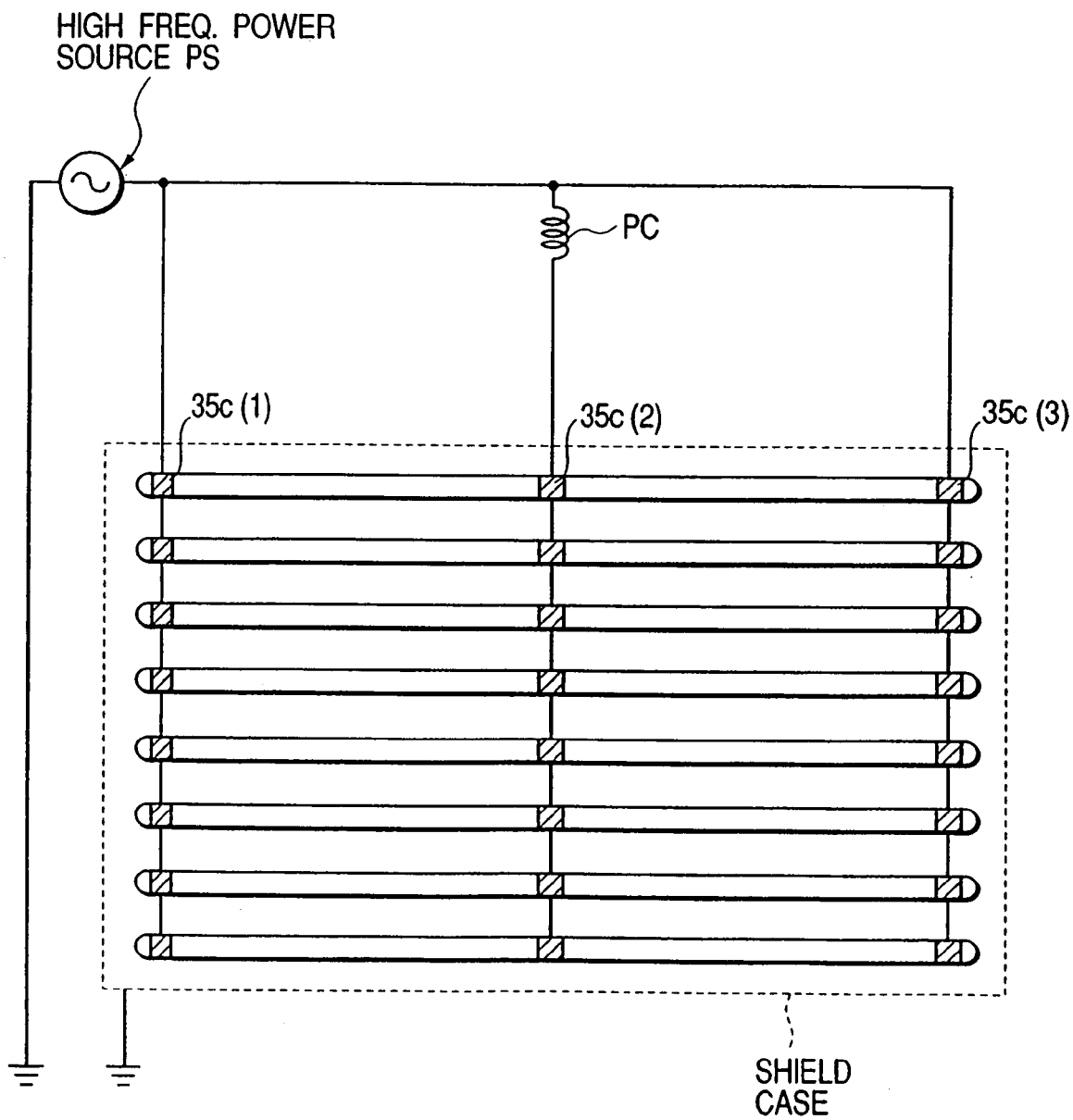
FIG. 40 is an illustration for explaining another embodiment of a light source, assembled as a backlight, in the liquid crystal display device in accordance with the present invention.

As shown in FIG. 40, eight discharge tubes 35a, for example, are arranged within the backlight of the liquid crystal display device, and they are connected in parallel with each other.

This embodiment also provides the same advantages as Embodiment 14.

Embodiment 17

In ones of the above embodiments in which a pair of the high-voltage side electrodes 35c are supplied with two high-frequency voltages out of phase with each other, a circuit can be employed for adjusting their phase difference arbitrarily.

Figure 41A:
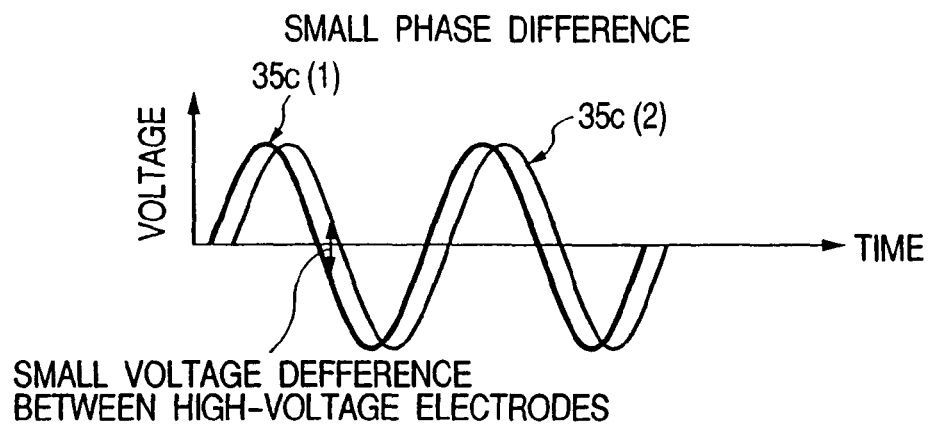
FIGS. 41A, 41B and 41C are illustrations for explaining driving of a light source in the liquid crystal display device in accordance with the present invention in the case of small, medium and large phase differences between two high-frequency voltages applied to two high-voltage electrodes, respectively.
Figure 41B:
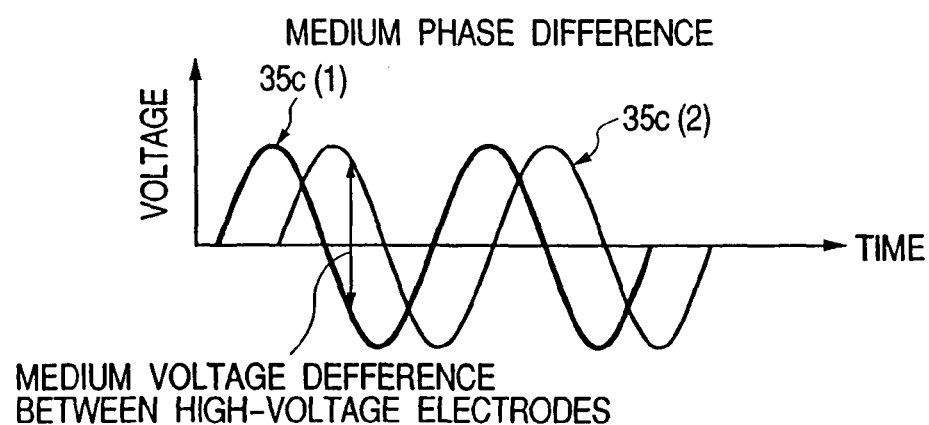
Figure 41C:
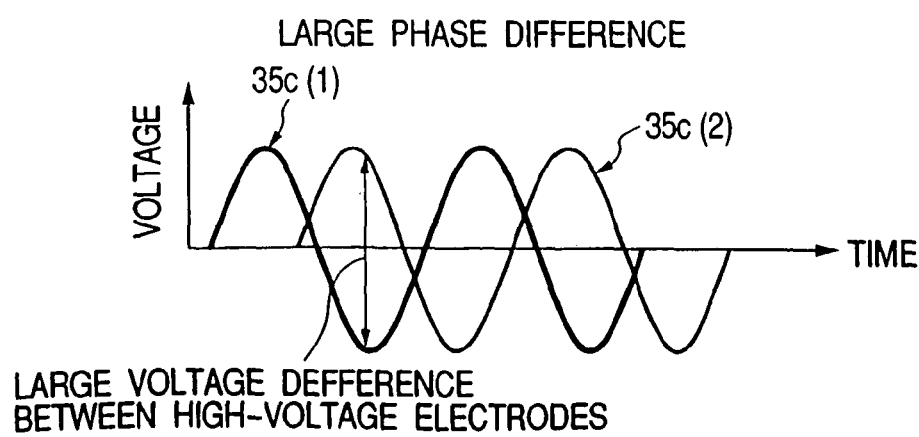

As is apparent from FIGS. 41A-41C, a voltage difference between two high-voltage side electrodes 35c(1), 35c(2) is increased by supplying to one of the high-voltage side electrodes 35c(1), 35c(2) a high-frequency voltage having a large phase difference with respect to another high-frequency voltage supplied to the other of the high-voltage side electrodes 35c(1), 35c(2), and this provides an advantage of making possible optimization of discharge in the discharge tube 35a.

As explained in Embodiments 13 and 15, in a case in which the discharge tube 35a is provided with three or more high-voltage side electrodes 35c, by provision of a circuit for adjusting arbitrarily a phase of a high-frequency voltage supplied to a respective one of the high-voltage side electrodes 35c (one of the high-voltage side electrodes 35c may be supplied with a high-frequency voltage of a fixed frequency serving as a reference), discharge between adjacent ones of the high-voltage side electrodes 35c in the discharge tube 35a can be established to be in a specified state, and this provides an advantage of making uniform illumination over the entire display area by light from the backlight intended for the planar area light source.

Embodiment 18

Among the above embodiments, in the embodiments (Embodiments 13, 14 and 15, for example) in which the discharge tube 35a is provided with three or more high-voltage side electrodes 35c, the intervals between adjacent ones of the high-voltage side electrodes 35c are described as equal.

Figure 42A:
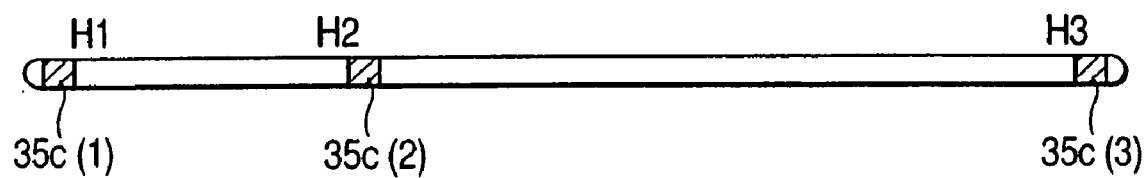
FIG. 42A is an illustration for explaining another embodiment of a light source in the liquid crystal display device in accordance with the present invention.

However, it is needless to say that a distance from a first high-voltage side electrode 35c(1) at one end of the discharge tube 35a to a second high-voltage side electrode 35c (2) between the ends of the discharge tube 35a can be made unequal to a distance from a third high-voltage side electrode 35c(3) to the second high-voltage side electrode 35c(2), as shown in FIG. 42A, for example. The reason is that there are cases where it is preferable not to equalize distances between the electrodes in view of structural limitation of the backlight unit containing the discharge tubes 35a or balancing luminance of the backlight.

Figure 42B:
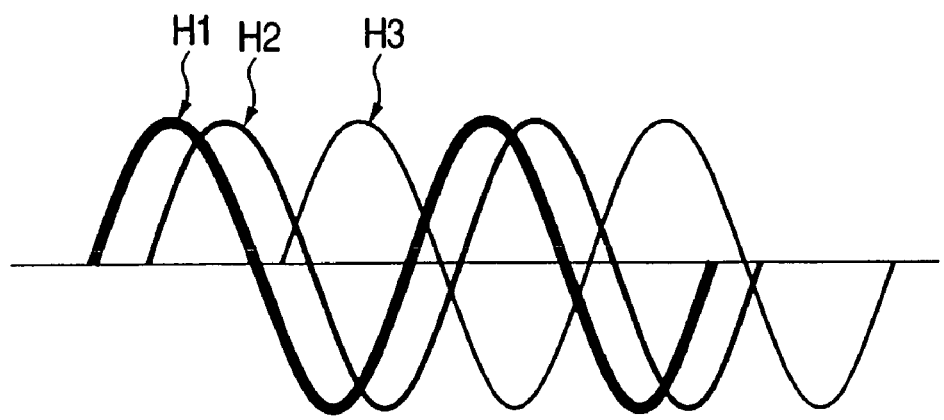
FIG. 42B shows waveforms of associated driving voltages.

In this embodiment, when there are phase differences made among the high-frequency voltages supplied to the high-voltage side electrodes 35c(1), 35c(2), 35c(3), respectively, as shown in FIG. 42B, uniformity in luminance is improved if the following relationship is satisfied:

a voltage difference between the high-voltage side electrodes 35c(1), 35c(2)<a voltage difference between the high-voltage side electrodes 35c(2), 35c(3).

Conversely speaking, when the driving voltages are chosen to satisfy the above relationship, uniformity in luminance is improved by selecting the phase differences among the high-frequency voltages supplied to the high-voltage side electrodes 35c(1), 35c(2), 35c(3), respectively, as shown in FIG. 42B.

Embodiment 19

Figure 43A:
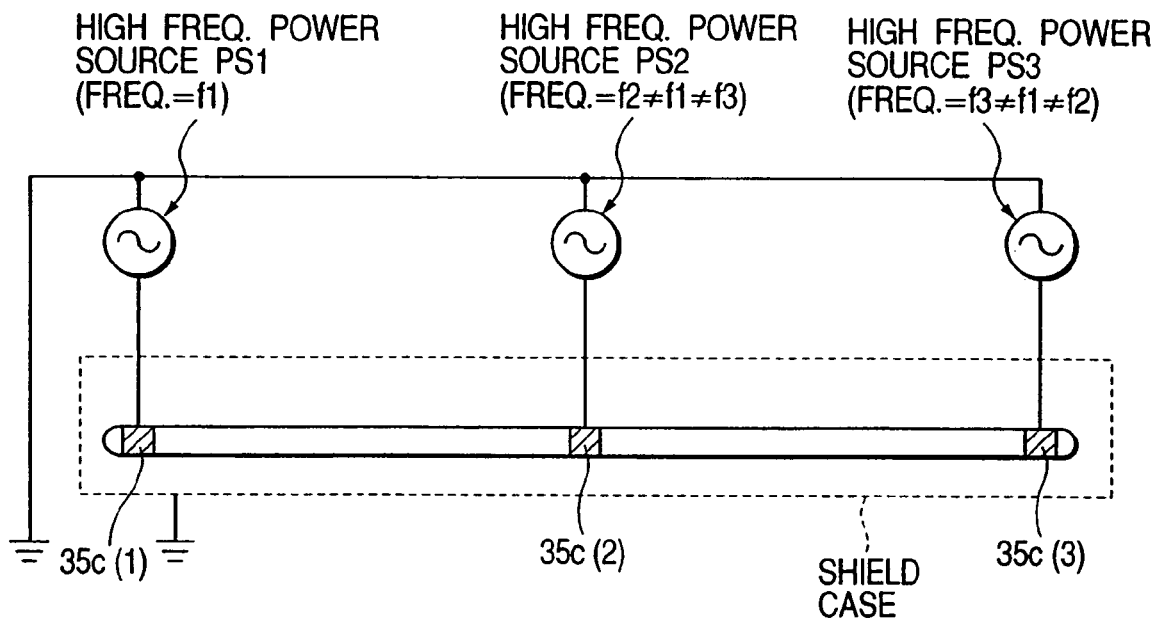
FIG. 43A is an illustration for explaining another embodiment of a light source in the liquid crystal display device in accordance with the present invention.

FIG. 43A is an illustration of another embodiment of the liquid crystal display device in accordance with the present invention, and this embodiment is similar to that shown in FIG. 35A.

This embodiment differs from that shown in FIG. 35A, in that the discharge tube 35a is provided with the high-voltage side electrodes 35c(1), 35c(3), 35c(2) at both its ends and its center, respectively, the high-voltage side electrode 35c(1) at one end is supplied with a high-frequency voltage of a frequency f1 from the high-frequency power source PS1, the high-voltage side electrode 35c(2) at the center is supplied with a high-frequency voltage of a frequency f2 (#f1) from the high-frequency power source PS2, and the high-voltage side electrode 35c(3) at the other end is supplied with a high-frequency voltage of a frequency f3 (.noteq.f1, f2) from the high-frequency power source PS3.

Figure 43B:
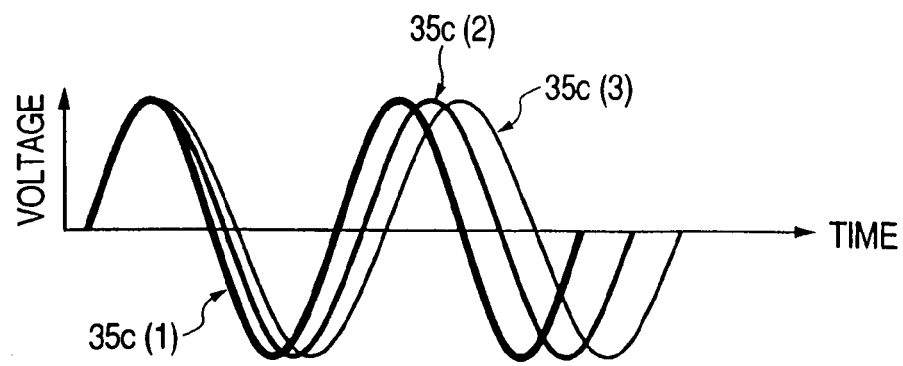
FIG. 43B shows waveforms of associated driving voltages.

FIG. 43B shows a relationship in waveform among the high-frequency voltages supplied to the high-voltage side electrodes 35c(1), 35c(2) and 35c(2).

With this configuration, distances between adjacent high-voltage side electrode 35c(1), 35c(2), 35c(3) can be made smaller in the discharge tube 35a and thereby the required driving, voltages and the widths of the electrodes can be reduced. Consequently, unlike this embodiment, the number of the high-voltage side electrode is not limited to three, but can be more than three.

Embodiment 20

Figure 44A:
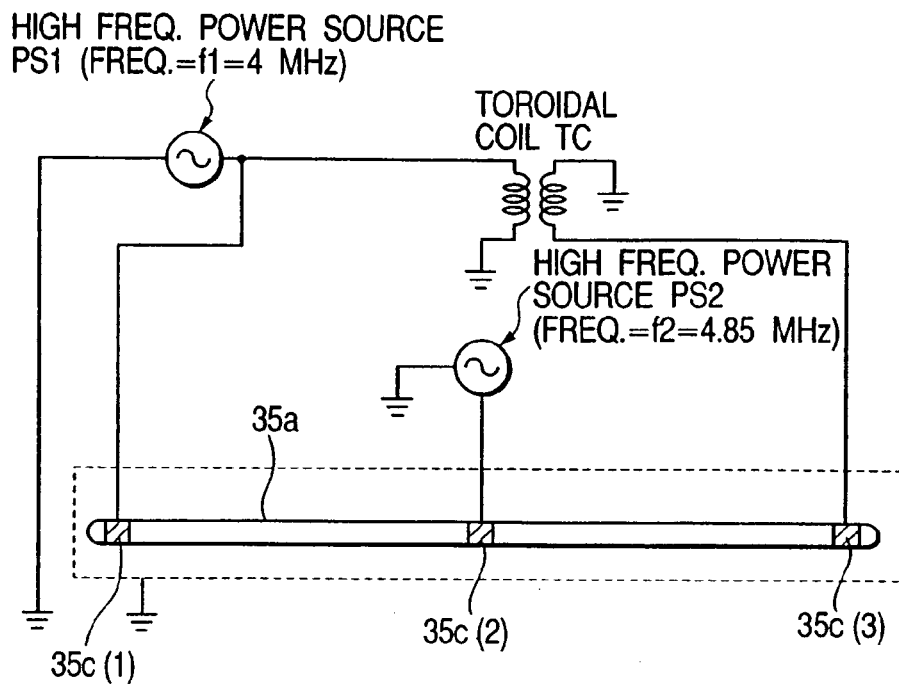
FIG. 44A is an illustration for explaining another embodiment of a light source in the liquid crystal display device in accordance with the present invention.

FIG. 44A is an illustration of another embodiment of the liquid crystal display device in accordance with the present invention.

The high-voltage side electrodes 35c(1) at one end of the discharge tube 35a is supplied with a first high-frequency voltage from the high-frequency power source PS1, the high-voltage side electrode 35c (3) at the other end of the discharge tube 35a is supplied with a second high-frequency voltage reversed in phase from the first high-frequency voltage via a toroidal coil TC, for example, from the high-frequency power source PS1, and the high-voltage side electrode 35c(2) at the center of the discharge tube 35a is supplied with a third high-frequency voltage of a frequency different from that of the first and second high-frequency voltages from the high-frequency power source PS2. That is to say, the high-voltage side electrodes at both ends of the discharge tube 35 are supplied with two high-frequency voltages reverse from each other, respectively, and the high-voltage side electrode 35 at the center of the discharge tube is supplied with a high-frequency voltage of a frequency different from that of the high-frequency voltages supplied to the high-voltage side electrodes at both the ends.

Figure 44B:
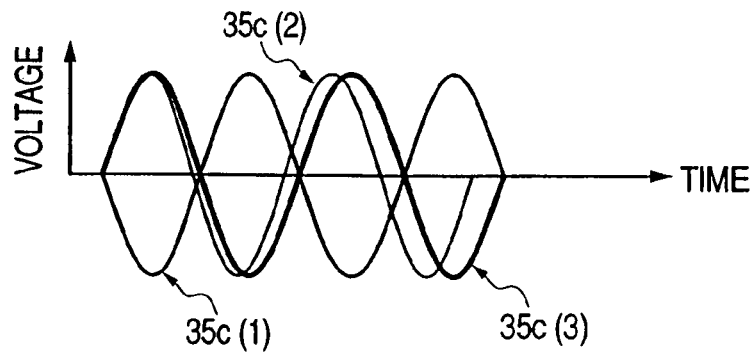
FIG. 44B shows waveforms of associated driving voltages.

FIG. 44B shows a relationship in waveform among the three high-frequency voltage supplied to the high-voltage side electrodes 35c(1), 35c(2) and 35c(3), respectively.

Figure 44C:
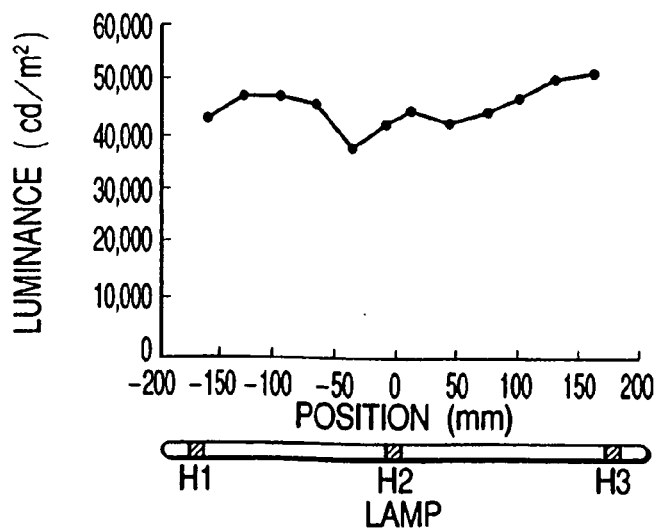
FIG. 44C shows a distribution of luminance of the light source.

As is apparent from a luminance distribution in a direction of the axis of the discharge tube of the above configuration shown in FIG. 44C, an approximately uniform luminance is ensured by this embodiment.

Embodiment 21

In this embodiment, the conditions for discharge at the two outside opposing electrodes 35c(1), 35c(2) mounted around the discharge tube 35a are equalized and the discharge is made continuous between the two outside opposing electrodes 35c(1), 35c(2), and thereby uniform luminance is obtained along the axis of the discharge tube 35a.

Figure 47:
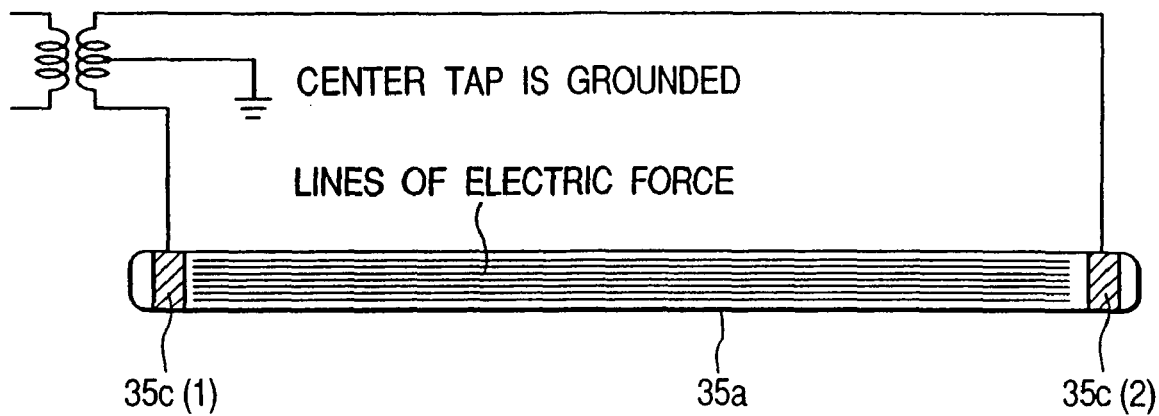
FIG. 47 is an illustration for explaining another embodiment of a light source in the liquid crystal display device in accordance with the present invention.

As shown in FIG. 47, a center tap of a secondary winding of a transformer in an inverter is grounded, and thereby the two outside opposing electrodes 35c(1), 35c(2) are made symmetrical with each other in the electrical circuit configuration. As is apparent from FIG. 47, lines of electric force between the two outside opposing electrodes 35c(1), 35c(2) are uniform and parallel with each other in distribution.

Embodiment 22

In this embodiment also, the conditions of discharge at the two outside opposing electrodes 35c(1), 35c(2) mounted around the discharge tube 35a are equalized and the discharge is made continuous between the two outside opposing electrodes 35c(1), 35c(2), and thereby uniform luminance is obtained along the axis of the discharge tube 35a.

Figure 48:
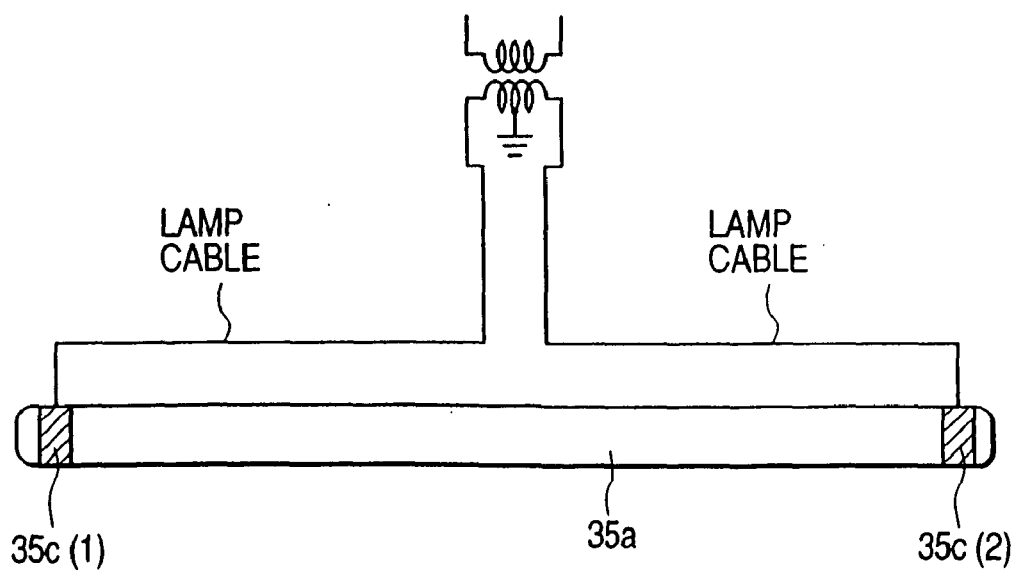
FIG. 48 is an illustration for explaining another embodiment of a light source in the liquid crystal display device in accordance with the present invention.

As shown in FIG. 48, the lengths and the routings of lamp cables connected to two outside opposing electrodes 35c(1), 35c(2) are made symmetrical. Lines of electric force between the two outside opposing electrodes 35c(1), 35c(2) are made uniform and parallel with each other in distribution.

Embodiment 23

In this embodiment, neighboring conductors in the vicinities of the discharge tube 35a are made symmetrical with each other to provide an electrical symmetry.

Figure 49:
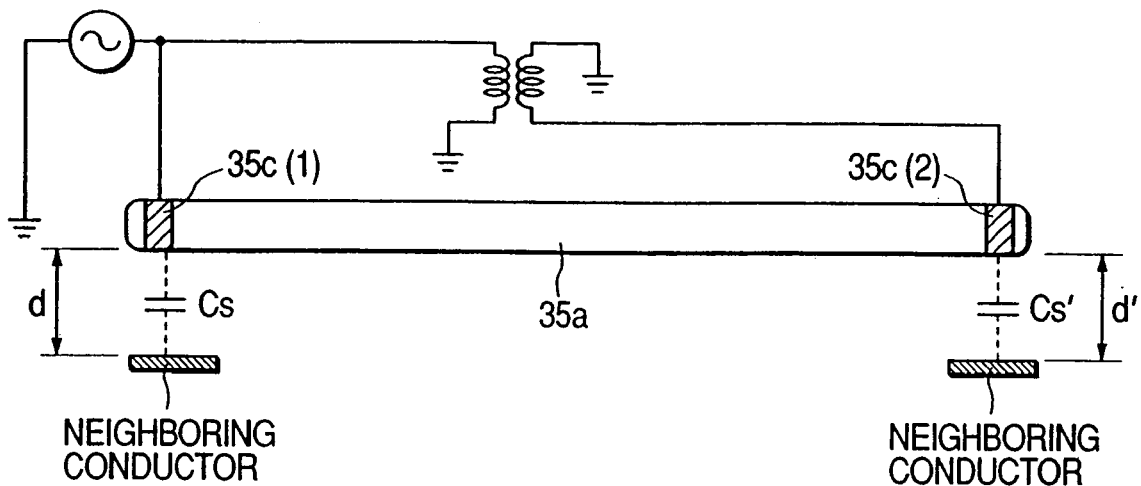
FIG. 49 is an illustration for explaining another embodiment of a light source in the liquid crystal display device in accordance with the present invention.

In FIG. 49, stray capacitances Cs, Cs' present between the discharge tube 35a and its neighboring conductors such as portions of a container are determined by distances d, d' between the discharge tube 35a and its neighboring conductors and areas of the neighboring conductors, and therefore the neighboring conductors are made symmetrical with respect to the center of the discharge tube 35a in a direction of the axis of the discharge tube 35a. This configuration provides lines of electric force uniform and parallel with each other between the two outside opposing electrodes 35c(1), 35c(2) mounted around the discharge tube 35a.

Embodiment 24

This embodiment obtains electrical uniformity by making uniform the neighboring conductors in the vicinities of the discharge tube 35a.

Figure 50:
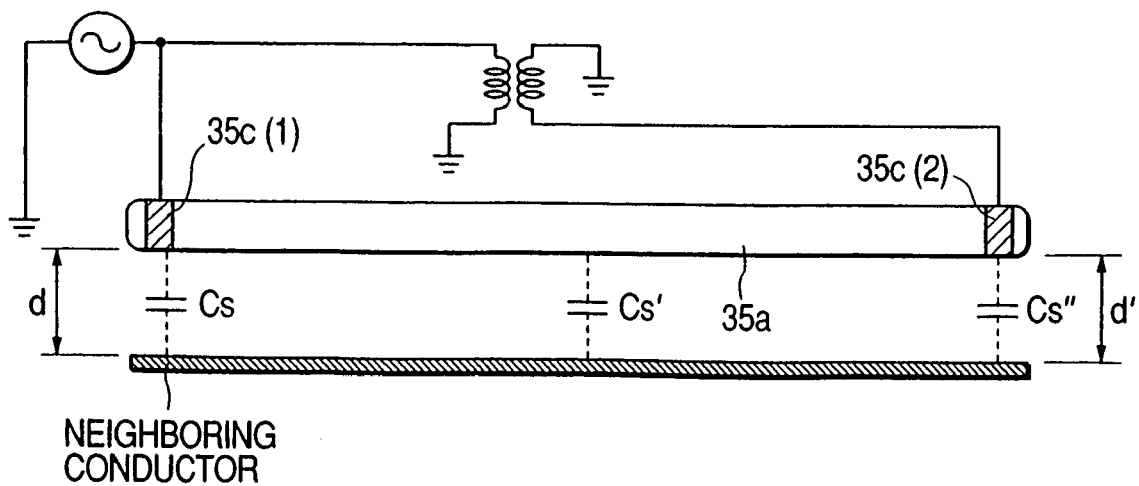
FIG. 50 is an illustration for explaining another embodiment of a light source in the liquid crystal display device in accordance with the present invention.

In FIG. 50, in order to make uniform the stray capacitances Cs, Cs', Cs'' present between the discharge tube 35a and its neighboring conductors such as portions of a container, the shape of the neighboring conductor facing the discharge tube 35a is made uniform along the axis of the discharge tube 35a such that d=d'. With this configuration, the neighboring conductor in the vicinities of the discharge tube 35a is provided with symmetry, and thereby lines of electric force between the two outside opposing electrodes 35c(1), 35c(2) mounted around the discharge tube 35a are made parallel with each other and uniform in distribution.

Embodiment 25

Figure 51:
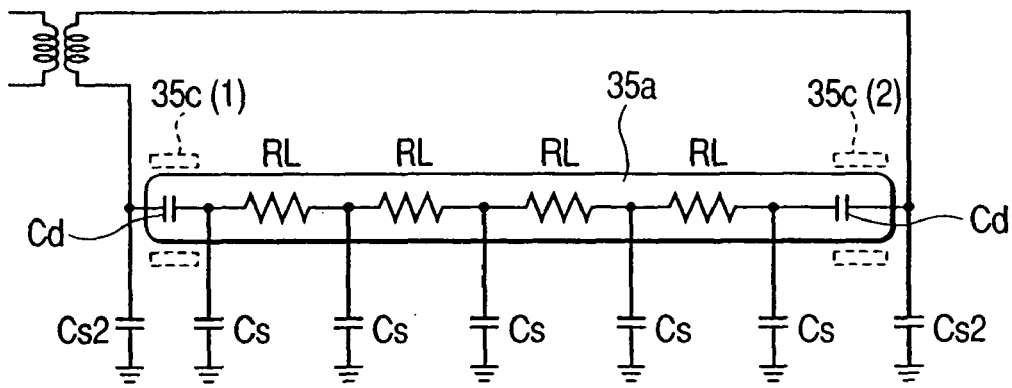
FIG. 51 is an illustration for explaining another embodiment of a light source in the liquid crystal display device in accordance with the present invention.

In FIG. 51, a voltage for driving the discharge tube 35a is sufficiently increased such that an impedance between the outside electrodes 35c(1), 35c(2) mounted around the discharge tube 35a is made sufficiently small compared with an impedance of stray capacitances formed around the discharge tube 35a.

FIG. 51 shows an equivalent circuit of a driving circuit for the discharge tube 35a including stray capacitances Cs, Cs2. The driving voltage is selected so as to equalize the absolute values of two currents flowing into the outside electrodes 35c(1), 35c(2), respectively, at a time. In other words, the applied voltage is made so large that leakage currents can be neglected and the discharge is made continuous between the outside electrodes 35c(1), 35c(2). When the output of the inverter circuit is made sufficiently large, the discharge current of the discharge tube 35a increases, the charge density in its light-generating region (the plasma) is increased, and consequently, the resistances RL of the discharge tube 35a are made smaller than the impedance $(1/(2.pi.fCs))$ of a leakage path of leakage currents, where f=a frequency of the driving voltage, and Cs=a stray capacitance. As a result almost all of the currents flow within the discharge tube 35a.

When a frequency of the driving voltage is selected to be as high as 1 MHz or more, for example, leakage paths for leakage currents are easily formed, and therefore it is important to reduce the resistances of the light-generating region (the plasma) of the discharge tube 35a by supplying a sufficiently high voltage to the discharge tube 35a as described above. For example, the good results are obtained by selecting the driving voltage such that the impedance of the light-generating region is made equal to or less than one tenth of the impedance of the stray capacitances formed around the discharge tube 35a.

Embodiment 26

Figure 52A:
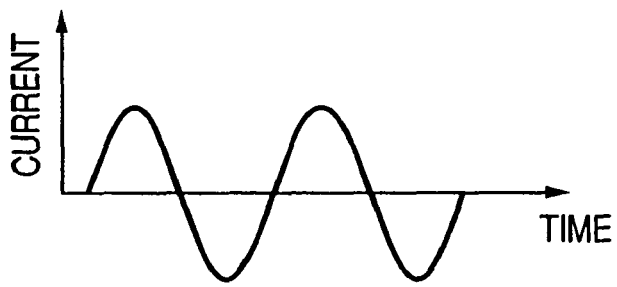
FIGS. 52A-52C are illustrations for explaining embodiments of a waveform of a driving voltage of a light source in the liquid crystal display device in accordance with the present invention, respectively.
Figure 52B:
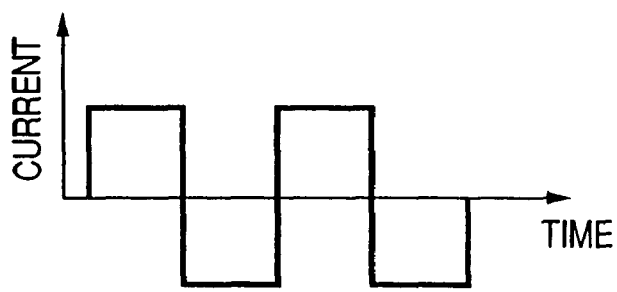
Figure 52C:
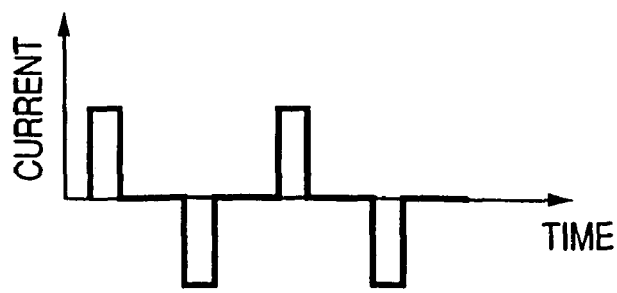

In the above embodiments, the waveforms of the discharge currents of the discharge tube 35a have been explained as sinusoidal as shown in FIG. 52A, but the present invention is not limited to this waveform, and the point is that the waveforms only need to change the flowing directions of the discharge currents periodically. Consequently, the waveforms of the discharge currents in the above embodiments can be rectangular as shown in FIG. 52B, or can be in the form of pulses as shown in FIG. 52C.

Starting characteristics of the discharge tube 35a can be improved by supplying to the discharge tube 35a at the time of starting it a voltage higher than a required voltage for its normal operation.

Embodiments 21-26 are equally applicable to the phase-reversal driving, the two-different-phase driving and the two-frequency driving which have been described above.

The present invention has been explained in detail by using the embodiments, and the representative configurations of the present invention can be summarized as follows:

As for the driving voltages supplied to the outside electrodes mounted around the outside of the discharge tube, there are (1) a driving method of applying driving voltages reversed in phase from each other to adjacent ones of the outside electrodes mounted around the outside of the discharge tube, respectively, (2) a driving method of applying driving voltages of frequencies different from each other to adjacent ones of the outside electrodes mounted around the outside of the discharge tube, respectively, and (3) a driving method of applying driving voltages out of phase with each other to adjacent ones of the outside electrodes mounted around the outside of the discharge tube, respectively.

The following are techniques for heightening the beneficial effects of the above three driving methods in combination with each of them:

(a) selecting the frequency of the driving voltages to be 1 MHz or more;

(b) using two or more power sources for the driving voltages;

(c) providing the discharge tube with at least three of the outside electrodes;

(d) changing the flowing directions of discharge currents between a pair of adjacent ones of the outside electrodes periodically;

(e) making a pair of adjacent ones of the outside electrodes symmetrical with each other, for example, (i) arranging the pair of adjacent ones of the outside electrodes electrically symmetrical with each other, (ii) equalizing the lengths of two lamp cables connected to the pair of adjacent ones of the outside electrodes, respectively, (iii) making the neighboring conductors in the vicinities of the pair of adjacent ones of the outside electrodes geometrically symmetrical with each other;

(f) grounding none of the outside electrodes;

(g) selecting the driving voltages to be sufficiently large such that an impedance between two adjacent ones of the outside electrodes is made sufficiently small compared with an impedance of stray capacitances formed around the discharge tube in the vicinities of the two adjacent ones of the outside electrodes, for example, selecting the driving voltage such that the impedance between the two adjacent ones of the outside electrodes is made equal to or less than one tenth of the impedance of the stray capacitances formed around the discharge tube in the vicinities of the two adjacent ones of the outside electrodes; and (h) supplying to the discharge tube at the time of starting it a voltage higher than a required driving voltage for its normal operation to improve its starting characteristics.

As is apparent from the above explanation, the liquid crystal display device in accordance with the present invention provides advantages of lengthening its life time and improving uniformity of luminance.

What is claimed is:

1. A liquid crystal display device including a liquid crystal display panel and a backlight disposed behind said liquid crystal display panel, said backlight comprising: a light source comprising a discharge tube including a sealed off transparent tube body and a discharge gas sealed within said sealed-off transparent tube body with no electrodes disposed within said sealed-off transparent tube body, and first and second electrodes disposed outside said sealed-off transparent tube body; and a power source which supplies a first high-frequency voltage to said first electrode and a second high-frequency voltage to said second electrode, wherein said first electrode is disposed at one end of said sealed-off transparent tube body in a direction of a longitudinal axis thereof, and said second electrode is disposed at another end of said sealed-off transparent tube body in the direction of the longitudinal axis thereof;

said first high-frequency voltage is applied to said first electrode and said second high-frequency voltage is applied to said second electrode to illuminate the region between said first electrode and said second electrode, the frequency of said first high-frequency voltage and the frequency of said second high-frequency voltage being the same, wherein the phase of said first high-frequency voltage is different from said phase of said second high-frequency voltage by a phase difference greater than 0 degree and less than 180 degree, or the phase of said first high-frequency voltage is different from said phase of said second high-frequency voltage by a phase difference greater than 180 degree and less than 360 degree.

2. A liquid crystal display device according to claim 1, said power source comprising a first power source which supplies a first high-frequency voltage to said first electrode and a second power source which supplies a second high-frequency voltage to said second electrode.

3. A liquid crystal display device according to claim 1, third electrode being disposed outside said sealed-off transparent tube body.

4. A liquid crystal display device according to claim 1, electrically conductive elements are disposed in the vicinity of and symmetrically to said discharge tube.

5. A liquid crystal display device according to claim 1, a voltage is applied between said first electrode and said second electrode so that an impedance of plasma formed inside of said discharge tube is less than 1/10 compared to an impedance formed by floating capacitance around said discharge tube.

6. A liquid crystal display device according to claim 1, frequency of said first high-frequency voltage and said second high-frequency voltage being higher than 1 MHz.

7. A liquid crystal display device according to claim 1, said light source is disposed inside of a shield case, and wherein said shield case is grounded.

* * * * *